United States Patent
Anderson et al.

(10) Patent No.: US 12,170,083 B1
(45) Date of Patent: Dec. 17, 2024

(54) PRESENCE-BASED ACCOUNT ASSOCIATION WITH DEVICE

(71) Applicant: Amazon Technologies, Inc., Seattle, WA (US)

(72) Inventors: Nicholas Jeffrey Anderson, Seattle, WA (US); Martyn Romanko, Seattle, WA (US); Yu Han Ding, Seattle, WA (US); Manikanta Babu Karanam, Bothell, WA (US); James Marlotte, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 336 days.

(21) Appl. No.: 17/344,384

(22) Filed: Jun. 10, 2021

Related U.S. Application Data

(60) Provisional application No. 63/179,103, filed on Apr. 23, 2021.

(51) Int. Cl.
| | |
|---|---|
| *G10L 15/22* | (2006.01) |
| *G10L 25/18* | (2013.01) |
| *G10L 25/60* | (2013.01) |
| *G10L 25/78* | (2013.01) |

(52) U.S. Cl.
CPC .............. *G10L 15/22* (2013.01); *G10L 25/18* (2013.01); *G10L 25/60* (2013.01); *G10L 25/78* (2013.01); *G10L 2015/223* (2013.01); *G10L 2015/227* (2013.01); *G10L 2025/786* (2013.01)

(58) Field of Classification Search
None
See application file for complete search history.

(56) References Cited

U.S. PATENT DOCUMENTS

| 11,081,099 B2 * | 8/2021 | Lewis | G10L 13/02 |
| 11,501,781 B2 * | 11/2022 | Tukka | G10L 17/22 |
| 2019/0182261 A1 * | 6/2019 | Carbune | G10L 15/22 |
| 2021/0134286 A1 * | 5/2021 | Burton | G06F 9/453 |
| 2022/0122612 A1 * | 4/2022 | Fang | G10L 17/06 |

* cited by examiner

*Primary Examiner* — Pierre Louis Desir
*Assistant Examiner* — Nicole A K Schmieder
(74) *Attorney, Agent, or Firm* — Lee & Hayes, P.C.

(57) ABSTRACT

Systems and methods for presence-based account data association with devices are disclosed. For example, a presence event may be detected and details of the presence event may be utilized to determine whether and how to initiate, maintain, or end an account-association session associated with a secondary device. A current session status and a determination as to whether a primary device is associated with a previously-utilized primary account identifier for the secondary device may be used to determine whether connection notifications should be sent and/or whether the secondary device should be within a threshold distance from a primary device to establish the account-association session.

20 Claims, 17 Drawing Sheets

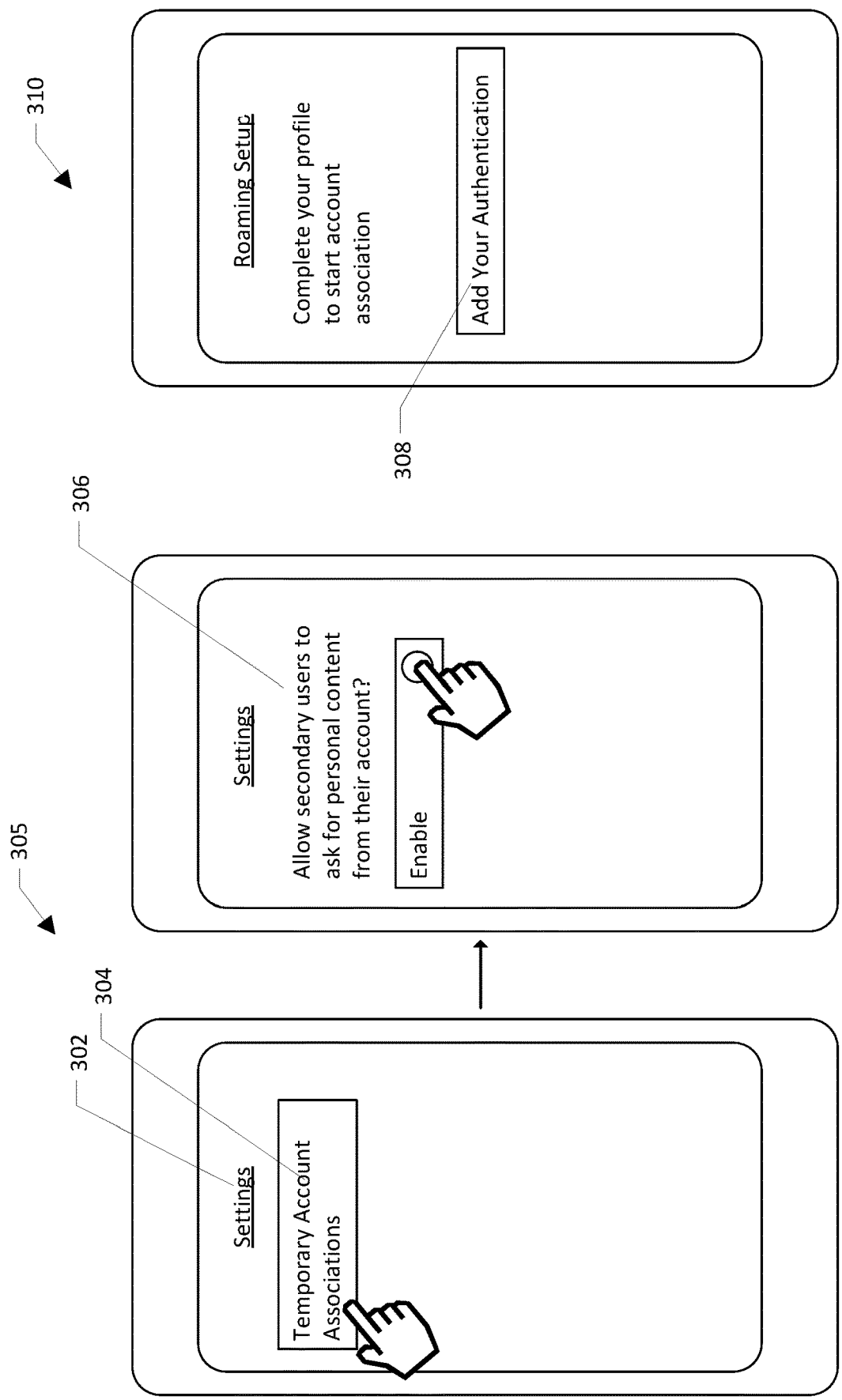

700

702 Receive, from first device associated with first account data, first data indicating first presence event has occurred in proximity to first device, first presence event associated with at least one of user associated with second account data or second device associated with second account data

704 Determine that status associated with second account data indicates lack of active session with first device, active session representing time period during which second account data is associated with first device such that second account data is authorized to be utilized to respond to voice input received at first device

706 Determine second account data has previously been associated with first device

708 Based at least in part on second account data having been previously associated with first device, causing second account data to be associated with first device

710 Receive, from first device and while second account data is associated with first device, first audio data representing voice input

712 Determine that voice input is associated with user

714 Based at least in part on determining voice input is associated with user, utilizing application enabled for use by second account data to respond to user voice input

FIG. 7

PRESENCE-BASED ACCOUNT ASSOCIATION WITH DEVICE

CROSS-REFERENCE TO RELATED PATENT APPLICATIONS

This application claims priority to and incorporates U.S. Provisional Patent Application 63/179,103, filed Apr. 23, 2021, entitled "Presence-Based Account Association with Device," in its entirety by reference.

BACKGROUND

Voice interface devices may be utilized to provide information and/or to control operation of other electronic devices. The provision of information and control of devices may be performed utilizing accounts associated with the voice interface devices. Described herein are improvements in technology and solutions to technical problems that can be used to, among other things, manage the use of voice interface devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3A illustrates an example user interface for setup of account association with devices by primary users.

FIG. 3B illustrates an example user interface for setup of account association with devices by secondary users.

FIG. 7 illustrates a flow diagram of another example process for presence-based account association with devices.

DETAILED DESCRIPTION

Figure 1:
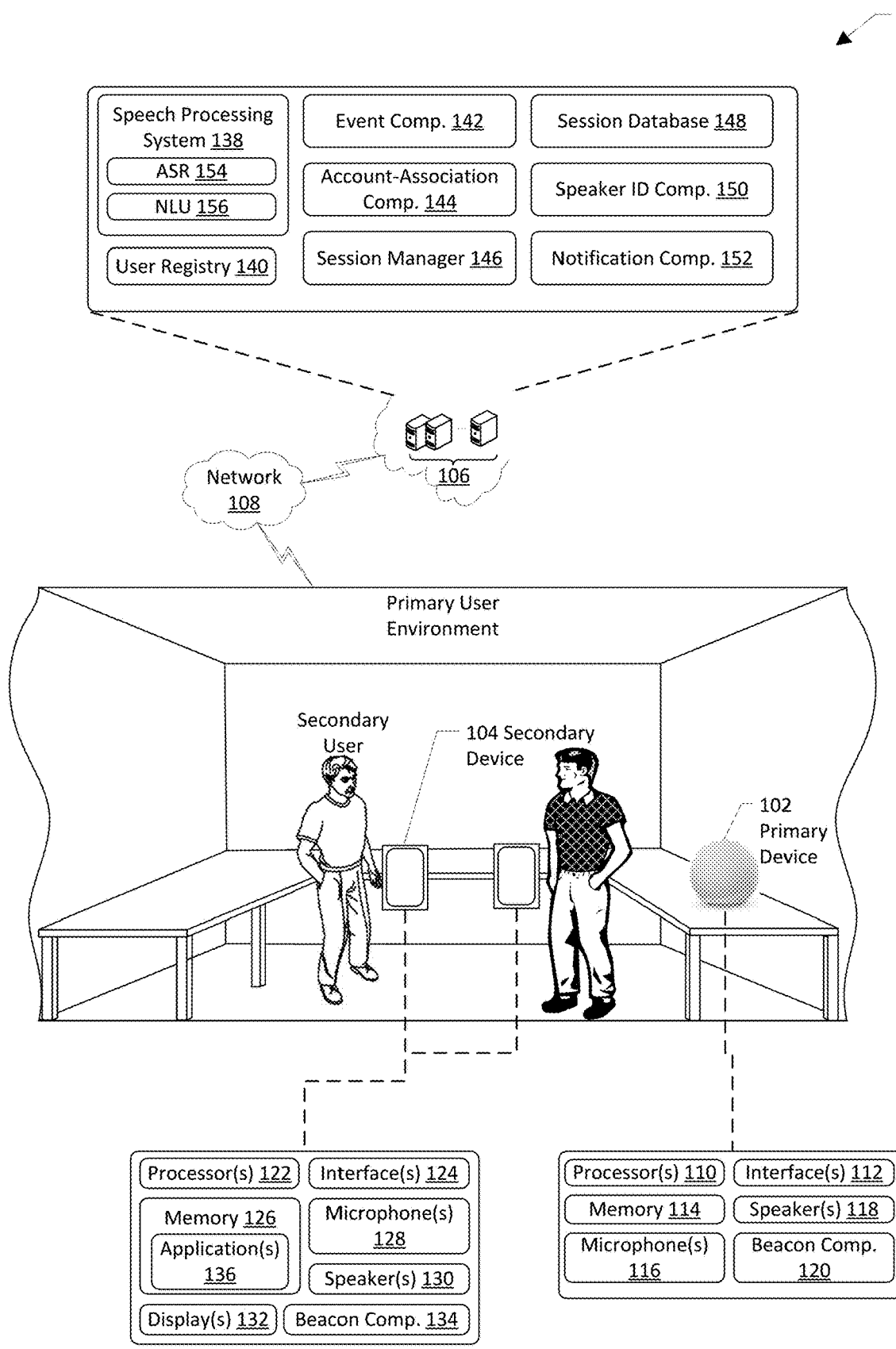
FIG. 1 illustrates a schematic diagram of an example environment for presence-based account association with devices.

Systems and methods for presence-based account association with devices are disclosed. Take, for example, a first user profile that may be associated with one or more electronic devices such as voice interface devices (e.g., Echo devices, mobile phones, tablets, personal computers, televisions, set top boxes, virtual/augmented reality headsets, etc.), touch interface devices (tablets, phones, laptops, kiosks, billboard, etc.), and connected devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. A second user profile may also be associated with one or more other electronic devices, which may be situated in a home or other place associated with the second user profile, for example. Each user may have his or her own user accounts that may be utilized to operate electronic devices. For example, the first user profile may be associated with first account data that provides access to certain functionality and/or resources utilizing the electronic devices associated with the first user profile, while the second user profile may be associated with second account data that provides access to the same or different functionality and/or resources. By way of example, the first account data may indicate that the first user profile may utilize voice interface devices to receive music, videos, podcasts, or other type(s) of content from a first streaming service while the second account data may indicate that the second user profile may receive content from a second streaming service. Other functionalities that may be associated with given account data may include the ability to use applications such as smart-home applications, payment information for shopping/purchases, healthcare information, and/or the use of contact lists for communication purposes, for example. While each user may be able to utilize his or her own voice interface devices, it may be beneficial to allow users to utilize each other's electronic devices in connection with their own accounts.

For example, the first user may be in the environment, such as a home, associated with devices of the second user profile and may desire to utilize the devices to access the music services, news services, and/or to operate smart devices associated with the first user account, for example.

To do so, the voice interface devices associated with the second user profile may be associated with the first user's account data such that the first user may utilize the voice interface devices to perform one or more actions.

The second user profile, which may be described herein as the "host user profile," may also set up the ability to associate account data with his or her devices utilizing an application residing on and/or otherwise accessible to a mobile device associated with the second user. For example, the second user may provide input to the mobile device indicating a request to enable other account associations on voice interface devices associated with the second user account. This indication may represent consent of the second user to perform the operations using the second user's devices, some examples of which are described herein. The second user may also indicate which voice interface devices are to be enabled for access by others. Once access has been set up in association with the applicable user profiles, the selected voice interface devices and the speech processing system may be configured to (temporarily or otherwise) associate at least some of the first user's account data and/or functionality with the second user account.

It should be understood that a "primary account" and a "primary account user" may be any account and/or user associated with devices to which other account data may be temporarily associated with. Non-limiting examples of primary account users may be homeowners, employers, business owners/operators, apartment tenants, etc. A "secondary account" and a "secondary account user" may be any account and/or user associated with account data to be temporarily associated with primary devices. Non-limiting examples of secondary account users may be guests, visitors, employees, etc.

For example, a presence event may be determined with respect to one or more primary devices. The presence event may represent a user (guest) device, which may be described herein as a secondary device, associated with a first (guest) user profile is near another (host) device, which may be described herein as a primary device, associated with a different (host) user profile, and may include, for example, the one or more primary devices receiving a signal from the secondary device. The signal may include data such as a device identifier of the secondary device and/or a secondary account identifier of the first user account data. For example, the first user may have installed on the secondary device an application associated with the speech processing system and/or the first user's devices. To operate the first user's devices, the first user may have provided user input to the application for creating the first account data. When the signal is sent from the secondary device, the application may cause the wireless signal to include the secondary account identifier associated with the first account data, as well as the device identifier of the secondary device. In examples, the signal may be a Bluetooth signal, Bluetooth Low Energy signal, etc.

The primary device may receive the short-range or other type of wireless signal and may send, to a system associated with the primary device, data representing the secondary account identifier for the secondary device as well as an identifier for the second account data associated with the primary device. An event component of the system may receive the data from the primary device and may utilize that data to determine whether a presence event has occurred. Determination of the presence data may be based solely on receipt of the signal from the secondary device. In other examples, one or more other signals may be utilized for determining that a presence event has occurred. For example, the other signals may include detection of user speech at the primary device, detection of sounds indicative of movement, image data processing indicating presence of a person, device usage data, scheduling data, and/or any other type of data indicative of presence of a person and/or device in an environment associated with the primary device.

An account-association component of the system may receive event data from the event component and may initiate a process of determining whether and/or how to establish an account-association session where the account data for the secondary device is temporarily or otherwise associated with the primary devices and/or primary account data. For example, the account-association component may receive the event data and may generate object data representing the secondary account identifier for the secondary device, the identifier associated with the primary device, and/or other data associated with the devices and/or accounts at issue. This process may also include the decryption and/or deserialization of the event data and/or the data sent from the primary device to the system. Additionally, in instances where the identifier information associated with the event data is associated with identifiers that are not associated with the system, such identifier information may be utilized to determine which secondary account identifier(s) and/or identifier(s) associated with the primary device, as stored by the system, correspond to the identifier information associated with the event data. Additionally, metadata useful for analyzing account-association sessions may also be generated. For example, presence event timing information, signal strength information, user preferences, etc. may be applicable for the operations described herein and that data may be generated and associated with the presence event.

Thereafter, the account-association component may generate an identifier map associated with the presence event. For example, more than one primary device may have received the signal from the secondary device, and in these examples multiple presence events may be detected and/or the single presence event may indicate that multiple primary devices are in proximity to the secondary device. In some examples, each of the primary devices may be associated with the same identifier, such as when the primary devices are all associated with the same account data. This may occur when the primary devices at issue are all devices in the same single-family household. In other examples, such as when primary devices are in an apartment complex, dormitory, multi-family home, and/or other examples where at least one of the multiple primary devices is associated with account data that differs from account data associated with other primary devices in a given environment, the account-association component may generate an identifier map indicating these identifiers and/or information about the primary devices associated with the identifiers, such as which identifiers are associated with primary devices that are within a threshold distance of the secondary device, such as within a few feet of the secondary device, and which identifiers are associated with primary devices that are not within the threshold distance but are still receiving the signal from the secondary device.

The account-association component may then perform one or more filtering operations. For example, the account-association component may determine whether one or more of the primary account identifiers correspond to the secondary account identifier from the secondary device. When a given primary account identifier corresponds to the secondary account identifier from the secondary device, this may indicate that the presence event is associated with the secondary device being in the secondary user's home or otherwise that the secondary device is interacting with devices that are already associated with the secondary user. In this example where the secondary device is not considered associated with another environment for temporary connection to primary devices, the presence event and/or the given primary account identifier when multiple primary account identifiers are determined, may be discarded. Additionally, in examples, the secondary account identifier and/or the primary account identifier may be missing from the data utilized by the system. This may result when the secondary device and/or the primary device is not configured to send some or all of the data described herein. In these examples, the presence event may be discarded. Additionally, when the event component detects a presence event, the event component may, in examples, determine a type of presence event that has occurred, such as a user speaking, a user entering an environment, a user exiting an environment, etc. However, in some examples, the event component may determine that a presence event occurred but may not have determined a type of the presence event, and/or may not have determined the type of presence event to a threshold confidence level. In these examples, the event data from the event component may indicate that the presence event is associated with an unknown event type and the presence event may be discarded by the account-association component. Additionally, in examples where multiple primary devices receive the wireless signal, duplicate secondary account identifiers associated with a given presence event may be identified. These duplicate secondary account identifiers may be de-duplicated.

After filtering has been performed, the account-association component may utilize user preference information to determine whether the account-association session processes described herein should continue for a given secondary device. For example, when the primary account user authorizes account-association functionality on one or more of the user's devices, the user may identify one or more secondary users and/or secondary account identifiers that are prohibited from being associated with the primary device(s). In other examples, user input from the primary account user prohibiting certain secondary users and/or secondary account identifiers may be received at some time after setting up account-association functionality. In these and other examples, preference data may be stored in association with the primary account data indicating which secondary users and/or secondary account identifiers are prohibited from being associated with the primary devices. If the presence event at issue is associated with a prohibited secondary account identifier, the system may refrain from associating the secondary account data with the primary devices.

The account-association component may then send the resulting data to a session manager, which may be configured to determine a type of account-association session associated with the secondary account identifier and to determine how to proceed with the given presence event. For example, the session manager may query a session database for an indication of whether the secondary account identifier from the presence event is associated with an active account-association session, a pending account-association session, and/or is not associated with a current account-association session. By way of example, if the secondary account data, at the time of the presence event, is already associated with a primary device, the session manager may determine that the secondary account identifier is associated with an active account-association session. In other examples, if a notification for establishing an account-association session has been sent to the secondary device but user input data accepting the notification has not yet been received, the session manager may determine that the secondary account identifier is associated with a pending account-association session. In other examples, if the session database returns results indicating that the secondary account identifier is not associated with an active account-association session or a pending account-association session, the session manager may determine that the secondary account identifier is not currently associated with an account-association session. The session manager may return data indicating the account-association session status for the secondary account identifier.

The account-association component may then be configured to utilize the account-association session status to determine what processes to take in association with the presence event. For example, when the session status is indicated as an active account-association session, the account-association component may determine whether an end presence event is occurring, or otherwise that the secondary account user is no longer present in association with the primary device(s). In these examples, the account-association component may query the system for primary account identifier maps associated with the presence event and/or other presence events associated with other devices associated with the primary account data. If the primary account identifier maps indicate that the primary account identifier is still associated with the presence event, this may indicate that even though a presence event has occurred, the secondary device is still in proximity to the primary device. In these examples, the presence event may be discarded and the association between the secondary account data and the primary device(s) may be maintained. If the primary account identifier maps indicate that the primary account identifier is not still associated with the presence event, this may indicate that the presence event is associated with the secondary account user leaving the primary user environment. In these examples, the secondary account data may be dissociated from the primary device(s) such that functionality associated with the secondary account data may not be utilized by the primary device(s).

In examples where the account-association session status is indicated as a pending account-association session, the account-association component may determine whether a start presence event is occurring, or otherwise that a secondary account user has moved into proximity of the primary device(s). In these examples, the account-association component may query the system for primary account identifier maps associated with the presence event and/or other presence events associated with other devices associated with the primary account data. If the primary account identifier maps indicate that the primary account identifier is still associated with the presence event, this may indicate that even though a presence event has occurred, the secondary device is still in proximity to the primary device. In these examples, the account-association component may maintain the pending status of the account-association session and/or may extend a time period for which the pending account-association session is valid. When the primary account identifier maps indicate that the primary account identifier is not still associated with the presence event, the account-association component may treat the pending account-association session as if no account-association session was associated with the secondary account identifier.

In these examples, and/or examples where the session status data received from the session manager indicates no account-association session associated with the secondary account identifier, the account-association component may initiate primary account identifier selection for establishing an account-association session. In these examples, the account-association component may determine whether a primary account identifier for the presence event corresponds to a remembered location identifier. For example, if the presence event is for the first time secondary account data is associated with a given primary device, then the primary account identifier will not correspond to a remembered location identifier. However, if the secondary account data has been previously associated with the primary device as part of an account-association session, the primary account identifier may correspond to a remembered location identifier. In these examples, the account-association component may cause the secondary account data to be associated with the primary device(s), such as without sending notification data requesting user input confirming that the association should be established.

When the secondary account identifier does not correspond to a remembered location identifier, the account-association component may determine a number of primary account identifiers for the primary devices associated with the presence event that are within a threshold distance of the secondary device. For example, the threshold distance may be a few feet from the secondary device. When only one primary account identifier is associated with the presence event within this distance threshold, that primary account identifier may be selected as the primary account identifier for establishing an account-association session. When two primary account identifiers are associated with the presence event within the distance threshold, this may indicate that the primary account identifiers are associated with the same environment, and the account-association component may randomly select one of the two primary account identifiers. When zero or more than two primary account identifiers are detected, the number of primary account identifiers associated with primary devices outside of the threshold distance but still receiving the wireless signal from the secondary device may be determined. When the number of primary account identifiers associated with the presence event outside the threshold distance is zero or more than one, the process may end and the secondary account data may not be associated with any of the primary devices. When the number of primary account identifiers associated with the presence event outside the threshold distance is one, that primary account identifier may be selected.

Once a primary account identifier is selected as described herein, a notification component of the system may generate and send a notification to the secondary device and/or to another device associated with the secondary account data. The notification may request user input confirming that the secondary account data should be associated with the primary device(s). In examples where user input data is received that provides the confirmation, the secondary account data may be associated with the primary device(s). When no user input data is received, the account-association session may be maintained as a pending account-association session by the session database, at least for a predefined time period. When the user input data rejects the notification, the system may refrain from associating the secondary account data with the primary device(s).

When secondary account data is associated with the primary device(s) as an account-association session, functionality available to the secondary account data may be utilized by the primary device(s). For example, applications, abilities, and/or user preferences associated with the secondary account data may be available to the primary device(s), such as for responding to user voice commands. By way of example, a given primary device may receive audio representing user voice input. Audio data corresponding to the audio may be generated and speech processing may be performed to determine how to respond to the user voice input. The speech processing may include determining a device identifier associated with the primary device that received the voice input. The speech processing system may query the session database and/or one or more other components of the system for an indication of whether an active account-association session is currently associated with the primary device. When an active account-association session is currently associated with the primary device, the speech processing system may perform one or more speaker identification processes to determine whether the user that provided the voice input is the secondary account user or another user, such as the primary user. Speaker identification will be described in more detail below. When the speaker identification processes result in an indication that the voice input was received from the secondary account user, the speech processing system may utilize the secondary account data for determining what actions to take in response to the voice input. For example, the actions may include accessing one or more applications and/or skills associated with the secondary account data, providing information unique to the secondary account data, etc. When the speaker identifier processes result in an indication that the voice input was not received from the secondary account user, the speech processing system may utilize the primary account data for determining what actions to take in response to the voice input.

By way of example, when audio data is received from a device associated with an active account-association session, the speech processing system may determine intent data that corresponds to the audio data. The intent data may indicate a requested action to be performed and a "payload" indicating details about the action. Examples include "play my rock playlist," "order pepperoni pizza," "play Game A," etc. In these examples, the determined intent is to output audio, initiate a food order, and initiate a game, respectively. The payload in these examples is the "rock playlist," "pepperoni pizza," and "Game A." In each of these examples, the speech processing system may determine how to service these intents utilizing the secondary account or primary account data. For example, the secondary account data may be associated with a "rock playlist," and the primary account data may also be associated with a different "rock playlist" or no "rock playlist" at all. By way of additional example, when placing orders, the secondary account data may be associated with given payment identifiers while the primary account data may be associated with different payment identifiers. Additionally, the secondary account data may have certain applications and/or skills enabled while the primary account data may have different applications and/or skills enabled. As such, when an active account-association session is associated with a device from which audio data was received, the speech processing system may determine whether the secondary account data and/or the primary account data is to be utilized.

In examples, speaker identification as described more fully below, may be utilized to determine whether the secondary account user is the person that provided the voice input to the device in question. When the secondary account user is the person that provided the voice input, the speech processing system may, before or after the intent data is determined, utilize the secondary account data to determine how to respond to the voice input. Utilizing the examples provided above, the secondary account data may be associated with certain applications, skills, payment identifiers, and/or enabled domains for responding to voice input. In the "play my rock playlist" example, audio streaming applications that have been enabled in association with the secondary account data may be queried to service the intent. The secondary account data may indicate that, for a given audio streaming application, a playlist was created and is identified as "rock." In this example, the audio streaming application may be selected for servicing the intent and the application may provide and/or permit audio data representing songs from the rock playlist to be sent to the device and to be output by the device. In the "order pepperoni pizza" example, enabled applications and/or skills that are configured to allow for ordering pizza may be queried to service the intent, and payment identifiers associated with the secondary account data may be utilized to pay for the order. In the "play Game A" example, an enabled application and/or skill associated with Game A may be queried to service the intent.

In examples where the speaker identification processes described herein does not determine that the secondary account user is the person that provided the voice input, or in other words that the person that provided the voice input is the primary user and/or another user and/or is the secondary account user but was not determined to be the secondary account user to a threshold confidence level, the primary account data may be utilized to respond to the voice input. By so doing, the speech processing system allows for functionality of the secondary account to be utilized when the secondary user is the speaker, and the speech processing system allows for functionality of the primary account to be utilized when the secondary user is not the speaker. This may prevent and/or hinder the use of the secondary account data by unauthorized users.

In other examples, selection of the secondary account data or the primary account data for responding to a given voice command may be based at least in part on which account is configured to service the intent. For example, if the secondary account data indicates that an audio streaming application is enabled but the primary account data does not have an audio streaming application enabled, the secondary account data may be selected when the voice command is to output music. Additionally, even when both the secondary account data and the primary account data have applications and/or skills enabled to respond to a given voice command, the details of the voice command itself may be utilized to determine which account to utilize. For example, even if both accounts have an audio streaming application enabled, if the secondary account data includes a "rock playlist" but the primary account data does not include a playlist identified as "rock playlist," the secondary account data may be selected to service the intent of "play my rock playlist."

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for presence-based account data association with devices. The system 100 may include, for example, a voice interface device 102. The voice interface device 102 may be configured to receive audio corresponding to user utterances, generate corresponding audio data, perform operations associated with the user utterances, and output audio to an environment in which the voice interface device 102 is situated, for example. In other examples, the device 102 may not include a voice interface and/or may include an interface other than a voice interface, which may include devices such as televisions, settop boxes, tablets, and/or other devices where given media is made available based on identifying the user after associating the secondary account as described herein. For example, the voice interface device 102 may be one or more electronic devices such as voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. A second user profile may also be associated with one or more other electronic devices, which may be situated in home or other place associated with the second user profile, for example. The system 100 may also include one or more mobile devices 104, which may be configured to, among other things, utilize an application 136 associated with the voice interface device 102 to display information to a user and/or to allow for receiving input from the user, such as input for setting up and/or managing use of the voice interface device 102. The system 100 may also include one or more accessory devices (not depicted), which may be configured to be controlled utilizing the voice interface device 102. The accessory devices may include devices such as locks, doorbells, thermostats, speakers, watches, appliances, light bulbs, plugs, clocks, etc. The system 100 may also include a remote system 106 configured to communicate with the voice interface device 102 and/or the mobile device 104, such as via a network 108. The remote system 106 may include a speech-processing system associated with one or more voice interface devices 102. The voice interface devices 102 may be configured to receive user utterances and perform operations in response to such user utterances. In these examples, the voice interface devices 102 may be "hands free" such that interactions with the voice interface devices 102 are performed through audible requests and responses.

The voice interface device 102 may include one or more components, such as, for example, one or more processors 110, one or more network interfaces 112, memory 114, one or more microphones 116, one or more speakers 118, and/or a beacon component 120. The microphones 116 may be configured to capture audio, such as user utterances, and generate corresponding audio data. The speakers 118 may be configured to output audio, such as audio corresponding to audio data received from another device and/or the system 106. The beacon component 120 may be utilized to receive signals from the mobile device 104 and, in examples, to generate data associated with the signals, such as when the signals were received, a signal strength, and/or any other information associated with the signals. It should be understood that while several examples used herein include a voice interface device 102 that allows users to interact therewith via user utterances, one or more other devices, which may not include a voice interface, may be utilized instead of or in addition to voice interface devices 102. In these examples, the device may be configured to send and receive data over the network 108 and to communicate with other devices in the system 100. As such, in each instance where a voice interface device is utilized, a computing device that does not include a voice interface may also or alternatively be used.

The mobile device 104 may include one or more components, such as, for example, one or more processors 122, one or more network interfaces 124, memory 126, one or more microphones 128, one or more speakers 130, one or more displays 132, and/or a beacon component 134. The microphones 128 and the speakers 130 may have the same or similar components and/or may operate in the same or a similar manner to the microphones 116 and the speakers 118 of the voice interface device 102, respectively. The displays 132 may be configured to present information and user interfaces to a user of the mobile device 104. The displays 132 may also include input functionality, such as a touchscreen, that may allow for user input to be received. The beacon component 134 may be configured to cause the mobile device 104 to emit a signal, such as using Bluetooth and/or Bluetooth Low Energy protocols, for example. The signal may include data indicating a device identifier for the mobile device 104 and/or a secondary account identifier associated with the application 136 residing on and/or accessible to the mobile device 104. The memory 126 may include one or more components such as, for example, an application 136, which may reside on the memory 126 and/or be accessible to the mobile device 104. The application 136 may be configured to cause the processor(s) 122 to receive information associated with interactions with the voice interface device 102 and cause display of representations, such as text and/or images, associated with the interactions. The application 136 may also be utilized, in examples, to receive input data, such as from a user of the mobile device 104, and send the input data and/or instructions associated with the input data to the system 106. The application 136 may also be utilized to display notifications and/or alerts received, for example, from the system 106.

The system 106 may include components such as, for example, a speech processing system 138, a user registry 140, an event component 142, an account-association component 144, a session manager 146, a session database 148, a speaker identification component 150, and/or a notification component 152. It should be understood that while the speech processing system 138 and the other components are depicted as separate from each other in FIG. 1, some or all of the components may be a part of the same system. The speech processing system 138 may include an automatic speech recognition component (ASR) 154 and/or a natural language understanding component (NLU) 156. Each of the components described herein with respect to the system 106 may be associated with their own systems, which collectively may be referred to herein as the system 106, and/or some or all of the components may be associated with a single system. Additionally, the system 106 may include one or more applications, which may be described as skills, actions, and/or capsules. For example, a skill may receive data representing an intent. For example, an intent may be determined by the NLU component 156 and/or as determined from user input via a computing device. Skills may be configured to utilize the intent to output data for input to a text-to-speech component, a link or other resource locator for audio data, and/or a command to a device, such as the voice interface device 102.

In instances where a voice interface device 102 is utilized, skills may extend the functionality of smart devices that can be controlled by users utilizing a voice-user interface. In some examples, skills may be a type of application that may be useable in association with smart devices and may have been developed specifically to work in connection with given smart devices. Additionally, skills may be a type of application that may be useable in association with an electronic device and may have been developed specifically to provide given functionality to the electronic device. In examples, a non-skill application may be an application that does not include the functionality of a skill. Speechlets, as described herein, may be a type of application that may be usable in association with electronic devices and may have been developed specifically to work in connection voice interfaces of with electronic devices. The application(s) may be configured to cause processor(s) to receive information associated with interactions with the voice interface device 102. The application(s) may also be utilized, in examples, to receive input, such as from a user of the mobile device 104, and send data and/or instructions associated with the input to one or more other devices.

The components of the system 106 are described in detail below. In examples, some or each of the components of the system 106 may include their own processor(s), network interface(s), and/or memory. As such, by way of example, the speech processing system 138 may include and/or be associated with processor(s), network interface(s), and/or memory. The account-association component 144 may include and/or be associated with different processor(s), network interface(s), and/or memory, or one or more of these components may utilize some or all of the same processor(s), network interface(s), and/or memory utilized by the speech processing system 138. These components are described in detail below. Additionally, the operations and/or functionalities associated with and/or described with respect to the components of the system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The components of the system 106 as outlined above will now be described with reference to several examples. It should be understood that the examples provided herein are for illustration and should not be construed as a limitation of this disclosure. In examples, a first user may travel to an environment, such as a home, of a second user's devices and may desire to utilize the second user's devices to access the music services, news services, and/or to operate smart devices associated with the first user's account. To do so, the voice interface devices associated with the second user's account may be associated with the first user's account data such that the first user profile may utilize the interface devices of the second user's account to perform one or more actions. This account data association with voice interface devices may include the first user, which may be described herein as the "secondary user," setting up secondary account functionality, such as by utilizing the application 136 residing on and/or accessible by the mobile device 104 associated with the secondary account user. Setting up account-association functionality may include, for example, providing input corresponding to an identifier of the mobile device 104, such as a phone number associated with the mobile device 104, and initiating voice-profile training operations that may allow the system 106 associated with the voice interface device 102 to generate a voice profile associated with the secondary account user. The voice-profile training operations may include presenting instructions for the user to provide user utterances that may be captured by microphones 128 of the mobile device 104. The user utterances may be specific phrases that may be utilized to acquire distinctive characteristics of the user's voice. Corresponding audio data may be generated and may be sent to the system 106, which may analyze the audio data to determine the distinctive characteristics of the user's voice. The characteristics may include, for example, speech phrasing, emphasis, timing, voice intensity, etc.

The second user, which may be described herein as the "host user," may also set up the ability to associated account data with his or her voice interface devices utilizing an instance of the voice interface device application 136 residing on and/or accessible to a mobile device associated with the second user account. For example, the second user may provide input to the mobile device indicating a request to enable secondary account access on voice interface devices associated with the second user's account. This indication may represent consent of the second user to perform the operations described herein. Once secondary account access has been set up by the secondary account user account and the primary user account, the voice interface devices 102 and the speech processing system 138 may be configured to associate the secondary user account data with the primary interface devices.

For example, a presence event may be determined with respect to one or more primary devices, which may be described in FIG. 1 as voice interface devices 102 but may include devices that do not include a voice interface. The presence event may include, for example, the one or more primary devices receiving a signal from the secondary device. The signal may include data such as a device identifier of the secondary device and/or a secondary account identifier of the first user account data. For example, the first user may have installed on the secondary device an application 136 associated with the system 106 and/or the first user's devices. To operate the first user's devices, the first user may have provided user input to the application 136 for creating the first account data. When the signal is sent from the secondary device, the application 136 may cause the wireless signal to include the secondary account identifier associated with the first account data, as well as the device identifier of the secondary device. In examples, the signal may be a Bluetooth signal, Bluetooth Low Energy signal.

The primary device may receive the signal, such as via the beacon component 120, and may send, to the system 106, data representing the secondary account identifier for the secondary device as well as a primary account identifier for the second account data associated with the primary device. The event component 142 may receive the data from the primary device and may utilize that data to determine whether a presence event has occurred. Determination of the presence data may be based solely on receipt of the signal from the secondary device. In other examples, one or more other signals may be utilized for determining that a presence event has occurred. For example, the other signals may include detection of user speech at the primary device, detection of sounds indicative of movement, image data processing indicating presence of a person, device usage data, scheduling data, and/or any other type of data indicative of presence of a person and/or device in an environment associated with the primary device.

The account-association component 144 may receive event data from the event component 142 and may initiate a process of determining whether and/or how to establish an account-association session where the account data for the secondary device is temporarily or otherwise associated with the primary devices and/or primary account data. For example, the account-association component 144 may receive the event data and generate object data representing the secondary account identifier for the secondary device, the primary account identifier associated with the primary device, and/or other data associated with the devices and/or accounts at issue. This process may also include the decryption and/or deserialization of the event data and/or the data sent from the primary device to the system 106. Additionally, in instances where the identifier information associated with the event data is associated with identifiers that are not associated with the system 106, such identifier information may be utilized to determine which secondary account identifier(s) and/or primary account identifier(s), as stored by the system 106, correspond to the identifier information associated with the event data. Additionally, metadata useful for analyzing account-association sessions may also be generated. For example, presence event timing information, signal strength information, user preferences, etc. may be applicable for the operations described herein and that data may be generated and associated with the presence event.

Thereafter, the account-association component 144 may generate a primary account identifier map associated with the presence event. For example, more than one primary device may have received the signal from the secondary device, and in these examples multiple presence events may be detected and/or the single presence event may indicate that multiple primary devices are in proximity to the secondary device. In some examples, each of the primary devices may be associated with the same primary account identifier, such as when the primary devices are all associated with the same account data. This may occur when the primary devices at issue are all devices in the same single-family household. In other examples, such as when primary devices are in an apartment complex, dormitory, multi-family home, and/or other examples where at least one of the multiple primary devices is associated with account data that differs from account data associated with other primary devices in a given environment, the account-association component 144 may generate a primary account identifier map indicating these primary account identifiers and/or information about the primary devices associated with the primary account identifiers, such as which primary account identifiers are associated with primary devices that are within a threshold distance of the secondary device, such as within a few feet of the secondary device, and which primary account identifiers are associated with primary devices that are not within the threshold distance but are still receiving the signal from the secondary device.

The account-association component 144 may then perform one or more filtering operations. For example, the account-association component 144 may determine whether one or more of the primary account identifiers correspond to the secondary account identifier from the secondary device. When a given primary account identifier corresponds to the secondary account identifier from the secondary device, this may indicate that the presence event is associated with the secondary device being in the secondary user's own home or otherwise that the secondary device is interacting with devices that are associated with the secondary user. In this example where the secondary device is not considered associated with another environment for temporary connection to primary devices, the presence event and/or the given primary account identifier when multiple primary account identifiers are determined, may be discarded. Additionally, in examples, the secondary account identifier and/or the primary account identifier may be missing from the data utilized by the system. This may result when the secondary device and/or the primary device is not configured to send some or all of the data described herein. In these examples, the presence event may be discarded. Additionally, when the event component 142 detects a presence event, the event component 142 may, in examples, determine a type of presence event that has occurred, such as a user speaking, a user entering an environment, a user exiting an environment, etc. However, in some examples, the event component 142 may determine that a presence event occurred but may not have determined a type of the presence event, and/or may not have determined the type of presence event to a threshold confidence level. In these examples, the event data from the event component 142 may indicate that the presence event is associated with an unknown event type and the presence event may be discarded by the account-association component 144. Additionally, in examples where multiple primary devices receive the wireless signal, duplicate secondary account identifiers associated with a given presence event may be identified. These duplicate secondary account identifiers may be deduplicated.

The account-association component 144 may also utilize user preference information to determine whether the account-association session processes described herein should continue for a given secondary device. For example, when the primary account user authorizes account-association functionality on one or more of the user's devices, the user may identify one or more secondary users and/or secondary account identifiers that are prohibited from being associated with the primary device(s). In other examples, user input from the primary account user prohibiting certain secondary users and/or secondary account identifiers may be received at some time after setting up account-association functionality. In these and other examples, preference data may be stored in association with the primary account data indicating which secondary users and/or secondary account identifiers are prohibited from being associated with the primary devices. If the presence event at issue is associated with a prohibited secondary account identifier, the system 100 may refrain from associating the secondary account data with the primary devices.

The account-association component 144 may then send the resulting data to the session manager 146, which may be configured to determine a type of account-association session associated with the secondary account identifier and to determine how to proceed with the given presence event. For example, the session manager 146 may query the session database 148 for an indication of whether the secondary account identifier from the presence event is associated with an active account-association session, a pending account-association session, and/or is not associated with a current account-association session. By way of example, if the secondary account data, at the time of the presence event, is already associated with a primary device, the session manager 146 may determine that the secondary account identifier is associated with an active account-association session. In other examples, if a notification for establishing an account-association session has been sent to the secondary device but user input data accepting the notification has not yet been received, the session manager 146 may determine that the secondary account identifier is associated with a pending account-association session. In other examples, if the session database 148 returns results indicating that the secondary account identifier is not associated with an active account-association session or a pending account-association session, the session manager 146 may determine that the secondary account identifier is not currently associated with an account-association session. The session manager 146 may return data indicating the account-association session status for the secondary account identifier.

The account-association component 144 may then be configured to utilize the account-association session status to determine what processes to take in association with the presence event. For example, when the session status is indicated as an active account-association session, the account-association component 144 may determine whether an end presence event is occurring, or otherwise that the secondary user is no longer present in association with the primary device(s). In these examples, the account-association component 144 may query the system 106 for primary account identifier maps associated with the presence event and/or other presence events associated with other devices associated with the primary account data. If the primary account identifier maps indicate that the primary account identifier is still associated with the presence event, this may indicate that while a presence event has occurred, the secondary device is still in proximity to the primary device. In these examples, the presence event may be discarded and the association between the secondary account data and the primary device(s) may be maintained. If the primary account identifier maps indicate that the primary account identifier is not still associated with the presence event, this may indicate that the presence event is associated with the secondary user leaving the environment. In these examples, the secondary account data may be dissociated from the primary device(s) such that functionality associated with the secondary account data may not be utilized by the primary device(s).

In examples where the account-association session status is indicated as a pending account-association session, the account-association component 144 may determine whether a start presence event is occurring, or otherwise that a secondary user has moved into proximity of the primary device(s). In these examples, the account-association component 144 may query the system 106 for primary account identifier maps associated with the presence event and/or other presence events associated with other devices associated with the primary account data. If the primary account identifier maps indicate that the primary account identifier is still associated with the presence event, this may indicate that while a presence event has occurred, the secondary device is still in proximity to the primary device. In these examples, the account-association component 144 may maintain the pending status of the account-association session and/or may extend a time period for which the pending account-association session is valid. When the primary account identifier maps indicate that the primary account identifier is not still associated with the presence event, the account-association component 144 may treat the pending account-association session as if no account-association session was associated with the secondary account identifier.

In these examples, and/or examples where the session status data received from the session manager 146 indicates no account-association session associated with the secondary account identifier, the account-association component 144 may initiate primary account identifier selection for establishing an account-association session. In these examples, the account-association component 144 may determine whether a primary account identifier for the presence event corresponds to a remembered location identifier. For example, if the presence event is associated with the first time a secondary device connects to a given primary device, then the primary account identifier will not correspond to a remembered location identifier. However, if the secondary account data has been previously associated with the primary device as part of an account-association session, the primary account identifier may correspond to a remembered location identifier. In these examples, the account-association component 144 may cause the secondary account data to be associated with the primary device(s), such as without sending notification data requesting user input confirming that the association should be established. It should be understood that determining whether a given primary account identifier represents a remembered location identifier may be based at least in part on data indicating whether the primary account identifier is associated with a remembered location for the secondary account. In some examples, even when the secondary account data has been previously associated with a primary device, the secondary user and/or primary user may have discarded this previous association and/or requested that no such association be saved in connection with the system.

When the secondary account identifier does not correspond to a remembered location identifier, the account-association component 144 may determine a number of primary account identifiers for the primary devices associated with the presence event that are within a threshold distance of the secondary device. For example, the threshold distance may be a few feet from the secondary device. When only one primary account identifier is associated with the presence event at this distance threshold, that primary account identifier may be selected as the primary account identifier for establishing an account-association session. When two primary account identifiers are associated with the presence event at the distance threshold, this may indicate that primary account identifiers are associated with the same environment, and the account-association component 144 may randomly select one of the primary account identifiers. When zero or more than two primary account identifiers are detected, the number of primary account identifiers associated with primary devices outside of the threshold distance but still receiving the wireless signal from the secondary device may be determined. When the number of primary account identifiers associated with the presence event outside the threshold distance is zero or more than one, the process may end and the secondary account data may not be associated with any of the primary devices. When the number of primary account identifiers associated with the presence event outside the threshold distance is one, that primary account identifier may be selected.

Once a primary account identifier is selected as described herein, the notification component 152 may generate and send a notification to the secondary device and/or to another device associated with the secondary account data. The notification may request user input confirming that the secondary account data should be associated with the primary device(s). In examples where user input data is received that provides the confirmation, the secondary account data may be associated with the primary device(s). When no user input data is received, the account-association session may be maintained as a pending account-association session by the session database. When the user input data rejects the notification, the system 106 may refrain from associating the secondary account data with the primary device(s).

When secondary account data is associated with the primary device(s) as an account-association session, functionality available to the secondary account data may be utilized by the primary device(s). For example, applications, abilities, and/or user preferences associated with the secondary account data may be available to the primary device(s), such as for responding to user voice commands. By way of example, a given primary device may receive audio representing user voice input. Audio data corresponding to the audio may be generated and speech processing may be performed to determine how to respond to the user voice input. The speech processing may include determining a device identifier associated with the primary device that received the voice input. The speech processing system 138 may query the session database 148 and/or one or more other components of the system 106 for an indication of whether an active account-association session is currently associated with the primary device. When an active account-association session is currently associated with the primary device, the speech processing system 138 may perform one or more speaker identification processes to determine whether the user that provided the voice input is the secondary user or another user. Speaker identification will be described in more detail below. When the speaker identification processes result in an indication that the voice input was received from the secondary user, the speech processing system 138 may utilize the secondary account data for determining what actions to take in response to the voice input. For example, the actions may include accessing one or more applications and/or skills associated with the secondary account data, providing information unique to the secondary account data, etc. When the speaker identification processes result in an indication that the voice input was not received from the secondary user, the speech processing system 138 may utilize the primary account data for determining what actions to take in response to the voice input.

For example, the account-association component 144 may query an audio cache for the audio data representing one or more of the user utterances provided by the secondary user. The account-association component 144 may then use the ASR component 154 perform an analysis of the audio data corresponding to the secondary user's voice to determine if a voice profile associated with the audio data corresponds to the reference voice profile of the secondary user that was generated as part of the account-association setup process. The ASR component 154 may compare the characteristics of the audio data with the characteristics of the reference voice profile to determine whether the characteristics correspond to each other, such as to a threshold degree of confidence.

The generation of voice profiles and comparison of user utterances to voice profiles may be performed in multiple ways. For example, the system 106 may determine speech characteristics representing user input. The system 106 may cluster user inputs associated with similar speech characteristics. For example, a single user may speak various inputs to a device(s) after the system receives permission to generate voice profiles for one or more users that interact with the device(s). Even though the user's inputs may be substantively different (e.g., may request the system 106 perform different actions), the different inputs of the user may have similar or identifying speech characteristics (e.g., pitch, tone, etc.). Thus, when the system generates a voice profile, otherwise described herein as a voice profile, by clustering the user inputs having the same or similar speech characteristics, the system is effectively generating a voice profile specific to a user even though the system 106 does not know which user provided the inputs. This type of voice profile may be referred to as an anonymous voice profile as it is not associated with a user identifier representing a known user to the system.

The system 106 may use clustering techniques to update voice profiles over time. When the system 106 receives audio data representing a spoken user input, the system 106 may store the audio data along with a user identifier, which may represent a user that spoke the input, and/or a device identifier, which may represent a device that captured the input. Periodically, the system 106 may recall, from storage, audio data, such as that representing previous user inputs, associated with a particular user identifier, device identifier, group of user identifiers, which may be associated with a same household or communal profile, or group of device identifiers, which may be associated with a same household profile.

The system 106 may identify clusters of the audio data, with each cluster including similar or identical speech characteristics. The system may determine a cluster is substantially similar to an existing explicit or anonymous voice profile. If this occurs, the system may add the cluster of audio data to the similar explicit or anonymous voice profile. Adding the cluster to the existing voice profile effectively updates the existing voice profile to account for changed speech characteristics of the user represented in the cluster of audio data.

In addition to or instead of performing clustering to determine whether audio data representing user inputs is similar to an existing voice profile, the system may leverage various context signals to label specific audio data as being associated with a particular user identifier and by extension a particular existing voice profile. For example, when a user speaks a user input, the system 106 may not be confident in recognizing the user's speech. After the user speaks the user input, the user may further interact with the system 106 to provide the system 106 with further information needed to perform an action responsive to the user input. Such further information may include non-spoken user verification information, such as user login information to a particular service of the system 106, etc. Based on such user verification information, the system 106 may label the previously spoken user input to indicate it originated from the particular user. For example, the system 106 may associate audio data, representing the previous spoken user input, with a user identifier corresponding to the user.

System usage history may also or alternatively be used to retroactively associate audio data, representing a spoken user input, with a particular user. For example, a user may speak a user input requesting the output of a particular type of music. The system 106 may maintain a record of user inputs received with respect to a group of user identifiers. The system 106 may process the record of previous user inputs to identify patterns, such as which user identifiers are routinely associated with requests for particular types of music. For example, the system 106 may identify that a first user identifier of the group profile routinely requests the output of jazz music, a second user identifier of the group profile routinely requests the output of classical music, etc. Based on the identified patterns, the system 106 may determine it is likely that the current user input was spoken by a particular user, and may associate audio data (representing the user input) with the user's user identifier.

The ASR component 154 may perform user recognition using various data including user recognition feature vector data, feature vectors representing explicit and/or anonymous voice profiles, ASR confidence data, and/or other data. While details on user recognition are provided here with respect to FIG. 1, additional details on user recognition are described below with respect to FIGS. 10-13. Additionally, when the ASR component 154 is described as performing user recognition, the same or similar functionality may be performed by the user recognition engine described more fully with respect to FIGS. 8 and 10-12. The ASR component 154 may output the user recognition data, which reflects a certain confidence that the user input was spoken by one or more particular users. The user recognition data may include one or more user identifiers (e.g., corresponding to one or more explicit voice profiles and/or one or more anonymous voice profiles). Each user identifier in the user recognition data may be associated with a respective confidence value, representing a likelihood that the user input corresponds to the user identifier. A confidence value may be a numeric or binned value.

The feature vector(s) input to the ASR component 154 may correspond to one or more anonymous voice profiles and/or one or more explicit voice profiles. The ASR component 154 may use the feature vector(s) to compare against a user recognition feature vector, representing the present user input, to determine whether the user recognition feature vector corresponds to one or more of the feature vectors of the anonymous and/or explicit voice profiles.

Each feature vector may be the same size as the user recognition feature vector. For example, if the user recognition feature vector is of size F (for example encoded by an encoder), a feature vector may also be of size F.

To perform user recognition, the ASR component 154 may determine the device from which the audio data originated. For example, the audio data may be associated with metadata including a device identifier representing the device. Either the device or the system 106 may generate the metadata. The system(s) 106 may determine a group profile identifier associated with the device identifier, may determine user identifiers associated with the group profile identifier, and may include the group profile identifier and/or the user identifiers in the metadata. In other examples, the account-association component 144 may provide a candidate list of profile identifiers based at least in part on an account-association session being active with respect to the voice interface device 102 in question. The system(s) 106 may associate the metadata with the user recognition feature vector produced from the audio data. The ASR component 154 may send a signal to voice profile storage, with the signal requesting only audio data and/or feature vectors (depending on whether audio data and/or corresponding feature vectors are stored) associated with the device identifier, the group profile identifier, and/or the user identifiers represented in the metadata. This limits the universe of possible feature vectors the ASR component 154 considers at runtime and thus decreases the amount of time to perform user recognition processing by decreasing the amount of feature vectors needed to be processed. Alternatively, the ASR component 154 may access all (or some other subset of) the audio data and/or feature vectors available to the ASR component 154. However, accessing all audio data and/or feature vectors will likely increase the amount of time needed to perform user recognition processing based on the magnitude of audio data and/or feature vectors to be processed.

If the ASR component 154 receives audio data from the voice profile storage, the ASR component 154 may generate one or more feature vectors corresponding to the received audio data.

The ASR component 154 may attempt to identify the user that spoke the speech represented in the audio data by comparing the user recognition feature vector to the reference feature vector(s). The ASR component 154 may include a scoring component that determines respective scores indicating whether the user input (represented by the user recognition feature vector) was spoken by one or more particular users (represented by the reference feature vector(s)). The ASR component 154 may also include a confidence component that determines an overall accuracy of user recognition processing (such as those of the scoring component) and/or an individual confidence value with respect to each user potentially identified by the scoring component. The output from the scoring component may include a different confidence value for each received feature vector. For example, the output may include a first confidence value for a first feature vector (representing a first anonymous or explicit voice profile), a second confidence value for a second feature vector (representing a second anonymous or explicit voice profile), etc.

The scoring component and the confidence component may implement one or more trained machine learning models (such neural networks, classifiers, etc.). For example, the scoring component may use probabilistic linear discriminant analysis (PLDA) techniques. PLDA scoring determines how likely it is that the user recognition feature vector corresponds to a particular reference feature vector. The PLDA scoring may generate a confidence value for each reference feature vector considered and may output a list of confidence values associated with respective user identifiers, anonymous voice profile identifiers, and/or explicit voice profile identifiers. The scoring component may also use other techniques, such as GMMs, generative Bayesian models, or the like, to determine confidence values.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The user registry component 140 may be configured to identify, determine, and/or generate associations between users, user accounts, and/or devices. For example, one or more associations between user accounts may be identified, determined, and/or generated by the user registry 140. The user registry 140 may additionally store information indicating one or more applications and/or resources accessible to and/or enabled for a given user account. Additionally, the user registry 140 may include information indicating device identifiers, such as naming identifiers, associated with a given user account, as well as device types associated with the device identifiers. The user registry 140 may also include information indicating user account identifiers, naming indicators of devices associated with user accounts, and/or associations between devices, such as the voice interface device 102. The user registry 140 may also include information associated with usage of the smart devices and/or the voice interface devices. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

As shown in FIG. 1, several of the components of the system 106 and the associated functionality of those components as described herein may be performed by the voice interface device 102 and/or the mobile device 104. Additionally, or alternatively, some or all of the components and/or functionalities associated with the voice interface device 102 and/or the mobile device 104 may be performed by the system 106.

It should be noted that the exchange of data and/or information as described herein, and/or the performance of operations as described herein, may be performed only in situations where a user has provided consent for the exchange of such information and/or performance of such operations. For example, upon setup of devices and/or initiation of applications, a user may be provided with the opportunity to opt in and/or opt out of data exchanges between devices and/or with the polling system and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110, 122 and/or the processor(s) described with respect to the components of the system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110, 122, and/or the processor(s) described with respect to the components of the system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110, 122, and/or the processor(s) described with respect to the components of the system 106 may possess its own local memory, which also may store program components, program data, and/or one or more operating systems.

The memory 114, 126, and/or the memory described with respect to the components of the system 106 may include volatile and nonvolatile memory, removable and non-removable media implemented in any method or technology for storage of information, such as computer-readable instructions, data structures, program component, or other data. Such memory 114, 126, and/or the memory described with respect to the components of the system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114, 126, and/or the memory described with respect to the components of the system 106 may be implemented as computer-readable storage media ("CRSM"), which may be any available physical media accessible by the processor(s) 110, 122, and/or the processor(s) described with respect to the remote system 106 to execute instructions stored on the memory 114, 126, and/or the memory described with respect to the components of the system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114, 126, and/or the memory described with respect to the components of the system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 112, 124, and/or the network interface(s) described with respect to the components of the system 106 may enable messages between the components and/or devices shown in system 100 and/or with one or more other polling systems, as well as other networked devices. Such network interface(s) 112, 124, and/or the network interface(s) described with respect to the components of the system 106 may include one or more network interface controllers (NICs) or other types of transceiver devices to send and receive messages over the network 108.

For instance, each of the network interface(s) 112, 124, and/or the network interface(s) described with respect to the components of the system 106 may include a personal area network (PAN) component to enable messages over one or more message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112, 124, and/or the network interface(s) described with respect to the components of the system 106 may include a wide area network (WAN) component to enable message over a wide area network.

In some instances, the system 106 may be local to an environment associated the voice interface devices 102. For instance, the system 106 may be located within one or more of the voice interface devices 102. In some instances, some or all of the functionality of the system 106 may be performed by one or more of the voice interface devices 102. Also, while various components of the system 106 have been labeled and named in this disclosure and each component has been described as being configured to cause the processor(s) to perform certain operations, it should be understood that the described operations may be performed by some or all of the components and/or other components not specifically illustrated.

Figure 2A:
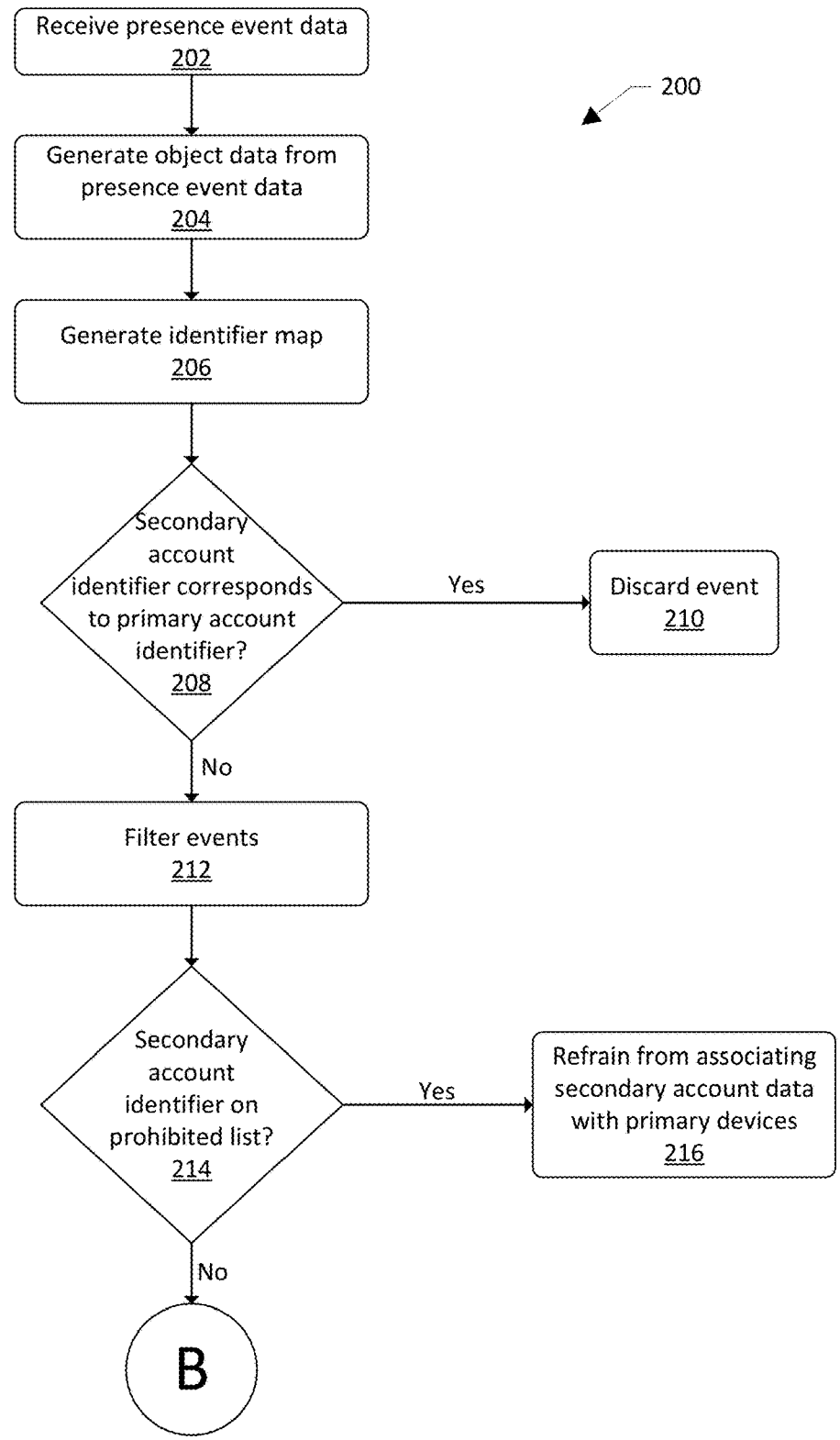
FIG. 2A illustrates a flow diagram of an example process for determining identifiers associated with a presence event.
Figure 2B:
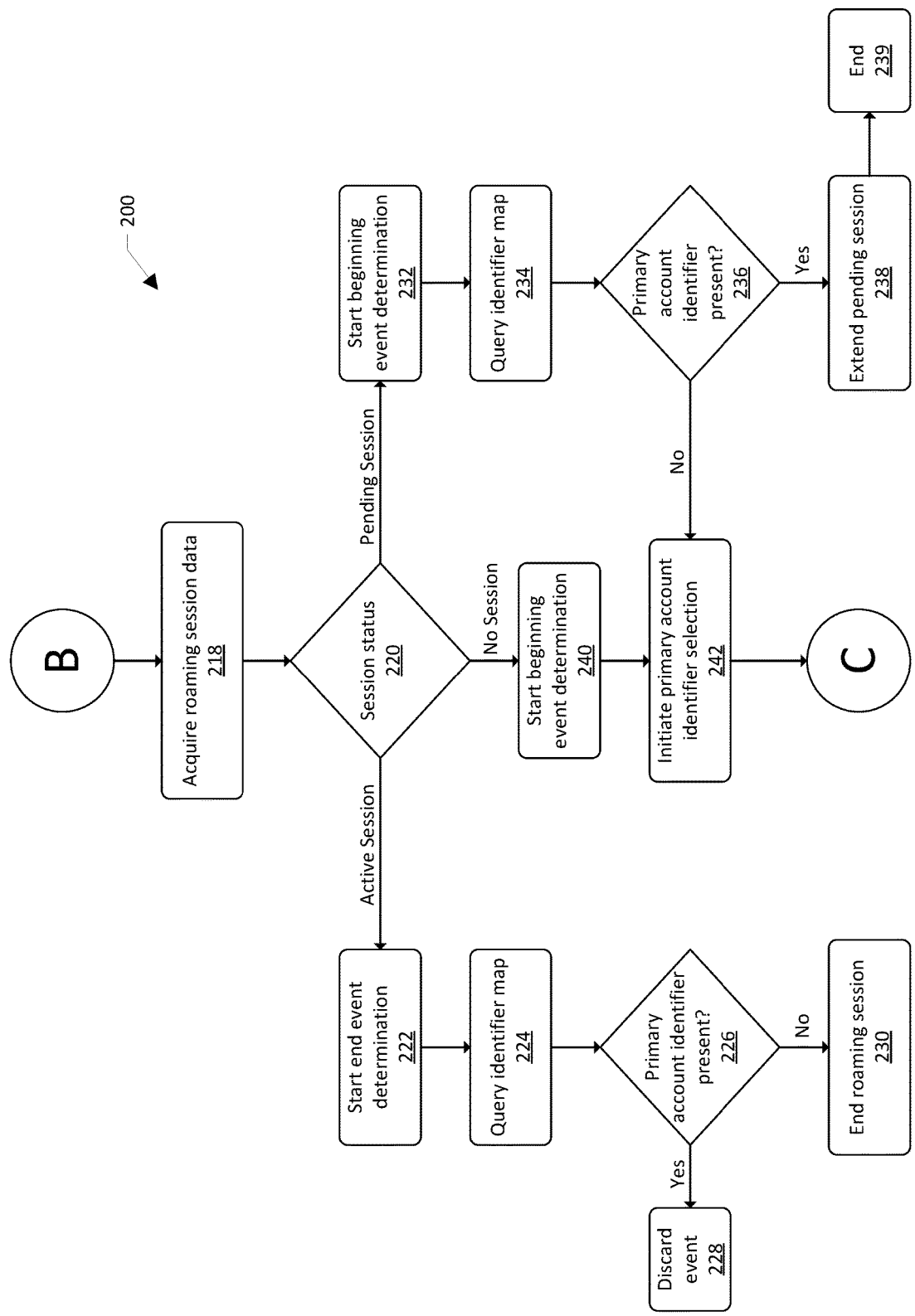
FIG. 2B illustrates a flow diagram of an example process for determining if a presence event is a start or end event associated with an account-association session.
Figure 2C:
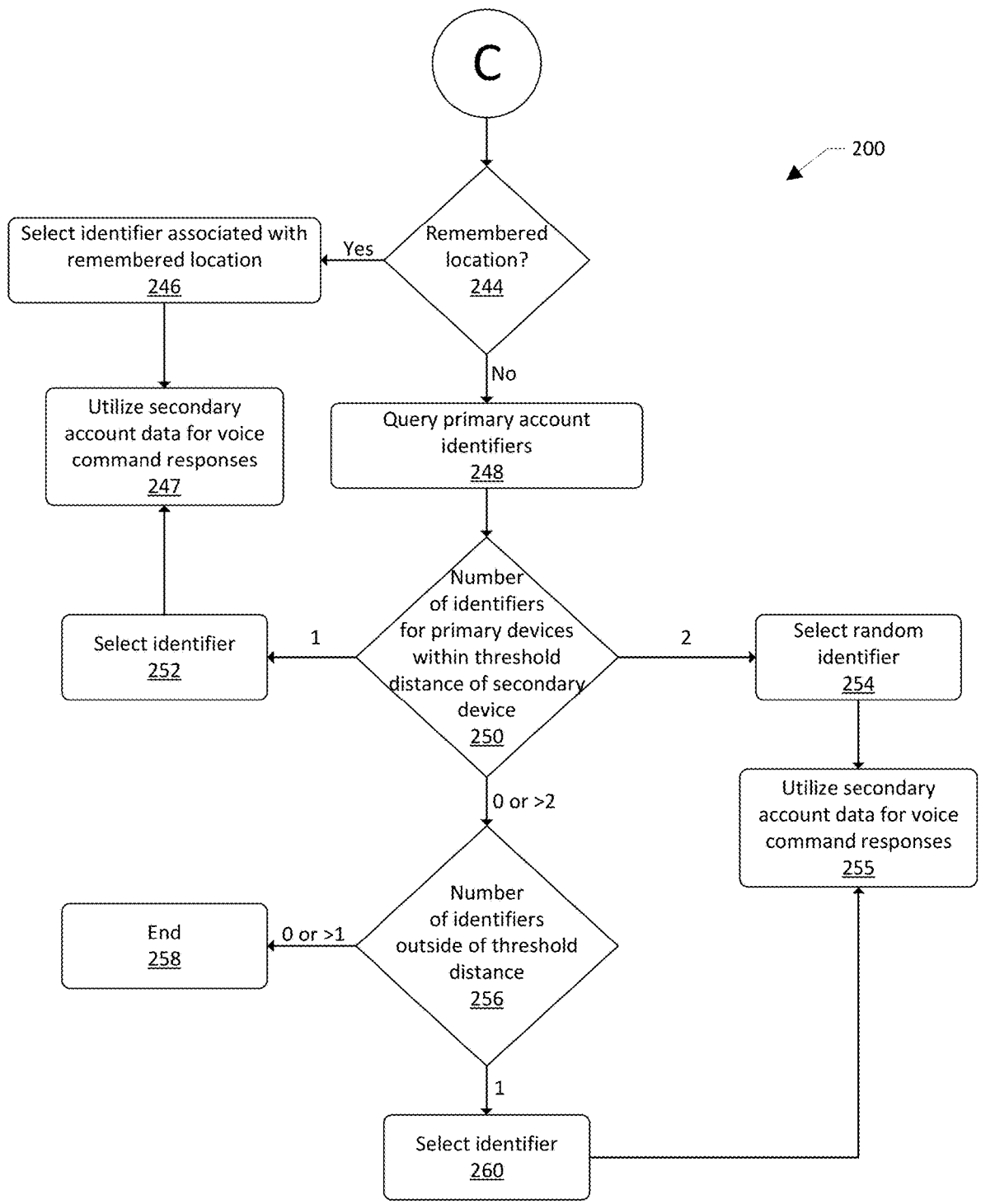
FIG. 2C illustrates a flow diagram of an example process for selecting an identifier to associate with an account-association session.

FIGS. 2A-2C illustrates processes for presence-based account data association with devices. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted.

Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1 and 3A-12, although the processes may be implemented in a wide variety of other environments, architectures and systems.

FIG. 2A illustrates a flow diagram of an example process 200 for determining secondary user identifiers and primary account identifiers associated with a presence event. The order in which the operations or steps are described is not intended to be construed as a limitation, and any number of the described operations may be combined in any order and/or in parallel to implement process 200.

At block 202, the process 200 may include receiving presence event data. For example, an event component of the system may receive the data from the primary device and may utilize that data to determine whether a presence event has occurred. Determination of the presence data may be based solely on receipt of the signal from the secondary device. In other examples, one or more other signals may be utilized for determining that a presence event has occurred. For example, the other signals may include detection of user speech at the primary device, detection of sounds indicative of movement, image data processing indicating presence of a person, device usage data, scheduling data, and/or any other type of data indicative of presence of a person and/or device in an environment associated with the primary device.

At block 204, the process 200 may include generating object data from the presence event data. For example, an account-association component of the system may receive event data from the event component and may initiate a process of determining whether and/or how to establish an account-association session where the account data for the secondary device is temporarily or otherwise associated with the primary devices and/or primary account data. For example, the account-association component may receive the event data and may generate object data representing the secondary account identifier for the secondary device, the primary account identifier associated with the primary device, and/or other data associated with the devices and/or accounts at issue. For example, the event data may indicate a type of presence event detected, a device identifier associated with the device involved in the presence event (such as the device that received a signal from a secondary device), a device identifier of a secondary device involved in the presence event, etc. To generate the object data, the account-association component may determine which portions of the event data correspond to the device identifier of the secondary device, the device identifier of the primary device, and/or data representing timing information about the presence event. The device identifier of the secondary device may be utilized to determine the secondary account identifier, and the device identifier of the primary device may be utilized to determine the primary account identifier. This process may also include the decryption and/or deserialization of the event data and/or the data sent from the primary device to the system. For example, when this data is sent from the primary device to the system for processing, it may be encrypted and/or serialized to protect the information from being viewed and/or utilized by a nefarious actor. When the data is received at the system, the data may be decrypted and/or deserialized utilizing predesignated decryption and/or deserialization techniques, such as by utilizing security tokens. Additionally, in instances where the identifier information associated with the event data is associated with identifiers that are not associated with the system, such identifier information may be utilized to determine which secondary account identifier(s) and/or primary account identifier(s), as stored by the system, correspond to the identifier information associated with the event data. Additionally, metadata useful for analyzing account-association sessions may also be generated. For example, presence event timing information, signal strength information, user preferences, etc. may be applicable for the operations described herein and that data may be generated and associated with the presence event. This metadata may be generated utilizing the timing and/or signal strength data received as part of the event data.

At block 206, the process 200 may include generating a primary account identifier map. For example, more than one primary device may have received the signal from the secondary device, and in these examples multiple presence events may be detected and/or the single presence event may indicate that multiple primary devices are in proximity to the secondary device. In some examples, each of the primary devices may be associated with the same primary account identifier, such as when the primary devices are all associated with the same account data. This may occur when the primary devices at issue are all devices in the same single-family household. In other examples, such as when primary devices are in an apartment complex, dormitory, multi-family home, and/or other examples where at least one of the multiple primary devices is associated with account data that differs from account data associated with other primary devices in a given environment, the account-association component may generate a primary account identifier map indicating these primary account identifiers and/or information about the primary devices associated with the primary account identifiers, such as which primary account identifiers are associated with primary devices that are within a threshold distance of the secondary device, such as within a few feet of the secondary device, and which primary account identifiers are associated with primary devices that are not within the threshold distance but are still receiving the signal from the secondary device.

At block 208, the process 200 may include determining whether the secondary account identifier associated with the presence event corresponds to the primary account identifier associated with the presence event. For example, the account-association component may determine whether one or more of the primary account identifiers correspond to the secondary account identifier from the secondary device. When a given primary account identifier corresponds to the secondary account identifier from the secondary device, this may indicate that the presence event is associated with the secondary device being in the secondary user's home or otherwise that the secondary device is interacting with devices that are associated with the secondary user.

In examples where the secondary account identifier corresponds to the primary account identifier, the process 200 may include, at block 210, discarding the event. In these examples, no changes to account-association session may be made based on the presence event.

In examples where the secondary account identifier does not correspond to the primary account identifier, the process 200 may include, at block 212, filtering events associated with the secondary account identifier. For example, the secondary account identifier and/or the primary account identifier may be missing from the data utilized by the system. This may result when the secondary device and/or the primary device is not configured to send some or all of the data described herein. In these examples, the presence event may be discarded. Additionally, when the event component detects a presence event, the event component may, in examples, determine a type of presence event that has occurred, such as a user speaking, a user entering an environment, a user exiting an environment, etc. However, in some examples, the event component may determine that a presence event occurred but may not have determined a type of the presence event, and/or may not have determined the type of presence event to a threshold confidence level. In these examples, the event data from the event component may indicate that the presence event is associated with an unknown event type and the presence event may be discarded by the account-association component. Additionally, in examples where multiple primary devices receive the wireless signal, duplicate secondary account identifiers associated with a given presence event may be identified. These duplicate secondary account identifiers may be deduplicated.

At block 214, the process 200 may include determining whether the secondary account identifier is associated with a prohibited list for the primary device. For example, the account-association component may also utilize user preference information to determine whether the account-association session processes described herein should continue for a given secondary device. For example, when the primary account user authorizes account-association functionality on one or more of the user's devices, the user may identify one or more secondary users and/or secondary account identifiers that are prohibited from being associated with the primary device(s). In other examples, user input from the primary account user prohibiting certain secondary users and/or secondary account identifiers may be received at some time after setting up account-association functionality. In these and other examples, preference data may be stored in association with the primary account data indicating which secondary users and/or secondary account identifiers are prohibited from being associated with the primary devices.

In examples where the secondary account identifier is associated with the prohibited list, the process 200 may include, at block 216, refraining from associating the secondary account data with the primary device(s). For example, if the presence event at issue is associated with a prohibited secondary account identifier, the system may refrain from associating the secondary account data with the primary devices.

In examples where the secondary account identifier is not associated with the prohibited list, the process 200 may continue to FIG. 2B.

FIG. 2B illustrates a flow diagram of the example process 200 for determining if a presence event is a start or end event associated with an account-association session. The order in which the operations or steps are described is not intended to be construed as a limitation, and any number of the described operations may be combined in any order and/or in parallel to implement process 200.

At block 218, the process 200 may include acquiring account-association session data. For example, a session manager may query a session database for an indication of whether the secondary account identifier from the presence event is associated with an active account-association session, a pending account-association session, and/or is not associated with a current account-association session.

At block 220, the process 200 may include determining whether the account-association session data indicates that the secondary account identifier is associated with an active account-association session, a pending account-association session, or a lack of an account-association session. By way of example, if the secondary account data, at the time of the presence event, is already associated with a primary device, the session manager may determine that the secondary account identifier is associated with an active account-association session. In other examples, if a notification for establishing an account-association session has been sent to the secondary device but user input data accepting the notification has not yet been received, the session manager may determine that the secondary account identifier is associated with a pending account-association session. In other examples, if the session database returns results indicating that the secondary account identifier is not associated with an active account-association session or a pending account-association session, the session manager may determine that the secondary account identifier is not currently associated with an account-association session. The session manager may return data indicating the account-association session status for the secondary account identifier.

In examples where the session data indicates that the secondary account identifier is associated with an active account-association session, the process 200 may include, at block 222, starting an end event determination process. For example, when the account-association session associated with the secondary account identifier is an active session, it may be beneficial to determine when the account-association session should end such that the secondary account data can be dissociated from the primary device(s). As such, an end event determination process may be initiated where the system may determine if the presence event indicates that the active account-association session should be ended.

At block 224, the process 200 may include querying the primary account identifier map associated with the secondary account identifier. The primary account identifier map may be similar to the primary account identifier map described above. The primary account identifier may include one or more primary account identifiers determined to be associated with the presence event at issue.

At block 226, the process 200 may include determining whether the primary account identifier is present. For example, the primary account identifier map may be queried to determine whether the primary account identifier associated with the active account-association session is included in the primary account identifier map.

In examples where the primary account identifier is present in the primary account identifier map, the process 200 may include, at block 228, discarding the presence event. In these examples, the presence event does not correspond to the secondary device leaving the environment, and as such, continuing to maintain the active account-association session is desirable. As such, the presence event may be discarded and no action may be taken with respect to the account-association session.

In examples where the primary account identifier is not present in the primary account identifier map, the process 200 may include, at block 230, ending the account-association session associated with the secondary account identifier and dissociating the secondary account data from the primary device(s). In these examples, the presence event corresponds to the secondary device leaving the environment, and as such, continuing to maintain the active account-association session is not desirable. As such, the account-association session may be ended and the secondary account data may be dissociated from the primary device(s).

Returning to block 220, in examples where the session data indicates that the secondary account identifier is associated with a pending account-association session, the process 200 may include, at block 232, starting a beginning event determination. In these examples, it may be desirable to determine whether the presence event indicates the secondary device is still present in the environment and if so whether to extend the duration of the pending account-association session.

At block 234, the process 200 may include querying the primary account identifier map. Querying the primary account identifier map may be performed in the same or a similar manner as described with respect to block 224.

At block 236, the process 200 may include determining whether the primary account identifier is included in the primary account identifier map. Determining whether the primary account identifier is included in the primary account identifier map may be performed in the same or a similar manner as described with respect to block 226.

In examples where the primary account identifier is included in the primary account identifier map, the process 200 may include, at block 238, extending the pending account-association session validity time. In these examples, the secondary device associated with the presence event may still be present in the environment such that the presence event is associated with the primary account identifier. As such, while the secondary user has not confirmed that an active account-association session should be commenced, the option to do so is still desirable because the secondary device is still in the environment. As such, the pending session duration may be extended to allow for more time for the secondary user to confirm that the secondary account data should be associated with the primary device(s). At block 239, the process 200 may end such that the system may refrain from establishing a new account-association session and/or ending the pending account-association session.

In examples where the primary account identifier is not included in the primary account identifier map, the process 200 may continue to block 242, described more fully below. In these examples, the presence event indicates the possibility of associating the secondary account data with a device, but not with the primary device(s) associated with the pending account-association session. As such, the pending account-association session may be ended and the presence event may be treated as an event associated with no account-association session.

Returning to block 220, in examples where the session data indicates a lack of an account-association session associated with the secondary account identifier, the process 200 may include, at block 240, starting a beginning event determination. This process may be performed in the same or a similar manner as described with respect to block 232.

At block 242, the process 200 may include initiating a primary account identifier selection process for determining which primary devices to associate with the secondary account data, which is described with respect to FIG. 2C below. For example, multiple primary devices may receive the signal transmitted from the secondary device. These primary devices may be associated with the same or different primary account identifiers, and a selection process for the primary account identifiers may be initiated.

FIG. 2C illustrates a flow diagram of the example process 200 for selecting a primary account identifier to associate with an account-association session. The order in which the operations or steps are described is not intended to be construed as a limitation, and any number of the described operations may be combined in any order and/or in parallel to implement process 200.

At block 244, the process 200 may include determining whether the primary account identifier corresponds to a remembered location identifier. For example, if the presence event is associated with the first time a secondary device connects to a given primary device, then the primary account identifier will not correspond to a remembered location identifier. However, if the secondary account data has been previously associated with the primary device as part of an account-association session, the primary account identifier may correspond to a remembered location identifier.

In examples where the primary account identifier corresponds to the remembered location identifier, the process 200 may include, at block 246, selecting the primary account identifier associated with the remembered location identifier for association of the secondary account data. In these examples, the system may refrain from sending a notification requesting user input to authorize the association between the secondary account data and the primary device(s).

At block 247, the process 200 may include utilizing the secondary account data for voice command responses. For example, when audio data is received from a device associated with an active account-association session, the speech processing system may determine intent data that corresponds to the audio data. The intent data may indicate a requested action to be performed and a "payload" indicating details about the action. Examples include "play my rock playlist," "order pepperoni pizza," "play Game A," etc. In these examples, the determined intent is to output audio, initiate a food order, and initiate a game, respectively. The payload in these examples is the "rock playlist," "pepperoni pizza," and "Game A." In each of these examples, the speech processing system may determine how to service these intents utilizing the secondary or primary account data. For example, the secondary account data may be associated with a "rock playlist," and the primary account data may also be associated with a different "rock playlist" or no "rock playlist" at all. By way of additional example, when placing orders, the secondary account data may be associated with given payment identifiers while the primary account data may be associated with different payment identifiers. Additionally, the secondary account data may have certain applications and/or skills enabled while the primary account data may have different applications and/or skills enabled. As such, when an active account-association session is associated with a device from which audio data was received, the speech processing system may determine whether the secondary account data and/or the primary account data is to be utilized.

In examples, speaker identification as described more fully below, may be utilized to determine whether the secondary user is the person that provided the voice input to the device in question. When the secondary user is the person that provided the voice input, the speech processing system may, before or after the intent data is determined, utilize the secondary account data to determine how to respond to the voice input. Utilizing the examples provided above, the secondary account data may be associated with certain applications, skills, payment identifiers, and/or enabled domains for responding to voice input. In the "play my rock playlist" example, audio streaming applications that have been enabled in association with the secondary account data may be queried to service the intent. The secondary account data may indicate that, for a given audio streaming application, a playlist was created and is identified as "rock." In this example, the audio streaming application may be selected for servicing the intent and the application may provide and/or permit audio data representing songs from the rock playlist to be sent to the device and to be output by the device. In the "order pepperoni pizza" example, enabled applications and/or skills that are configured to allow for ordering pizza may be queried to service the intent, and payment identifiers associated with the secondary account data may be utilized to pay for the order. In the "play Game A" example, an enabled application and/or skill associated with Game A may be queried to service the intent.

In examples where the speaker identification processes described herein does not determine that the secondary user is the person that provided the voice input, or in other words that the person that provided the voice input is the primary account user and/or another user and/or is the secondary user but was not determined to be the secondary user to a threshold confidence level, the primary account data may be utilized to respond to the voice input. By so doing, the speech processing system allows for functionality of the secondary account to be utilized when the secondary user is the speaker, and the speech processing system allows for functionality of the primary account to be utilized when the secondary user is not the speaker. This may prevent and/or hinder the use of the secondary account data by unauthorized users.

In other examples, selection of the secondary account data or the primary account data for responding to a given voice command may be based at least in part on which account is configured to service the intent. For example, if the secondary account data indicates that an audio streaming application is enabled but the primary account data does not have an audio streaming application enabled, the secondary account data may be selected when the voice command is to output music. Additionally, even when both the secondary account data and the primary account data have applications and/or skills enabled to respond to a given voice command, the details of the voice command itself may be utilized to determine which account to utilize. For example, even if both accounts have an audio streaming application enabled, if the secondary account data includes a "rock playlist" but the primary account data does not include a playlist identified as "rock playlist," the secondary account data may be selected to service the intent of "play my rock playlist."

In examples where the primary account identifier does not correspond to a remembered location identifier, the process 200 may include, at block 248, querying primary account identifiers associated with the presence event. The primary account identifiers may be associated with the one or more primary devices that received the signal from the secondary device.

At block 250, the process 200 may include determining a number of primary account identifiers for primary devices within a threshold distance of the secondary device. For example, the threshold distance may be a few feet from the secondary device. In these examples, the system may determine a number of primary devices that are in close proximity to the secondary device.

In examples where the number of the primary account identifiers for primary devices within the threshold distance is exactly one, the process 200 may include, at block 252, selecting that primary account identifier. The secondary account data may then be associated with the primary device(s) associated with the primary account identifier in an active account-association session and/or a pending account-association session. The process may then proceed to block 247, where the secondary account data may be utilized for voice command responses as described above.

In examples where the number of the primary account identifiers for primary devices within the threshold distance is exactly two, the process 200 may include, at block 254, selecting one of the two primary account identifiers randomly. In these examples, it is highly likely that while two primary account identifiers are present, the two primary account identifiers correspond to the same environment. The secondary account data may then be associated with the primary device(s) associated with the primary account identifier in an active account-association session and/or a pending account-association session. The process may then proceed to block 255, where the secondary account data may be utilized for voice command responses as described above with respect to block 247.

In examples where the number of the primary account identifiers for primary devices within the threshold distance is zero or more than two, the process 200 may include, at block 256, determining a number of primary account identifiers for primary devices outside the threshold distance but still receiving the signal. For example, in this example, the system may determine either the secondary device is not in close proximity to any of the primary devices and/or that there are a large number of primary account identifiers.

In examples where the number of the primary account identifiers for primary devices outside the threshold distance is zero or more than one, the process 200, at block 258, may end and no primary account identifiers may be selected. In this example, the secondary account data may not be associated with an account-association session and/or associated with a primary device.

In examples where the number of the primary account identifiers for primary devices outside the threshold distance is exactly one, the process 200, at block 260, may include selecting that primary account identifier. The secondary account data may then be associated with the primary device(s) associated with the primary account identifier in an active account-association session and/or a pending account-association session. The process may then proceed to block 255, where the secondary account data may be utilized for voice command responses as described above with respect to block 247.

FIG. 3A illustrates an example user interface 305 for set up of account data association with devices by primary account users. The user interface 305 may be the same as or similar to the user interfaces described with respect to FIG. 1. FIG. 3A depicts changes to the user interface from left to right. The user interface 305 may be utilized to allow a primary user to enable account-association on voice interface devices associated with the user.

For example, the user interface 305 may include a settings menu 302, which may include one or more settings associated with voice interface devices, smart devices, user accounts, and/or speech processing associated with user utterances received by the voice interface devices. The settings menu 302 may include a guest option 304, which may be selectable to allow the user to provide input associated with enabling or disabling account-association functionality as described herein. The functionality may also include adjusting preferences associated with secondary user access, such as controlling which user identifiers are enabled for secondary user access, the default timeout period for account-association sessions, which devices are enabled for secondary user access, restrictions on operations performed by the voice interface devices during an account-association session, etc. Selection of the guest option 304 may cause the user interface 305 to display a request 306 for the user to indicate whether secondary user access should be enabled or not. For example, the request 306 may include asking whether to allow secondary users to ask for personal content from their account and providing a selectable portion for the user to provide input on whether to allow secondary user access.

FIG. 3A illustrates an example user interface 305 for set up of account data association with devices by primary account users. The user interface 305 may be the same as or similar to the user interfaces described with respect to FIG. 1. FIG. 3A depicts changes to the user interface from left to right. The user interface 305 may be utilized to allow a primary user to enable secondary user access on voice interface devices associated with the user.

For example, the user interface 305 may include a settings menu 302, which may include one or more settings associated with voice interface devices, smart devices, user accounts, and/or speech processing associated with user utterances received by the voice interface devices. The settings menu 302 may include a guest option 304, which may be selectable to allow the user to provide input associated with enabling or disenabling account-association functionality as described herein. The functionality may also include adjusting preferences associated with secondary user access, such as controlling which user identifiers are enabled for secondary user access, the default timeout period for account-association sessions, which devices are enabled for secondary user access, restrictions on operations performed by the voice interface devices during an account-association session, etc. Selection of the guest option 304 may cause the user interface 305 to display a request 306 for the user to indicate whether secondary user access should be enabled or not. For example, the request 306 may include asking whether to allow secondary users to ask for personal content from their account and providing a selectable portion for the user to provide input on whether to allow secondary user access.

FIG. 3B illustrates an example user interface 310 for set up of account data association with devices by the secondary users. The user interface 310 may be the same as or similar to the user interfaces described with respect to FIG. 1. The user interface 310 may be utilized to allow a secondary user to enable secondary user access on voice interface devices associated with other primary account users.

For example, the user interface 310 may include a guest setup menu 308, which may include information on how to set up account-association functionality as described herein. For example, the guest setup menu 308 may include a device identifier option 310 for adding a device identifier to be utilized for gust access. The device identifier, for example, may be a phone number associated with a mobile device of the secondary user. The guest setup menu 308 may also include a voice training option 312 for initiating a training session for acquiring and/or generating a voice profile for use for initiating an account-association session and/or during an account-association session. Upon selection of the voice training option 312, the user interface 310 may display a request for the user to provide one or more user utterances, which may be captured, and the corresponding audio data may be utilized to generate the voice profiles.

FIGS. 4-7 illustrates processes for presence-based account data association with devices. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3B and 8-12, although the processes may be implemented in a wide variety of other environments, architectures and systems.

Figure 4:
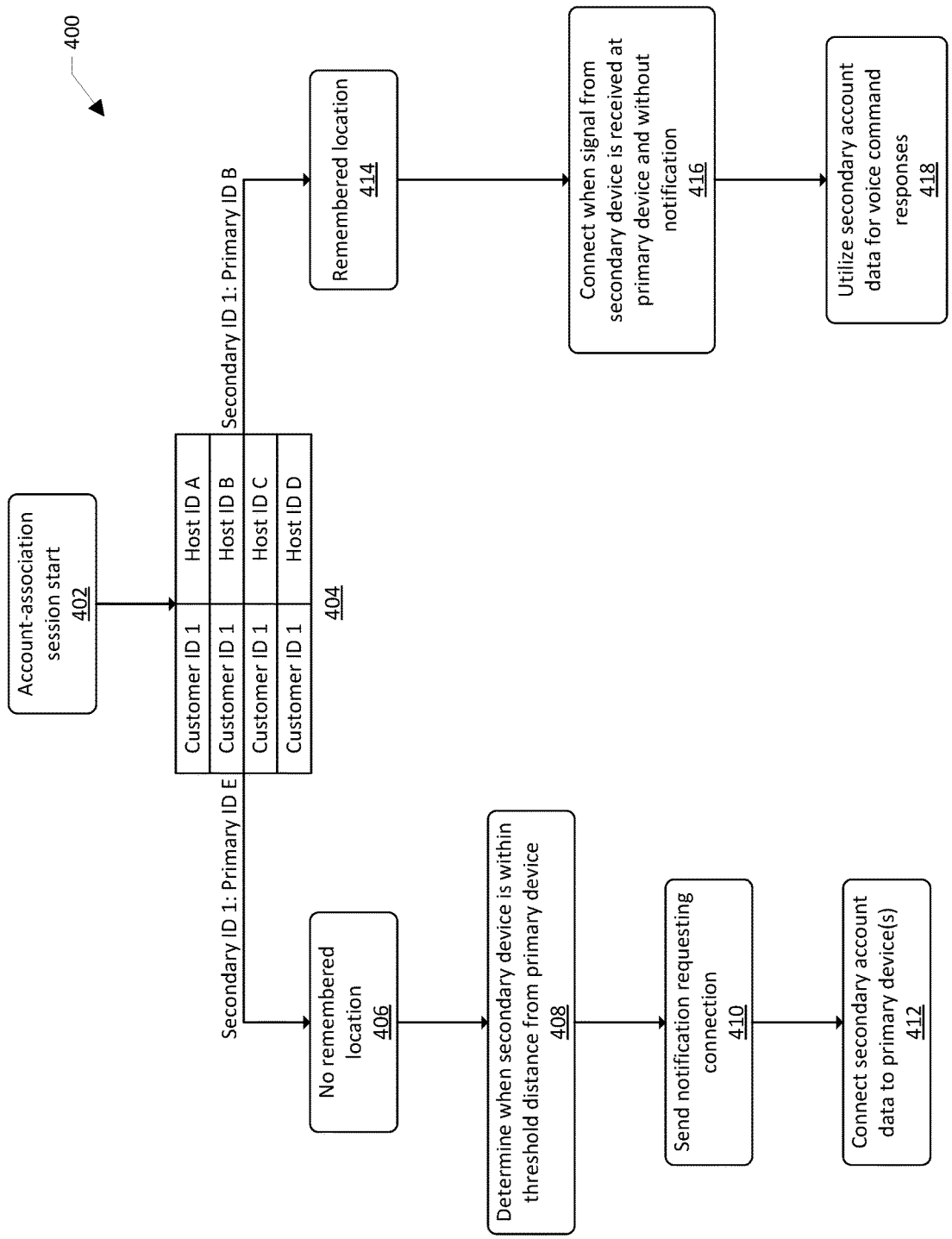
FIG. 4 illustrates a flow diagram of an example process for determining whether a secondary account identifier has been previously associated with given primary devices.

FIG. 4 illustrates a flow diagram of an example process 400 for determining whether a secondary account identifier has been previously associated with given primary devices. The order in which the operations or steps are described is not intended to be construed as a limitation, and any number of the described operations may be combined in any order and/or in parallel to implement process 400.

At block 402, the process 400 may include initiating an account-association session. For example, the system may have determined that a presence event corresponds to a lack of an account-association session and that a beginning event for establishing an account-association session should be commenced.

At block 404, the process 400 may include querying a remembered location identifier list for remembered location identifiers associated with a given secondary account identifier associated with the account-association session. For example, if the presence event is associated with the first time a secondary device connects to a given primary device, then the primary account identifier will not correspond to a remembered location identifier. However, if the secondary account data has been previously associated with the primary device as part of an account-association session, the primary account identifier may correspond to a remembered location identifier. Using FIG. 4 as an example, for the secondary account identifier Secondary Account ID 1, it is associated with remembered location identifiers "Primary Account ID A-D."

At block 406, the process 400 may include determining that a given primary account identifier associated with a presence event does not correspond to at least one remembered location identifier. The example in FIG. 4 is that the primary account identifier from the presence event is Primary Account ID E, which is not a remembered location identifier.

At block 408, the process 400 may include determining that the secondary device is within a threshold distance from the primary device. For example, signal strength data associated with the presence event may indicate that the secondary device is within the threshold distance, such as a few feet, from the primary device.

At block 410, the process 400 may include sending a notification to the secondary device and/or another device associated with the secondary account data requesting connection to the primary device. The notification may indicate the secondary device at issue, the one or more primary devices at issue, the primary account identifier, and/or any other information associated with the account-association session and/or presence event.

At block 412, the process 400 may include connecting the secondary account data to the primary device(s). When secondary account data is associated with the primary device(s) as an account-association session, functionality available to the secondary account data may be utilized by the primary device(s). For example, applications, abilities, and/or user preferences associated with the secondary account data may be available to the primary device(s), such as for responding to user voice commands.

Returning to block 404, when at least one of the remembered location identifiers corresponds to the primary account identifier, at block 414, the process 400 may include selecting the remembered location identifier for establishing an account-association session with. In these examples, given that the secondary device has been previously associated with the primary device(s), requirements on secondary device distance from primary device(s) as well as notification requirements may be relaxed such that no user input may be necessary to associate the secondary account data with the primary device(s) for the presence event.

At block 416, the process 400 may include causing the secondary account data to be associated with the primary device when a wireless signal from the secondary device is received at the primary device, the association without sending of the notification to the secondary device requesting confirmation of the association. In examples, an informational notification may still be sent indicating that the secondary account data has been associated with the primary device.

At block 418, the process 400 may include utilizing the secondary account data for voice command responses. For example, when audio data is received from a device associated with an active account-association session, the speech processing system may determine intent data that corresponds to the audio data. The intent data may indicate a requested action to be performed and a "payload" indicating details about the action. Examples include "play my rock playlist," "order pepperoni pizza," "play Game A," etc. In these examples, the determined intent is to output audio, initiate a food order, and initiate a game, respectively. The payload in these examples is the "rock playlist," "pepperoni pizza," and "Game A." In each of these examples, the speech processing system may determine how to service these intents utilizing the secondary or primary account data. For example, the secondary account data may be associated with a "rock playlist," and the primary account data may also be associated with a different "rock playlist" or no "rock playlist" at all. By way of additional example, when placing orders, the secondary account data may be associated with given payment identifiers while the primary account data may be associated with different payment identifiers. Additionally, the secondary account data may have certain applications and/or skills enabled while the primary account data may have different applications and/or skills enabled. As such, when an active account-association session is associated with a device from which audio data was received, the speech processing system may determine whether the secondary account data and/or the primary account data is to be utilized.

In examples, speaker identification as described more fully below, may be utilized to determine whether the secondary user is the person that provided the voice input to the device in question. When the secondary user is the person that provided the voice input, the speech processing system may, before or after the intent data is determined, utilize the secondary account data to determine how to respond to the voice input. Utilizing the examples provided above, the secondary account data may be associated with certain applications, skills, payment identifiers, and/or enabled domains for responding to voice input. In the "play my rock playlist" example, audio streaming applications that have been enabled in association with the secondary account data may be queried to service the intent. The secondary account data may indicate that, for a given audio streaming application, a playlist was created and is identified as "rock." In this example, the audio streaming application may be selected for servicing the intent and the application may provide and/or permit audio data representing songs from the rock playlist to be sent to the device and to be output by the device. In the "order pepperoni pizza" example, enabled applications and/or skills that are configured to allow for ordering pizza may be queried to service the intent, and payment identifiers associated with the secondary account data may be utilized to pay for the order. In the "play Game A" example, an enabled application and/or skill associated with Game A may be queried to service the intent.

In examples where the speaker identification processes described herein does not determine that the secondary user is the person that provided the voice input, or in other words that the person that provided the voice input is the primary account user and/or another user and/or is the secondary user but was not determined to be the secondary user to a threshold confidence level, the primary account data may be utilized to respond to the voice input. By so doing, the speech processing system allows for functionality of the secondary account to be utilized when the secondary user is the speaker, and the speech processing system allows for functionality of the primary account to be utilized when the secondary user is not the speaker. This may prevent and/or hinder the use of the secondary account data by unauthorized users.

In other examples, selection of the secondary account data or the primary account data for responding to a given voice command may be based at least in part on which account is configured to service the intent. For example, if the secondary account data indicates that an audio streaming application is enabled but the primary account data does not have an audio streaming application enabled, the secondary account data may be selected when the voice command is to output music. Additionally, even when both the secondary account data and the primary account data have applications and/or skills enabled to respond to a given voice command, the details of the voice command itself may be utilized to determine which account to utilize. For example, even if both accounts have an audio streaming application enabled, if the secondary account data includes a "rock playlist" but the primary account data does not include a playlist identified as "rock playlist," the secondary account data may be selected to service the intent of "play my rock playlist."

Figure 5:
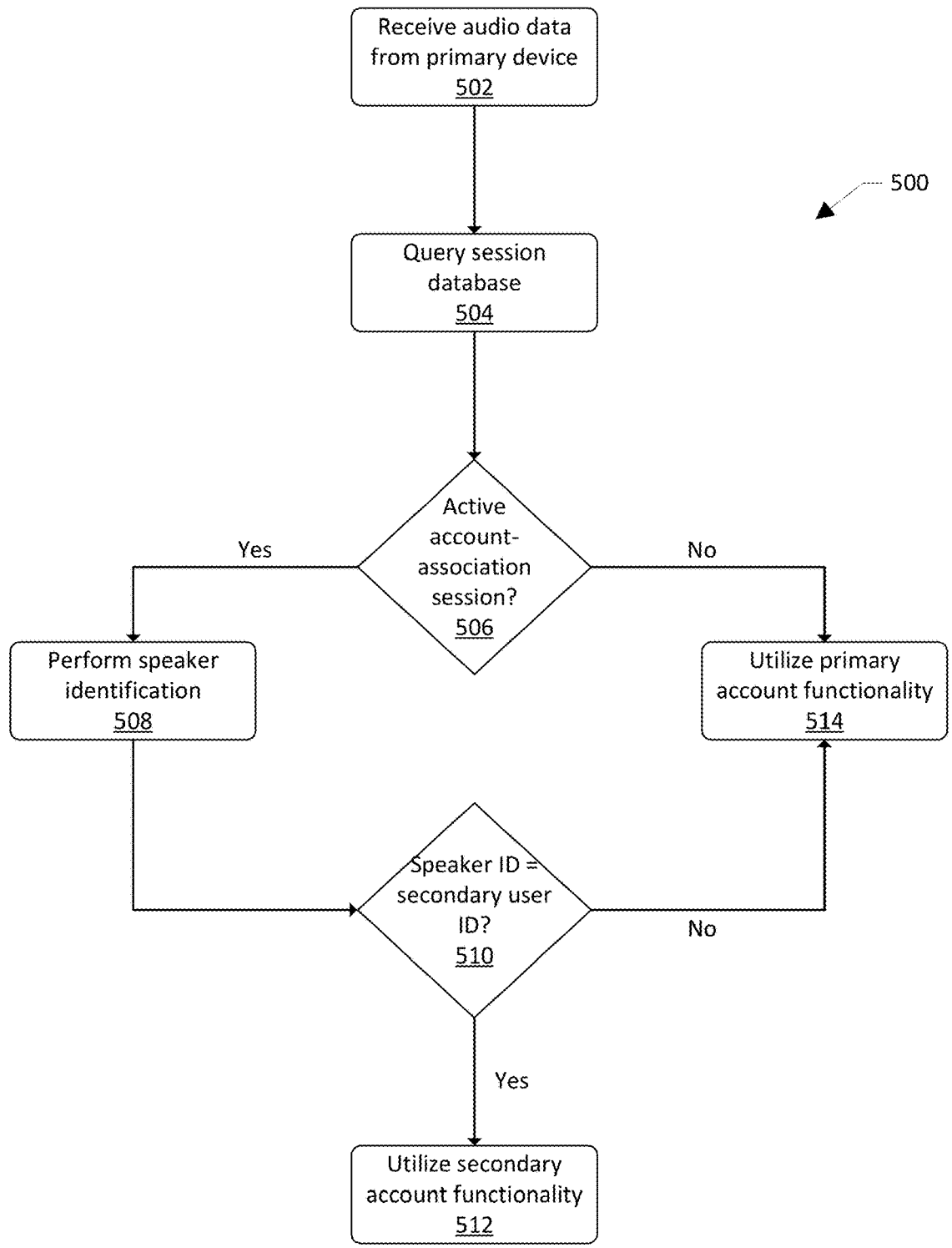
FIG. 5 illustrates a flow diagram of an example process for servicing user voice commands when an active account-association session is associated with devices that received the user voice commands.

FIG. 5 illustrates a flow diagram of an example process 500 for servicing user voice commands when an active account-association session is associated with devices that received the user voice commands. The order in which the operations or steps are described is not intended to be construed as a limitation, and any number of the described operations may be combined in any order and/or in parallel to implement process 500.

At block 502, the process 500 may include receiving audio data from a primary device. By way of example, a given primary device may receive audio representing user voice input. Audio data corresponding to the audio may be generated and speech processing may be performed to determine how to respond to the user voice input.

At block 504, the process 500 may include querying a session database for an account-association session status for the primary device. For example, the speech processing may include determining a device identifier associated with the primary device that received the voice input. The speech processing system may query a session database and/or one or more other components of the system for an indication of whether an active account-association session is currently associated with the primary device.

At block 506, the process 500 may include determining whether the account-association session status is indicated as being an active account-association session. For example, the account-association session status may indicate that the given primary device is associated with either an active account-association session, a pending account-association session, or no account-association session.

In examples where the primary device is associated with an active account-association session, the process 500 may include, at block 508, performing speaker identification processes on the audio data. When an active account-association session is currently associated with the primary device, the speech processing system may perform one or more speaker identification processes to determine whether the user that provided the voice input is the secondary user or another user. Speaker identification is described in more detail with respect to FIGS. 10-12.

At block 510, the process 500 may include determining whether the speaker identification processes indicate the voice input was received from the secondary user. For example, when characteristics of the audio data correspond to characteristics of stored data associated with the secondary user, the speaker identification processes may indicate the voice input way received from the secondary user.

In examples where the speaker identification processes indicate the voice input was received from the secondary user, the process 500 may include, at block 512, utilizing the secondary account data for servicing the voice input. In these examples, use of the secondary account data may be permitted because the system has determined that the user requesting use of the primary device is the secondary user. In examples where the speaker identification processes indicate the voice input was not received from the secondary user, the process 500 may include, at block 514, utilizing the primary account functionality.

In examples where the speaker identification processes indicate the voice input is from someone other than the secondary user, and/or when there is no active account-association session associated with the primary device as determined at block 506, the process 500 may include utilizing the primary account functionality for servicing the voice input. In these examples, the system has not determined that the voice input is from the secondary user, and as such the secondary account data may not be utilized to service the input from the voice input.

For example, when audio data is received from a device associated with an active account-association session, the speech processing system may determine intent data that corresponds to the audio data. The intent data may indicate a requested action to be performed and a "payload" indicating details about the action. Examples include "play my rock playlist," "order pepperoni pizza," "play Game A," etc. In these examples, the determined intent is to output audio, initiate a food order, and initiate a game, respectively. The payload in these examples is the "rock playlist," "pepperoni pizza," and "Game A." In each of these examples, the speech processing system may determine how to service these intents utilizing the secondary or primary account data. For example, the secondary account data may be associated with a "rock playlist," and the primary account data may also be associated with a different "rock playlist" or no "rock playlist" at all. By way of additional example, when placing orders, the secondary account data may be associated with given payment identifiers while the primary account data may be associated with different payment identifiers. Additionally, the secondary account data may have certain applications and/or skills enabled while the primary account data may have different applications and/or skills enabled. As such, when an active account-association session is associated with a device from which audio data was received, the speech processing system may determine whether the secondary account data and/or the primary account data is to be utilized.

In examples, speaker identification as described more fully below, may be utilized to determine whether the secondary user is the person that provided the voice input to the device in question. When the secondary user is the person that provided the voice input, the speech processing system may, before or after the intent data is determined, utilize the secondary account data to determine how to respond to the voice input. Utilizing the examples provided above, the secondary account data may be associated with certain applications, skills, payment identifiers, and/or enabled domains for responding to voice input. In the "play my rock playlist" example, audio streaming applications that have been enabled in association with the secondary account data may be queried to service the intent. The secondary account data may indicate that, for a given audio streaming application, a playlist was created and is identified as "rock." In this example, the audio streaming application may be selected for servicing the intent and the application may provide and/or permit audio data representing songs from the rock playlist to be sent to the device and to be output by the device. In the "order pepperoni pizza" example, enabled applications and/or skills that are configured to allow for ordering pizza may be queried to service the intent, and payment identifiers associated with the secondary account data may be utilized to pay for the order. In the "play Game A" example, an enabled application and/or skill associated with Game A may be queried to service the intent.

In examples where the speaker identification processes described herein does not determine that the secondary user is the person that provided the voice input, or in other words that the person that provided the voice input is the primary account user and/or another user and/or is the secondary user but was not determined to be the secondary user to a threshold confidence level, the primary account data may be utilized to respond to the voice input. By so doing, the speech processing system allows for functionality of the secondary account to be utilized when the secondary user is the speaker, and the speech processing system allows for functionality of the primary account to be utilized when the secondary user is not the speaker. This may prevent and/or hinder the use of the secondary account data by unauthorized users.

In other examples, selection of the secondary account data or the primary account data for responding to a given voice command may be based at least in part on which account is configured to service the intent. For example, if the secondary account data indicates that an audio streaming application is enabled but the primary account data does not have an audio streaming application enabled, the secondary account data may be selected when the voice command is to output music. Additionally, even when both the secondary account data and the primary account data have applications and/or skills enabled to respond to a given voice command, the details of the voice command itself may be utilized to determine which account to utilize. For example, even if both accounts have an audio streaming application enabled, if the secondary account data includes a "rock playlist" but the primary account data does not include a playlist identified as "rock playlist," the secondary account data may be selected to service the intent of "play my rock playlist."

Figure 13:
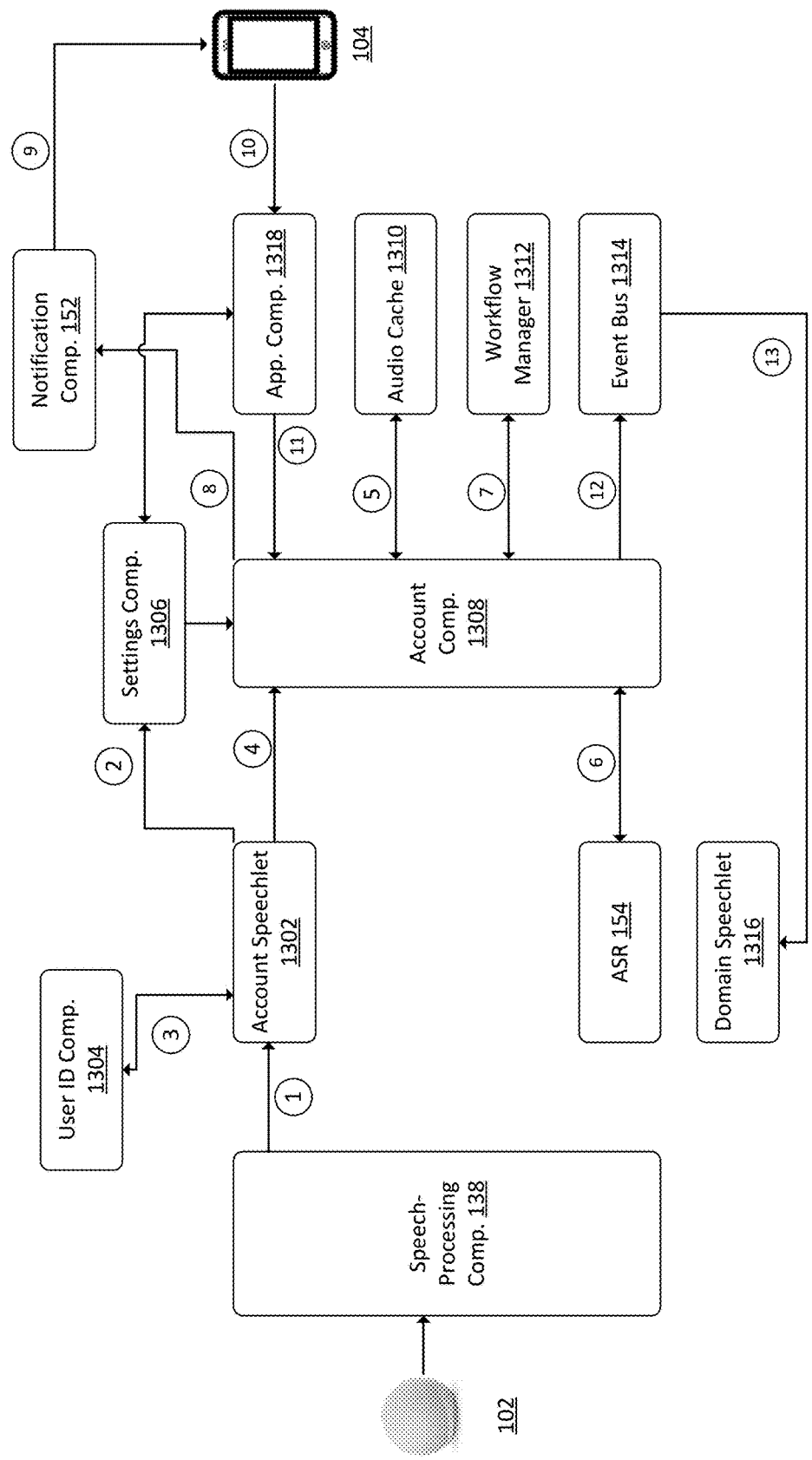
FIG. 13 illustrates a conceptual diagram of example components utilized for presence-based account association with devices.
Figure 14:
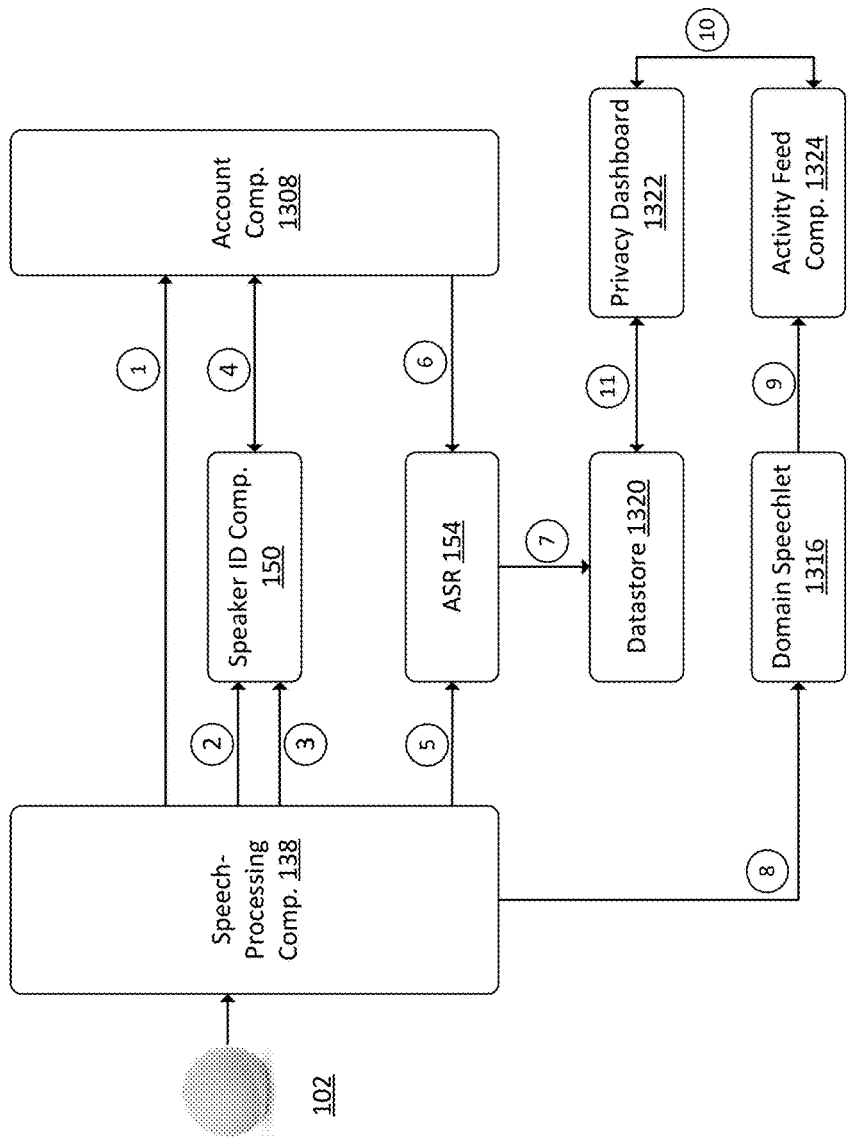
FIG. 14 illustrates a conceptual diagram of example components utilized for determining whether a user utterance is associated with a secondary account or a primary account.
Figure 15:
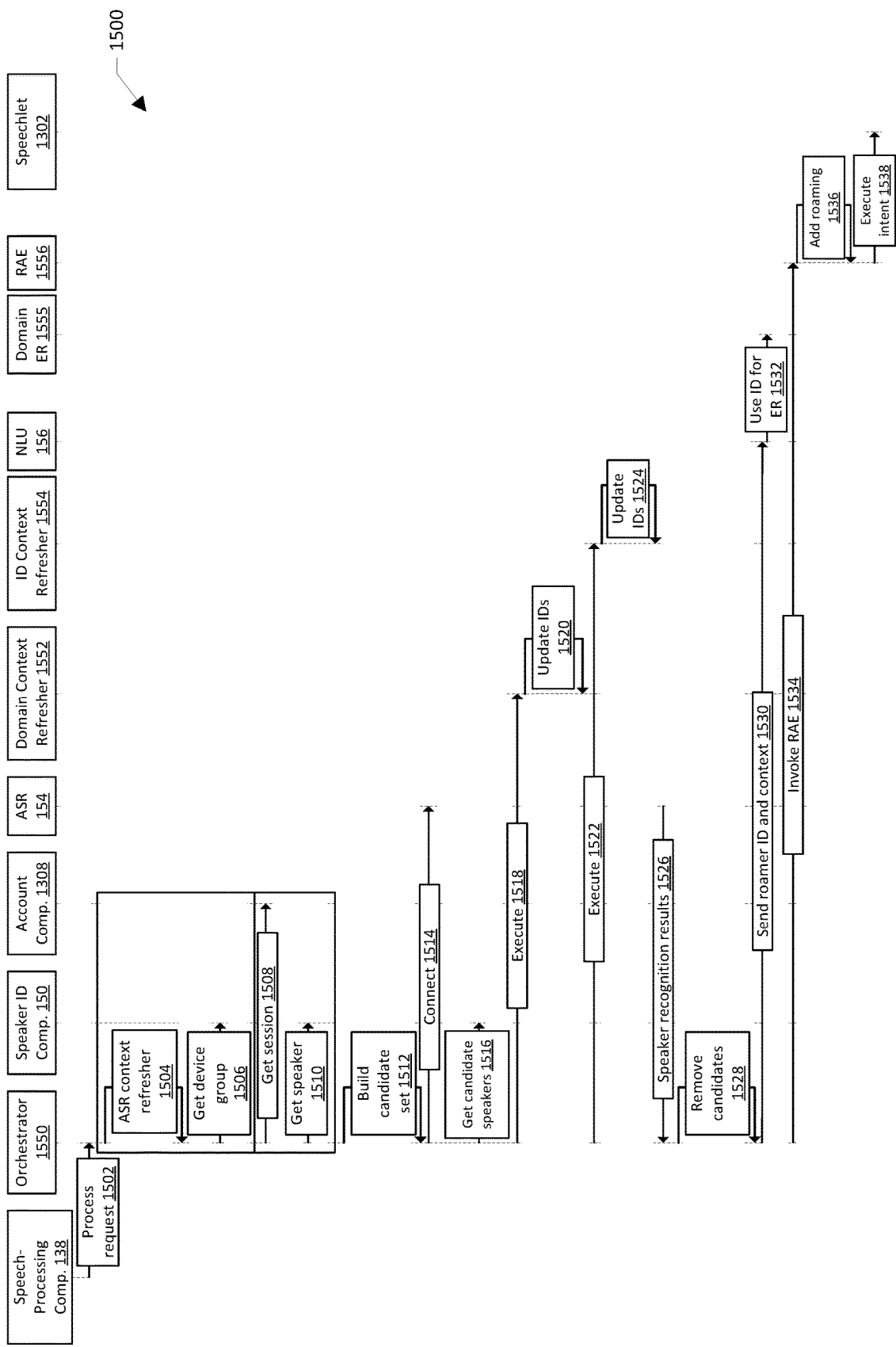
FIG. 15 illustrates a sequence diagram of an example flow of interactions arranged in a time sequence for session utilization.

Additional details on the use of the speech processing system to perform one or more of the operations described herein are provided at FIGS. 13-15.

Figure 6:
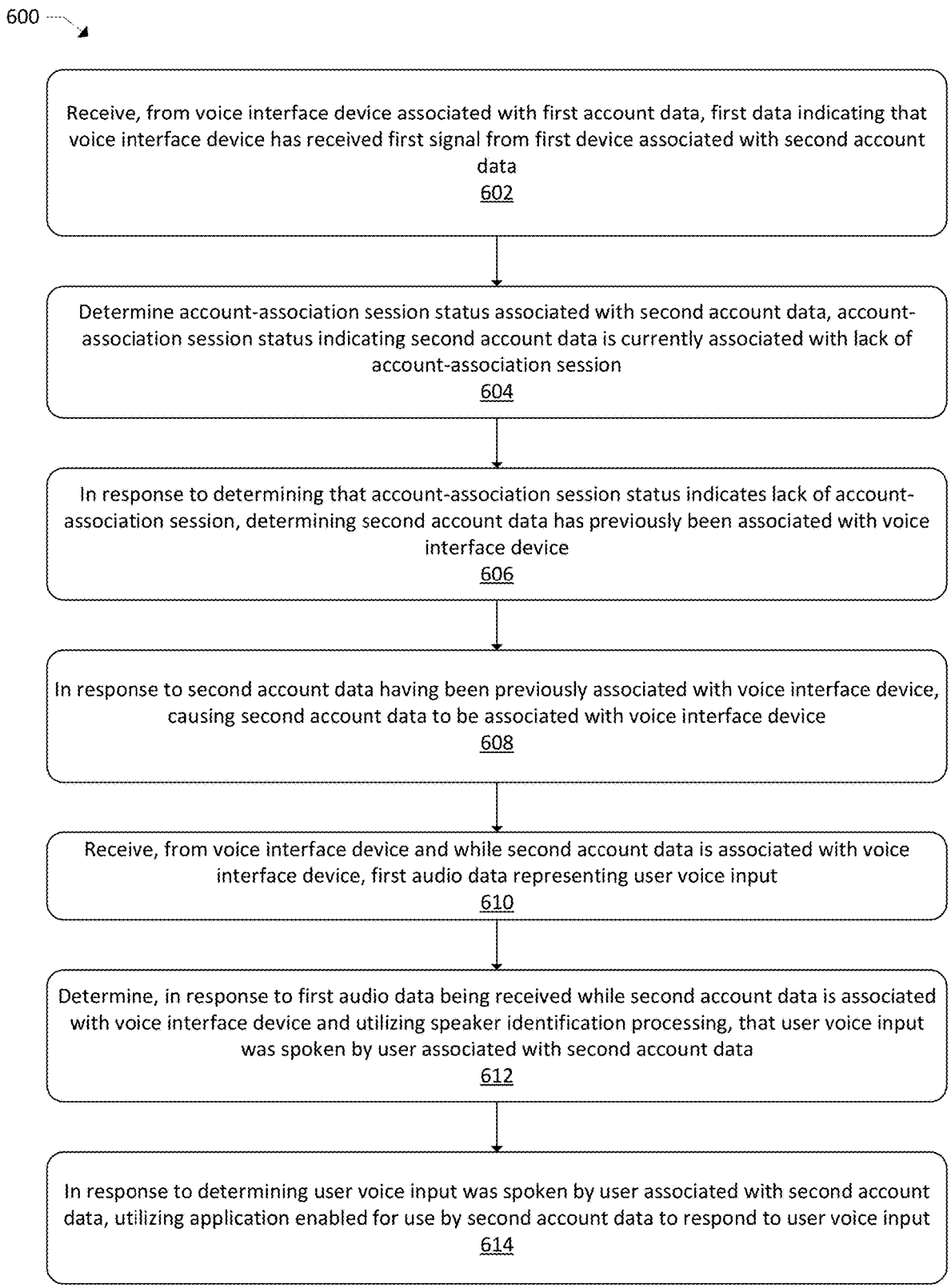
FIG. 6 illustrates a flow diagram of an example process for presence-based account association with devices.

FIG. 6 illustrates a flow diagram of an example process 600 for presence-based account association with devices. The order in which the operations or steps are described is not intended to be construed as a limitation, and any number of the described operations may be combined in any order and/or in parallel to implement process 600.

At block 602, the process 600 may include receiving, from a voice interface device associated with first account data, first data indicating that the voice interface device has received a first signal from a first device associated with second account data. For example, an event component of the system may receive the data from the primary device and may utilize that data to determine whether a presence event has occurred. Determination of the presence data may be based solely on receipt of the signal from the secondary device. In other examples, one or more other signals may be utilized for determining that a presence event has occurred. For example, the other signals may include detection of user speech at the primary device, detection of sounds indicative of movement, image data processing indicating presence of a person, device usage data, scheduling data, and/or any other type of data indicative of presence of a person and/or device in an environment associated with the primary device.

At block 604, the process 600 may include determining an account-association session status associated with the second account data, the account-association session status indicating the second account data is currently associated with a lack of an account-association session. For example, an account-association component may query a session manager, which may be configured to determine a type of account-association session associated with the secondary account identifier and to determine how to proceed with the given presence event. For example, the session manager may query a session database for an indication of whether the secondary account identifier from the presence event is associated with an active account-association session, a pending account-association session, and/or is not associated with a current account-association session. By way of example, if the secondary account data, at the time of the presence event, is already associated with a primary device, the session manager may determine that the secondary account identifier is associated with an active account-association session. In other examples, if a notification for establishing an account-association session has been sent to the secondary device but user input data accepting the notification has not yet been received, the session manager may determine that the secondary account identifier is associated with a pending account-association session. In other examples, if the session database returns results indicating that the secondary account identifier is not associated with an active account-association session or a pending account-association session, the session manager may determine that the secondary account identifier is not currently associated with an account-association session. The session manager may return data indicating the account-association session status for the secondary account identifier.

At block 606, the process 600 may include in response to determining that the account-association session status indicates the lack of the account-association session, determining the second account data has previously been associated with the voice interface device. For example, if the presence event is associated with the first time a secondary device connects to a given primary device, then the primary account identifier will not correspond to a remembered location identifier. However, if the secondary account data has been previously associated with the primary device as part of an account-association session, the primary account identifier may correspond to a remembered location identifier. In these examples, the account-association component may cause the secondary account data to be associated with the primary device(s), such as without sending notification data requesting user input confirming that the association should be established.

At block 608, the process 600 may include, in response to the second account data having been previously associated with the voice interface device, causing the second account data to be associated with the voice interface device. In these examples, given that the second account data was previously associated with the voice interface device, requirements on notifications as well as distance thresholds may be relaxed. When secondary account data is associated with the primary device(s) as an account-association session, functionality available to the secondary account data may be utilized by the primary device(s). For example, applications, abilities, and/or user preferences associated with the secondary account data may be available to the primary device(s), such as for responding to user voice commands.

At block 610, the process 600 may include receiving, from the voice interface device and while the second account data is associated with the voice interface device, first audio data representing user voice input. For example, a user proximity to the voice interface device may provide voice input to the voice interface device and the voice interface device may generate corresponding audio data.

At block 612, the process 600 may include determining, in response to the first audio data being received while the second account data is associated with the voice interface device and utilizing speaker identification processing, that the user voice input was spoken by a user associated with the second account data. For example, given that an active account-association session is associated with the voice interface face, instead of defaulting to utilizing the primary account data to service an intent from the voice input, the system determines whether the primary account data or the secondary account data should be utilized. To do so, the system may perform speaker identification processing on the received audio data to determine if the voice input was provided by the secondary user or another user.

At block 614, the process 600 may include, in response to determining the user voice input was spoken by the user associated with the second account data, utilizing an application enabled for use by the second account data to respond to the user voice input. By way of example, when audio data is received from a device associated with an active account-association session, the speech processing system may determine intent data that corresponds to the audio data. The intent data may indicate a requested action to be performed and a "payload" indicating details about the action. Examples include "play my rock playlist," "order pepperoni pizza," "play Game A," etc. In these examples, the determined intent is to output audio, initiate a food order, and initiate a game, respectively. The payload in these examples is the "rock playlist," "pepperoni pizza," and "Game A." In each of these examples, the speech processing system may determine how to service these intents utilizing the secondary account or primary account data. For example, the secondary account data may be associated with a "rock playlist," and the primary account data may also be associated with a different "rock playlist" or no "rock playlist" at all. By way of additional example, when placing orders, the secondary account data may be associated with given payment identifiers while the primary account data may be associated with different payment identifiers. Additionally, the secondary account data may have certain applications and/or skills enabled while the primary account data may have different applications and/or skills enabled. As such, when an active account-association session is associated with a device from which audio data was received, the speech processing system may determine whether the secondary account data and/or the primary account data is to be utilized.

In examples, speaker identification as described more fully below, may be utilized to determine whether the secondary account user is the person that provided the voice input to the device in question. When the secondary account user is the person that provided the voice input, the speech processing system may, before or after the intent data is determined, utilize the secondary account data to determine how to respond to the voice input. Utilizing the examples provided above, the secondary account data may be associated with certain applications, skills, payment identifiers, and/or enabled domains for responding to voice input. In the "play my rock playlist" example, audio streaming applications that have been enabled in association with the secondary account data may be queried to service the intent. The secondary account data may indicate that, for a given audio streaming application, a playlist was created and is identified as "rock." In this example, the audio streaming application may be selected for servicing the intent and the application may provide and/or permit audio data representing songs from the rock playlist to be sent to the device and to be output by the device. In the "order pepperoni pizza" example, enabled applications and/or skills that are configured to allow for ordering pizza may be queried to service the intent, and payment identifiers associated with the secondary account data may be utilized to pay for the order. In the "play Game A" example, an enabled application and/or skill associated with Game A may be queried to service the intent.

In examples where the speaker identification processes described herein does not determine that the secondary account user is the person that provided the voice input, or in other words that the person that provided the voice input is the primary user and/or another user and/or is the secondary account user but was not determined to be the secondary account user to a threshold confidence level, the primary account data may be utilized to respond to the voice input. By so doing, the speech processing system allows for functionality of the secondary account to be utilized when the secondary user is the speaker, and the speech processing system allows for functionality of the primary account to be utilized when the secondary user is not the speaker. This may prevent and/or hinder the use of the secondary account data by unauthorized users.

In other examples, selection of the secondary account data or the primary account data for responding to a given voice command may be based at least in part on which account is configured to service the intent. For example, if the secondary account data indicates that an audio streaming application is enabled but the primary account data does not have an audio streaming application enabled, the secondary account data may be selected when the voice command is to output music. Additionally, even when both the secondary account data and the primary account data have applications and/or skills enabled to respond to a given voice command, the details of the voice command itself may be utilized to determine which account to utilize. For example, even if both accounts have an audio streaming application enabled, if the secondary account data includes a "rock playlist" but the primary account data does not include a playlist identified as "rock playlist," the secondary account data may be selected to service the intent of "play my rock playlist."

Additionally, or alternatively, the process 600 may include dissociating, at a first time, the second account data from the voice interface device. The process 600 may also include receiving, at a second time after the first time, fourth data indicating a second signal from the first device has been received at the voice interface device. The process 600 may also include, in response to determining that the second account identifier is indicated to have been previously associated with the first account identifier: determining to refrain from sending the notification to the first device; and causing the second account data to be associated with the voice interface device without user input from the first device.

Additionally, or alternatively, the process 600 may include receiving second data indicating detection of a presence event associated with the voice interface device. The process 600 may also include, in response to the second data, determining that the account-session status indicates the second account data is currently associated with a pending account-association session indicating that a response to a notification requesting confirmation of account association with the voice interface device is absent. The process 600 may also include causing a period of time for which the notification is active to be extended in response to the second account data being currently associated with the pending session.

Additionally, or alternatively, the process 600 may include determining that multiple voice interface devices received the first signal. The process 600 may also include determining that at least one account identifier associated with the multiple voice interface devices differs from the first account data. The process 600 may also include, in response to determining that the at least one account identifier differs from the first account data, determining a number of account identifiers associated with the multiple voice interface devices that received the first signal at a signal strength level that satisfies a threshold signal strength level. The process 600 may also include, in response to the number of the account identifiers associated with the multiple voice interface devices that received the first signal at the signal strength level being one, selecting the first account data.

Additionally, or alternatively, the process 600 may include receiving second data indicating a change in device presence associated with the first account data. The process 600 may also include, in response to receiving the second data, determining that the account-association session status indicates the second account data is currently associated with the active account-association session. The process 600 may also include determining that the first signal has ceased being received at the voice interface device. The process 600 may also include causing, in response to the account-association session status indicating the active account-association session and the first signal ceasing being received at the voice interface device, the second account data to be dissociated from the voice interface device.

FIG. 7 illustrates a flow diagram of another example process 700 for presence-based account association with devices. The order in which the operations or steps are described is not intended to be construed as a limitation, and any number of the described operations may be combined in any order and/or in parallel to implement process 700.

At block 702, the process 700 may include receiving, from a first device associated with first account data, first data indicating a first presence event has occurred in proximity to the first device, the first presence event associated with at least one of a user associated with second account data or a second device associated with the second account data. For example, an event component of the system may receive the data from the primary device and may utilize that data to determine whether a presence event has occurred. Determination of the presence data may be based solely on receipt of the signal from the secondary device. In other examples, one or more other signals may be utilized for determining that a presence event has occurred. For example, the other signals may include detection of user speech at the primary device, detection of sounds indicative of movement, image data processing indicating presence of a person, device usage data, scheduling data, and/or any other type of data indicative of presence of a person and/or device in an environment associated with the primary device.

At block 704, the process 700 may include determining that a status associated with the second account data indicates a lack of an active session with the first device, the active session representing a time period during which the second account data is associated with the first device such that the second account data is authorized to be utilized to respond to voice input received at the first device. For example, an account-association component may query a session manager, which may be configured to determine a type of account-association session associated with the secondary account identifier and to determine how to proceed with the given presence event. For example, the session manager may query a session database for an indication of whether the secondary account identifier from the presence event is associated with an active account-association session, a pending account-association session, and/or is not associated with a current account-association session. By way of example, if the secondary account data, at the time of the presence event, is already associated with a primary device, the session manager may determine that the secondary account identifier is associated with an active account-association session. In other examples, if a notification for establishing an account-association session has been sent to the secondary device but user input data accepting the notification has not yet been received, the session manager may determine that the secondary account identifier is associated with a pending account-association session. In other examples, if the session database returns results indicating that the secondary account identifier is not associated with an active account-association session or a pending account-association session, the session manager may determine that the secondary account identifier is not currently associated with an account-association session. The session manager may return data indicating the account-association session status for the secondary account identifier.

At block 706, the process 700 may include determining the second account data has previously been associated with the first device. For example, if the presence event is associated with the first time a secondary device connects to a given primary device, then the primary account identifier will not correspond to a remembered location identifier. However, if the secondary account data has been previously associated with the primary device as part of an account-association session, the primary account identifier may correspond to a remembered location identifier. In these examples, the account-association component may cause the secondary account data to be associated with the primary device(s), such as without sending notification data requesting user input confirming that the association should be established.

At block 708, the process 700 may include, based at least in part on the second account data having been previously associated with the first device, causing the second account data to be associated with the first device. In these examples, given that the second account data was previously associated with the voice interface device, requirements on notifications as well as distance thresholds may be relaxed. When secondary account data is associated with the primary device(s) as an account-association session, functionality available to the secondary account data may be utilized by the primary device(s). For example, applications, abilities, and/or user preferences associated with the secondary account data may be available to the primary device(s), such as for responding to user voice commands.

At block 710, the process 700 may include receiving, from the first device and while the second account data is associated with the first device, first audio data representing the voice input. For example, a user proximity to the voice interface device may provide voice input to the voice interface device and the voice interface device may generate corresponding audio data.

At block 712, the process 700 may include determining that the voice input is associated with the user. For example, given that an active account-association session is associated with the voice interface face, instead of defaulting to utilizing the primary account data to service an intent from the voice input, the system determines whether the primary account data or the secondary account data should be utilized. To do so, the system may perform speaker identification processing on the received audio data to determine if the voice input was provided by the secondary user or another user.

At block 714, the process 700 may include based at least in part on determining the voice input is associated with the user, utilizing an application enabled for use by the second account data to respond to the user voice input. By way of example, when audio data is received from a device associated with an active account-association session, the speech processing system may determine intent data that corresponds to the audio data. The intent data may indicate a requested action to be performed and a "payload" indicating details about the action. Examples include "play my rock playlist," "order pepperoni pizza," "play Game A," etc. In these examples, the determined intent is to output audio, initiate a food order, and initiate a game, respectively. The payload in these examples is the "rock playlist," "pepperoni pizza," and "Game A." In each of these examples, the speech processing system may determine how to service these intents utilizing the secondary account or primary account data. For example, the secondary account data may be associated with a "rock playlist," and the primary account data may also be associated with a different "rock playlist" or no "rock playlist" at all. By way of additional example, when placing orders, the secondary account data may be associated with given payment identifiers while the primary account data may be associated with different payment identifiers. Additionally, the secondary account data may have certain applications and/or skills enabled while the primary account data may have different applications and/or skills enabled. As such, when an active account-association session is associated with a device from which audio data was received, the speech processing system may determine whether the secondary account data and/or the primary account data is to be utilized.

In examples, speaker identification as described more fully below, may be utilized to determine whether the secondary account user is the person that provided the voice input to the device in question. When the secondary account user is the person that provided the voice input, the speech processing system may, before or after the intent data is determined, utilize the secondary account data to determine how to respond to the voice input. Utilizing the examples provided above, the secondary account data may be associated with certain applications, skills, payment identifiers, and/or enabled domains for responding to voice input. In the "play my rock playlist" example, audio streaming applications that have been enabled in association with the secondary account data may be queried to service the intent. The secondary account data may indicate that, for a given audio streaming application, a playlist was created and is identified as "rock." In this example, the audio streaming application may be selected for servicing the intent and the application may provide and/or permit audio data representing songs from the rock playlist to be sent to the device and to be output by the device. In the "order pepperoni pizza" example, enabled applications and/or skills that are configured to allow for ordering pizza may be queried to service the intent, and payment identifiers associated with the secondary account data may be utilized to pay for the order. In the "play Game A" example, an enabled application and/or skill associated with Game A may be queried to service the intent.

In examples where the speaker identification processes described herein does not determine that the secondary account user is the person that provided the voice input, or in other words that the person that provided the voice input is the primary user and/or another user and/or is the secondary account user but was not determined to be the secondary account user to a threshold confidence level, the primary account data may be utilized to respond to the voice input. By so doing, the speech processing system allows for functionality of the secondary account to be utilized when the secondary user is the speaker, and the speech processing system allows for functionality of the primary account to be utilized when the secondary user is not the speaker. This may prevent and/or hinder the use of the secondary account data by unauthorized users.

In other examples, selection of the secondary account data or the primary account data for responding to a given voice command may be based at least in part on which account is configured to service the intent. For example, if the secondary account data indicates that an audio streaming application is enabled but the primary account data does not have an audio streaming application enabled, the secondary account data may be selected when the voice command is to output music. Additionally, even when both the secondary account data and the primary account data have applications and/or skills enabled to respond to a given voice command, the details of the voice command itself may be utilized to determine which account to utilize. For example, even if both accounts have an audio streaming application enabled, if the secondary account data includes a "rock playlist" but the primary account data does not include a playlist identified as "rock playlist," the secondary account data may be selected to service the intent of "play my rock playlist."

Additionally, or alternatively, the process 700 may include querying, based at least in part on the second account data being associated with the first device, the first device for second data associated with an environment of the first device. The process 700 may also include determining, based at least in part on the second data, that the user is in proximity to the first device. The process 700 may also include determining, based at least in part on the second data, that a location of the user corresponds to a determined location where the voice input was received from. In these examples, determining that the voice input is associated with the user may be based at least in part on the location corresponding to the determined location.

Additionally, or alternatively, the process 700 may include dissociating, at a first time, the second account data from the one or more devices. The process 700 may also include receiving, at a second time after the first time, second data indicating a second signal from the second device has been received at the first device. The process 700 may also include, based at least in part on determining that the second account identifier is indicated to have been previously associated with the first account identifier, causing the second account data to be associated with the one or more devices without user input from the second device.

Additionally, or alternatively, the process 700 may include determining that multiple devices, including the first device, received the first signal. The process 700 may also include determining that the first device is the only of the multiple devices that received the first signal at a signal strength level that satisfies a threshold signal strength level. The process 700 may also include, based at least in part on the first device being the only of the multiple devices that received the first signal at the signal strength level, selecting the one or more devices associated with the first account data to associate with the second account data.

Additionally, or alternatively, the process 700 may include receiving second data indicating detection of a presence event associated with the first device. The process 700 may also include, based at least in part on the second data, determining that the status indicates the second account data is currently associated with an active account-association session. The process 700 may also include determining that the first signal has ceased being received at the first device. The process 700 may also include causing, based at least in part on the status indicating the active account-association session and the first signal ceasing being received at the first device, the second account data to be dissociated from the one or more devices.

Additionally, or alternatively, the process 700 may include receiving second data indicating detection of a presence event associated with the first device. The process 700 may also include, based at least in part on the second data, determining that the status indicates the second account data is currently associated with a pending session indicating that the notification has not been accepted. The process 700 may also include causing a period of time for which the notification is active to be extended based at least in part on the second account data being currently associated with the pending session.

Additionally, or alternatively, the process 700 may include determining that the first signal strength satisfies a threshold signal strength indicating the second device is within a first predetermined distance from the first device. In these examples, sending the second data may be based at least in part on the first signal strength satisfying the threshold signal strength.

Additionally, or alternatively, the process 700 may include dissociating, at a first time, the second account data from the one or more devices. The process 700 may also include receiving, at a second time after the first time, second data indicating a second signal from the second device has been received at the first device, the second data indicating a second signal strength at which the second signal is received at the first device, the second signal strength not satisfying the threshold signal strength. The process 700 may also include determining, based at least in part on the second signal strength not satisfying the threshold signal strength, that the second account data is indicated to have been previously associated with the first device. The process 700 may also include causing the second account data to be associated with the one or more devices based at least in part on the second account data indicated as having been previously associated with the first device.

Additionally, or alternatively, the process 700 may include storing, in a database associated with a speech processing system, second data indicating the second account data is associated with the one or more devices. The process 700 may also include receiving, from at least one of the one or more devices, audio data representing speech input. The process 700 may also include querying the database for the second data and, in response to receiving the second data from the database and utilizing speaker recognition techniques, determining a user profile associated with the audio data. The process 700 may also include determining that the user profile is associated with the second account data and causing an action to be performed by the first device utilizing the second account data based at least in part on the user profile being associated with the audio data.

Additionally, or alternatively, the process 700 may include receiving second audio data at a third device and determining that the third device is associated with the first account data. The process 700 may also include determining that the second audio data was received while the second account data is associated with the first device. The process 700 may also include, based at least in part on the second audio data being received while the second account data is associated with the first device, and the third device being associated with the first account data, utilizing the second account data instead of the first account data to respond to the second audio data.

Figure 8:
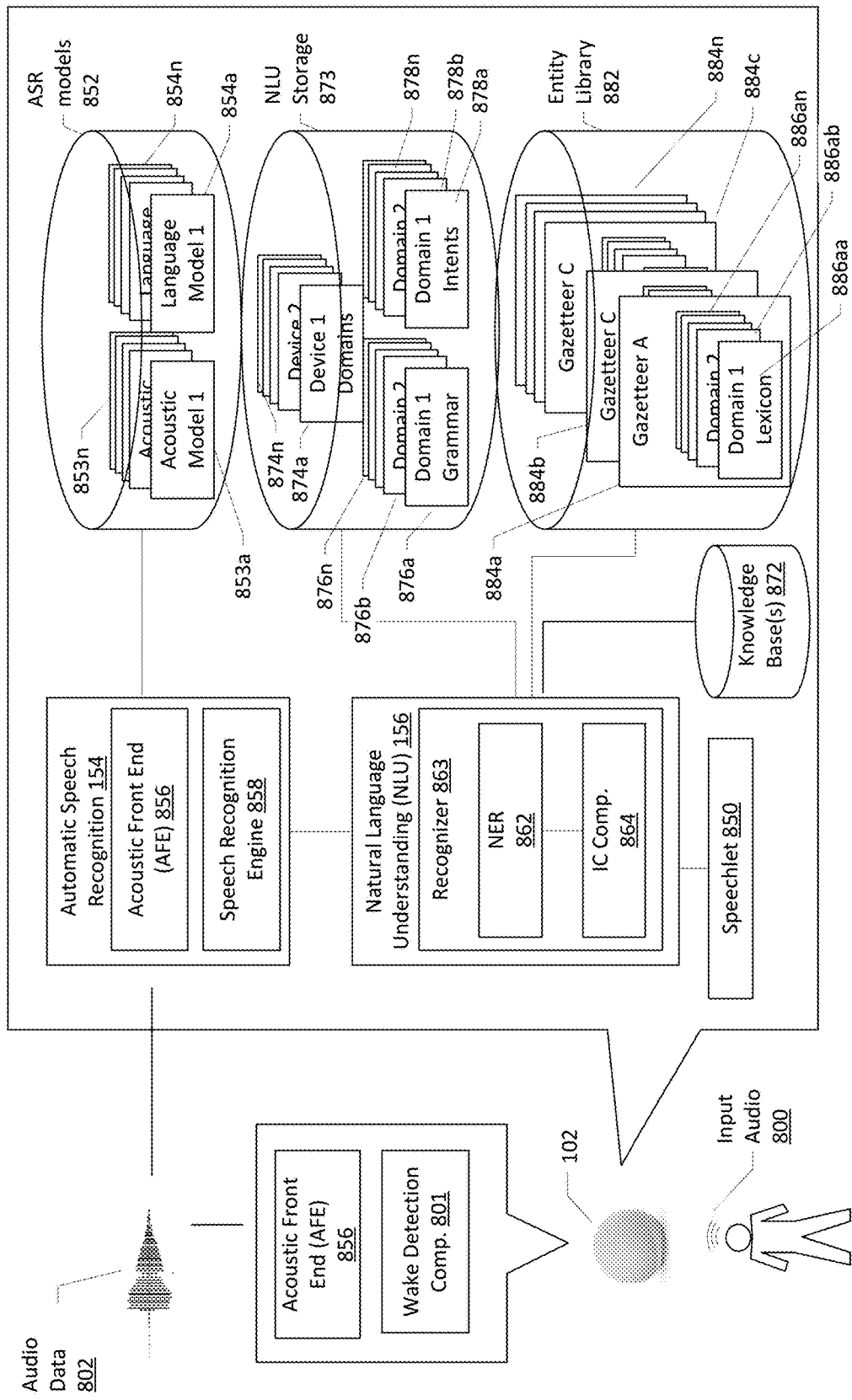
FIG. 8 illustrates a conceptual diagram of components of a speech-processing system for processing audio data provided by one or more devices.

FIG. 8 illustrates a conceptual diagram of components of a speech-processing system for processing audio data provided by one or more devices. FIG. 8 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 106). The various components illustrated may be located on a same device or different physical devices. Message between various components illustrated in FIG. 8 may occur directly or across a network 108. An audio capture component, such as a microphone 116 of the device 102, or another device, captures audio 800 corresponding to a spoken utterance. The device 102, using a wake-word component 801, then processes audio data corresponding to the audio 800 to determine if a keyword (such as a wakeword) is detected in the audio data. Following detection of a wakeword, the device 102 sends audio data 802 corresponding to the utterance to the remote system 106 that includes an ASR component 154. The audio data 802 may be output from an optional acoustic front end (AFE) 856 located on the device prior to transmission. In other instances, the audio data 802 may be in a different form for processing by a remote AFE 856, such as the AFE 856 located with the ASR component 154 of the remote system 106.

The wake-word component 801 works in conjunction with other components of the user device, for example a microphone to detect keywords in audio 800. For example, the device may convert audio 800 into audio data, and process the audio data with the wake-word component 801 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 801 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake-word component 801 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 802 corresponding to input audio 800 to the remote system 106 for speech processing. Audio data corresponding to that audio may be sent to remote system 106 for routing to a recipient device or may be sent to the remote system 106 for speech processing for interpretation of the included speech (either for purposes of enabling voice-messages and/or for purposes of executing a command in the speech). The audio data 802 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 106, an ASR component 154 may convert the audio data 802 into text. The ASR transcribes audio data into text data representing the words of the speech contained in the audio data 802. The text data may then be used by other components for various purposes, such as executing system commands, inputting data, etc. A spoken utterance in the audio data is input to a processor configured to perform ASR which then interprets the utterance based on the similarity between the utterance and pre-established language models 854 stored in an ASR model knowledge base (ASR Models Storage 852). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 853a-n stored in an ASR Models Storage 852), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 154 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 856 and a speech recognition engine 858. The acoustic front end (AFE) 856 transforms the audio data from the microphone into data for processing by the speech recognition engine 858. The speech recognition engine 858 compares the speech recognition data with acoustic models 853a-n, language models 854a-n, and other data models and information for recognizing the speech conveyed in the audio data. The AFE 856 may reduce noise in the audio data and divide the digitized audio data into frames representing time intervals for which the AFE 856 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 858 may process the output from the AFE 856 with reference to information stored in speech/model storage (852). Alternatively, post front-end processed data (such as feature vectors) may be received by the device executing ASR processing from another source besides the internal AFE. For example, the user device may process audio data into feature vectors (for example using an on-device AFE 856) and transmit that information to a server across a network for ASR processing. Feature vectors may arrive at the remote system 106 encoded, in which case they may be decoded prior to processing by the processor executing the speech recognition engine 858.

The speech recognition engine 858 attempts to match received feature vectors to language phonemes and words as known in the stored acoustic models 853a-n and language models 854a-n. The speech recognition engine 858 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, play my rock playlist?" The wake detection component may identify the wake word, otherwise described as a trigger expression, "Alexa," in the user utterance and may "wake" based on identifying the wake word. Audio data corresponding to the user utterance may be sent to the remote system 106, where the speech recognition engine 858 may identify, determine, and/or generate text data corresponding to the user utterance, here "play my rock playlist."

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. The user recognition engine may be utilized to determine a user profile and/or user identifier associated with the user that provided the user utterance. The user recognition engine will be described in more detail with respect to FIG. 10, below.

Following ASR processing, the ASR results may be sent by the speech recognition engine 858 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 106, for natural language understanding (NLU) processing, such as conversion of the text into commands for execution, either by the user device, by the remote system 106, or by another device (such as a server running a specific application like a search engine, etc.).

The device performing NLU processing 156 (e.g., server 106) may include various components, including potentially dedicated processor(s), memory, storage, etc. As shown in FIG. 8, an NLU component 156 may include a recognizer 863 that includes a named entity recognition (NER) component 862 which is used to identify portions of query text that correspond to a named entity that may be recognizable by the system. A downstream process called named entity resolution links a text portion to a specific entity known to the system. To perform named entity resolution, the system may utilize gazetteer information (884a-884n) stored in entity library storage 882. The gazetteer information may be used for entity resolution, for example matching ASR results with different entities (such as voice interface devices, smart devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 154 based on the utterance input audio 800) and attempts to make a semantic interpretation of the text. That is, the NLU process determines the meaning behind the text based on the individual words and then implements that meaning. NLU processing 156 interprets a text string to derive an intent or a desired action from the user as well as the pertinent pieces of information in the text that allow a device (e.g., device 102) to complete that action. For example, if a spoken utterance is processed using ASR 154 and outputs the text "play my rock playlist" the NLU process may determine that the user intended to have audio be output of songs associated with a "rock playlist."

The NLU may process several textual inputs related to the same utterance. For example, if the ASR 154 outputs N text segments (as part of an N-best list), the NLU may process all N outputs to obtain NLU results.

As will be discussed further below, the NLU process may be configured to parse and tag to annotate text as part of NLU processing. For example, for the text "play my rock playlist," "play" may be tagged as a command (to output audio) and "my rock playlist" may be tagged as the naming identifier of the content to be displayed.

To correctly perform NLU processing of speech input, an NLU process 156 may be configured to determine a "domain" of the utterance so as to determine and narrow down which services offered by the endpoint device (e.g., remote system 106 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 862 receives a query in the form of ASR results and attempts to identify relevant grammars and lexical information that may be used to construe meaning. To do so, the NLU component 156 may begin by identifying potential domains that may relate to the received query. The NLU storage 873 includes a database of devices (874a-874n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 863, language model and/or grammar database (876a-876n), a particular set of intents/actions (878a-878n), and a particular personalized lexicon (886). Each gazetteer (884a-884n) may include domain-indexed lexical information associated with a particular user and/or device. For example, the Gazetteer A (884a) includes domain-index lexical information 886aa to 886an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 864 parses the query to determine an intent or intents for each identified domain, where the intent corresponds to the action to be performed that is responsive to the query. Each domain is associated with a database (878a-878n) of words linked to intents. For example, A/V intent database may link words and phrases such as "turn on," "activate," and/or "enable," to a "turn on" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 864 identifies potential intents for each identified domain by comparing words in the query to the words and phrases in the intents database 878. In some instances, the determination of an intent by the IC component 864 is performed using a set of rules or templates that are processed against the incoming text to identify a matching intent.

In order to generate a particular interpreted response, the NER 862 applies the grammar models and lexical information associated with the respective domain to actually recognize a mention of one or more entities in the text of the query. In this manner, the NER 862 identifies "slots" or values (i.e., particular words in query text) that may be needed for later command processing. Depending on the complexity of the NER 862, it may also label each slot with a type of varying levels of specificity (such as noun, place, device name, device location, city, artist name, song name, amount of time, timer number, or the like). Each grammar model 876 includes the names of entities (i.e., nouns) commonly found in speech about the particular domain (i.e., generic terms), whereas the lexical information 886 from the gazetteer 884 is personalized to the user(s) and/or the device. For instance, a grammar model associated with the shopping domain may include a database of words commonly used when people discuss shopping.

The intents identified by the IC component 864 are linked to domain-specific grammar frameworks (included in 876) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "turn on" is an identified intent, a grammar (876) framework or frameworks may correspond to sentence structures such as "cause device with {Bedroom Light} identifier to turn on."

For example, the NER component 862 may parse the query to identify words as subject, object, verb, preposition, etc., based on grammar rules and/or models, prior to recognizing named entities. The identified verb may be used by the IC component 864 to identify intent, which is then used by the NER component 862 to identify frameworks. A framework for the intent of "play a song," meanwhile, may specify a list of slots/fields applicable to play the identified "song" and any object modifier (e.g., specifying a music collection from which the song should be accessed) or the like. The NER component 862 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 862 may search the database of generic words associated with the domain (in the knowledge base 872). So, for instance, if the query was "identify this song," after failing to determine which song is currently being output, the NER component 862 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 850. The destination speechlet 850 may be determined based on the NLU output. For example, if the NLU output includes a command to send a message, the destination speechlet 850 may be a message sending application, such as one located on the user device or in a message sending appliance, configured to execute a message sending command. If the NLU output includes a search request, the destination speechlet 850 may include a search engine processor, such as one located on a search server, configured to execute a search command. After the appropriate command is generated based on the intent of the user, the speechlet 850 may provide some or all of this information to a text-to-speech (TTS) engine. The TTS engine may then generate an actual audio file for outputting the audio data determined by the speechlet 850 (e.g., "okay," or "playing your rock playlist"). After generating the file (or "audio data"), the TTS engine may provide this data back to the remote system 106.

In the examples provided in this disclosure, the destination speechlet 850 may be determined based at least in part on an account-association status associated with the device from which the audio data 802 was received. For example, when audio data is received from a device associated with an active account-association session, the speech processing system may determine intent data that corresponds to the audio data. The intent data may indicate a requested action to be performed and a "payload" indicating details about the action. Examples include "play my rock playlist," "order pepperoni pizza," "play Game A," etc. In these examples, the determined intent is to output audio, initiate a food order, and initiate a game, respectively. The payload in these examples is the "rock playlist," "pepperoni pizza," and "Game A." In each of these examples, the speech processing system may determine how to service these intents utilizing the secondary or primary account data. For example, the secondary account data may be associated with a "rock playlist," and the primary account data may also be associated with a different "rock playlist" or no "rock playlist" at all. By way of additional example, when placing orders, the secondary account data may be associated with given payment identifiers while the primary account data may be associated with different payment identifiers. Additionally, the secondary account data may have certain applications and/or skills enabled while the primary account data may have different applications and/or skills enabled. As such, when an active account-association session is associated with a device from which audio data was received, the speech processing system may determine whether the secondary account data and/or the primary account data is to be utilized.

In examples, speaker identification as described more fully below, may be utilized to determine whether the secondary user is the person that provided the voice input to the device in question. When the secondary user is the person that provided the voice input, the speech processing system may, before or after the intent data is determined, utilize the secondary account data to determine how to respond to the voice input. Utilizing the examples provided above, the secondary account data may be associated with certain applications, skills, payment identifiers, and/or enabled domains for responding to voice input. In the "play my rock playlist" example, audio streaming applications that have been enabled in association with the secondary account data may be queried to service the intent. The secondary account data may indicate that, for a given audio streaming application, a playlist was created and is identified as "rock." In this example, the audio streaming application may be selected for servicing the intent and the application may provide and/or permit audio data representing songs from the rock playlist to be sent to the device and to be output by the device. In the "order pepperoni pizza" example, enabled applications and/or skills that are configured to allow for ordering pizza may be queried to service the intent, and payment identifiers associated with the secondary account data may be utilized to pay for the order. In the "play Game A" example, an enabled application and/or skill associated with Game A may be queried to service the intent.

In examples where the speaker identification processes described herein does not determine that the secondary user is the person that provided the voice input, or in other words that the person that provided the voice input is the primary account user and/or another user and/or is the secondary user but was not determined to be the secondary user to a threshold confidence level, the primary account data may be utilized to respond to the voice input. By so doing, the speech processing system allows for functionality of the secondary account to be utilized when the secondary user is the speaker, and the speech processing system allows for functionality of the primary account to be utilized when the secondary user is not the speaker. This may prevent and/or hinder the use of the secondary account data by unauthorized users.

In other examples, selection of the secondary account data or the primary account data for responding to a given voice command may be based at least in part on which account is configured to service the intent. For example, if the secondary account data indicates that an audio streaming application is enabled but the primary account data does not have an audio streaming application enabled, the secondary account data may be selected when the voice command is to output music. Additionally, even when both the secondary account data and the primary account data have applications and/or skills enabled to respond to a given voice command, the details of the voice command itself may be utilized to determine which account to utilize. For example, even if both accounts have an audio streaming application enabled, if the secondary account data includes a "rock playlist" but the primary account data does not include a playlist identified as "rock playlist," the secondary account data may be selected to service the intent of "play my rock playlist."

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 156 during runtime operations where NLU operations are performed on text (such as text output from an ASR component 154). Each domain may have specially configured components to perform various steps of the NLU operations.

For example, in an NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 863. Each recognizer may include various NLU components such as an NER component 862, IC component 864 and other components such as an entity resolver, or other components.

For example, a messaging domain recognizer 863-A (Domain A) may have an NER component 862-A that identifies what slots (i.e., portions of input text) may correspond to particular words relevant to that domain. The words may correspond to entities such as (for the messaging domain) a recipient. An NER component 862 may use a machine learning model, such as a domain specific conditional random field (CRF) to both identify the portions corresponding to an entity as well as identify what type of entity corresponds to the text portion. The messaging domain recognizer 863-A may also have its own intent classification (IC) component 864-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 106 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 106, as illustrated herein are exemplary, and may be located in a stand-alone device or may be included, in whole or in part, as a component of a larger device or system, may be distributed across a network or multiple devices connected by a network, etc.

Figure 9:
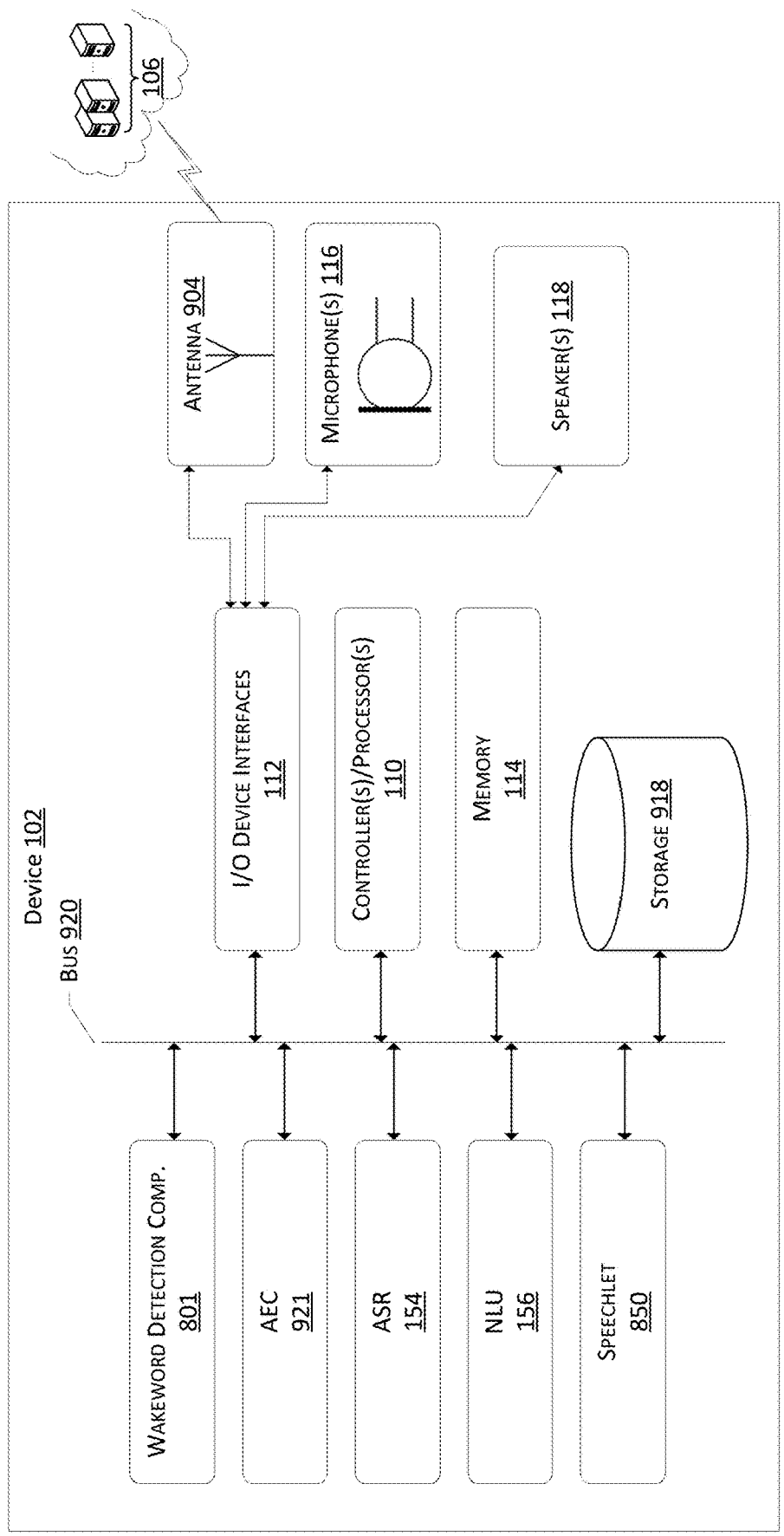
FIG. 9 illustrates a conceptual diagram of example components of a computing device configured to associate accounts with devices based on presence events.

FIG. 9 illustrates a conceptual diagram of example components of an electronic device configured to associate account data with voice interface devices. For example, the device may include one or more electronic devices such as voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. A second user profile may also be associated with one or more other electronic devices, which may be situated in home or other place associated with the second user profile, for example. The device 102 may be implemented as a standalone device that is relatively simple in terms of functional capabilities with limited input/output components, memory, and processing capabilities. For instance, the device 102 may not have a keyboard, keypad, touchscreen, or other form of mechanical input. In some instances, the device 102 may include a microphone 116, a power source, and functionality for sending generated audio data via one or more antennas 904 to another device and/or system.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include input devices such as a keyboard, a mouse, a touchscreen, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 116, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 9 may include one or more controllers/processors 110, that may include a central processing unit (CPU) for processing data and computer-readable instructions, and memory 114 for storing data and instructions of the device 102. In examples, the skills and/or applications described herein may be stored in association with the memory 114, which may be queried for content and/or responses as described herein. The device 102 may also be connected to removable or external non-volatile memory and/or storage, such as a removable memory card, memory key drive, networked storage, etc., through input/output device interfaces 112.

Computer instructions for operating the device 102 and its various components may be executed by the device's controller(s)/processor(s) 110, using the memory 114 as "working" storage at runtime. A device's computer instructions may be stored in a non-transitory manner in non-volatile memory 114, storage 918, or an external device(s). Alternatively, some or all of the executable instructions may be embedded in hardware or firmware on the device 102 in addition to or instead of software.

The device 102 may include input/output device interfaces 112. A variety of components may be connected through the input/output device interfaces 112. Additionally, the device 102 may include an address/data bus 920 for conveying data among components of the respective device. Each component within a device 102 may also be directly connected to other components in addition to, or instead of, being connected to other components across the bus 920.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 110 may comprise graphics processors for driving animation and video output on the associated display. As a way of indicating to a user that a connection between another device has been opened, the device 102 may be configured with one or more visual indicators, such as the light element(s), which may be in the form of LED(s) or similar components (not illustrated), that may change color, flash, or otherwise provide visible light output, such as for a notification indicator on the device 102. The input/output device interfaces 112 that connect to a variety of components. This wired or a wireless audio and/or video port may allow for input/output of audio/video to/from the device 102. The device 102 may also include an audio capture component. The audio capture component may be, for example, a microphone 116 or array of microphones, a wired headset or a wireless headset, etc.

The microphone 116 may be configured to capture audio. If an array of microphones is included, approximate distance to a sound's point of origin may be determined using acoustic localization based on time and amplitude differences between sounds captured by different microphones of the array. The device 102 (using microphone 116, wakeword detection component 901, ASR component 154, etc.) may be configured to generate audio data corresponding to captured audio. The device 102 (using input/output device interfaces 112, antenna 904, etc.) may also be configured to transmit the audio data to the remote system 106 for further processing or to process the data using internal components such as a wakeword detection component 801.

Via the antenna(s) 904, the input/output device interface 112 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s), the system may be distributed across a networked environment. Accordingly, the device 102 and/or the remote system 106 may include an ASR component 154. The ASR component 154 of device 102 may be of limited or extended capabilities. The ASR component 154 may include language models stored in ASR model storage component, and an ASR component 154 that performs automatic speech recognition. If limited speech recognition is included, the ASR component 154 may be configured to identify a limited number of words, such as keywords detected by the device, whereas extended speech recognition may be configured to recognize a much larger range of words.

The device 102 and/or the remote system 106 may include a limited or extended NLU component 156. The NLU component 156 of device 102 may be of limited or extended capabilities. The NLU component 156 may comprise a name entity recognition module, an intent classification module and/or other components. The NLU component 156 may also include a stored knowledge base and/or entity library, or those storages may be separately located.

In examples, AEC may also be performed by the device 102. In these examples, the operations may include causing the AEC component 921824- to be enabled or otherwise turned on, or the operations may include causing the AEC component 921824 to transition from a first mode to a second mode representing a higher sensitivity to audio data generated by the microphone 116. The AEC component 921824 may utilize the audio data generated by the microphone 116 to determine if an audio fingerprint of the audio data, or portion thereof, corresponds to a reference audio fingerprint associated with the predefined event.

The device 102 and/or the remote system 106 may also include a speechlet 850 that is configured to execute commands/functions associated with a spoken command as described herein. The device 102 may include a wakeword detection component 801, which may be a separate component or may be included in an ASR component 154. The wakeword detection component 801 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

Figure 10:
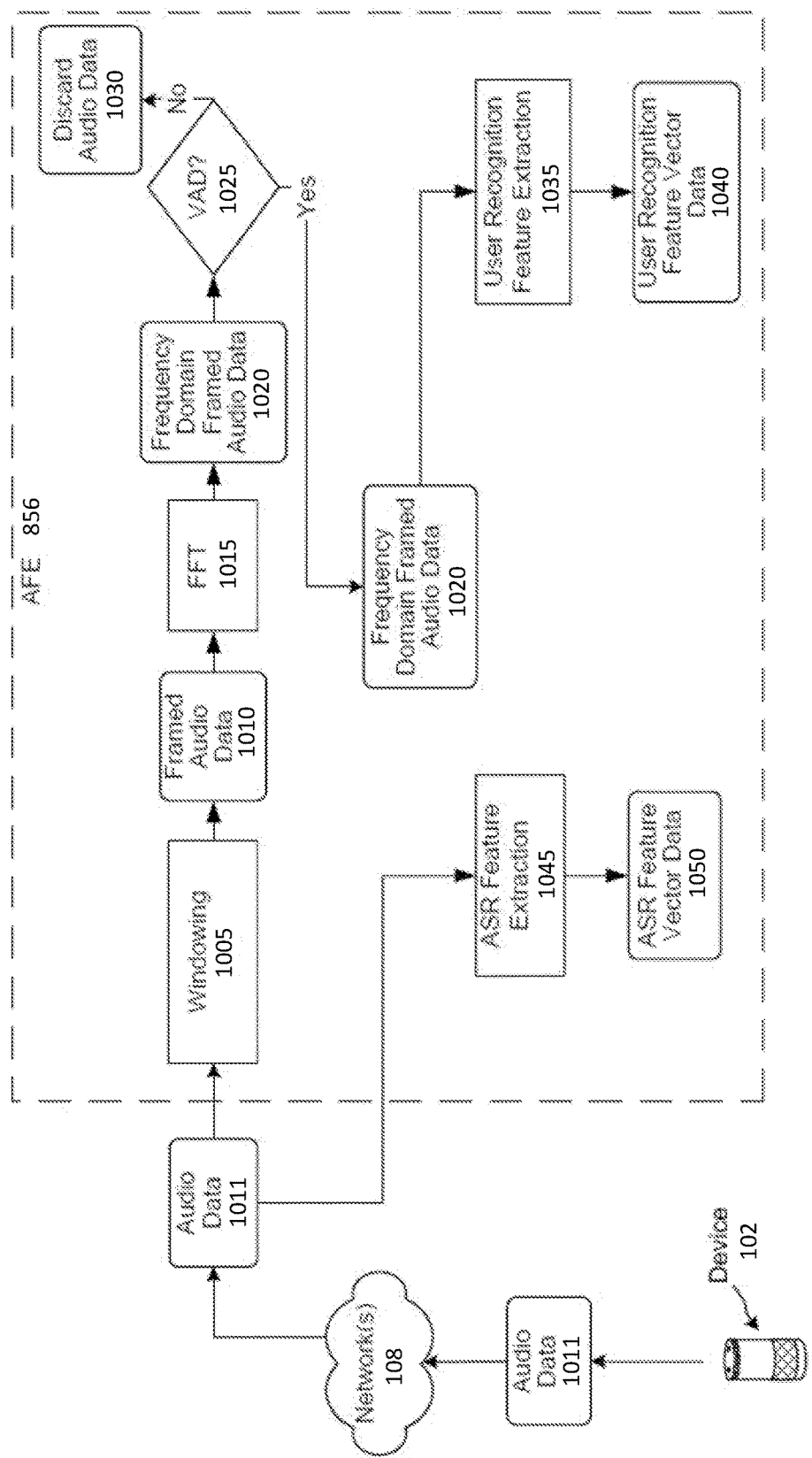
FIG. 10 is a flow diagram illustrating processing that may be performed to prepare audio data for ASR processing and user recognition processing according to embodiments of the present disclosure.

FIG. 10 illustrates processing that may be performed to prepare the audio data 1011 for ASR processing and user recognition processing. As described, the device 102 sends the audio data 1011 through a network(s) 108 to the system(s) for processing. The system(s) may include an acoustic front end (AFE) 856 (or other component(s)) that performs various functions on the audio data 1011 to prepare the audio data 1011 for further downstream processing, such as ASR processing and/or user recognition processing. For example, the AFE 856 may include a windowing component 1005 that performs windowing functions on the audio data 1011 to create framed audio data 1010 (e.g., waveforms). The size of each frame may depend upon implementation. In an example, each frame may include twenty-five (25) milliseconds (m/s) of audio data, with an overlap of the next frame of 10 ms of data, thus resulting in sliding window processing of audio data. Performing a windowing function may include multiplying a time record by a finite-length window with an amplitude that varies smoothly and gradually toward zero at its edges. By performing such, the endpoints of the waveforms of respective frames of audio data meet, resulting in a continuous waveform without sharp transitions. The AFE 856 may include a fast Fourier transform (FFT) component 1015 configured to perform FFT to convert the waveforms in each frame of the framed audio data 1010 from its original domain (e.g., time) to a representation in a frequency domain (thereby creating frequency domain framed audio data 1020). Audio processing techniques other than or in addition to FFT may be used to transform audio data (e.g., waveforms) into data that can be processed as needed.

The AFE 856 may include a voice activity detection (VAD) component 1025 that determines whether voice activity (i.e., speech) is present in the post-FFT waveforms (i.e., frequency domain framed audio data 1020). In doing so, the system(s) may perform VAD operations discussed above. The VAD detector (or other component) may be configured in a different order, for example the VAD detector may operate on the audio data 1011 rather than on the frequency domain framed audio data 1020, may operate on ASR features, etc. Various different configurations of components are possible. If there is no speech in the frequency domain framed audio data 1020, the system(s) discards (1030) the frequency domain framed audio data 1005 (i.e., removes the audio data from the processing stream). If, instead, the system(s) detects speech in the frequency domain framed audio data 1020, the system(s) executes a user recognition feature extraction component 1035 with respect to the frequency domain framed audio data 1020.

The user recognition feature extraction component 1035 may perform frame level feature extraction and/or utterance level feature extraction. The frame level feature extraction may determine which frame of a universal background model (UBM) the frame corresponds to. The UBM may be a Gaussian mixture model, a deep neural network, etc. The utterance level feature extraction may analyze aligned speech frames to derive feature vectors of fixed length (i.e., the user recognition feature vector data 1040). The user recognition feature extraction component 1035 may continue to process until voice activity is no longer detected in the frequency domain framed audio data 1020, at which point the system(s) may determine that an endpoint of the speech has been reached.

An ASR feature extraction component 1045 may perform ASR feature extraction on all of the audio data 1011 received from the device 102. Alternatively (not illustrated), the ASR feature extraction component 1045 may only perform ASR feature extraction on audio data including speech (e.g., as indicated by the VAD component 1025). The ASR feature extraction component 1045 and/or the user recognition feature extraction component 1035 may determine values (i.e., features) representing qualities of the frequency domain framed audio data 1020, along with quantitating those features into values (i.e., feature vectors or audio feature vectors). The ASR feature extraction component 1045 may determine ASR feature vector data 1050 useful for ASR processing, and the user recognition feature extraction component 1035 may determine user recognition feature vector data 1040 (sometimes called an i-vector) useful for user recognition processing. The ASR feature vector data 1050 and the user recognition feature vector data 1040 may be the same feature vectors, different feature vectors, or may include some overlapping features. A number of approaches may be used to extract feature vectors from the frequency domain framed audio data 1020, such as MFCCs, PLP techniques, neural network feature vector techniques, linear discriminant analysis, semi-tied covariance matrices, or other approaches known to those skilled in the art.

The ASR feature vector data 1050 may include a different audio feature vector for each audio frame. Thus, for one 25 ms long audio frame, the ASR feature extraction component 1045 may output a single ASR feature vector. The ASR feature vector data 1050 may be input to the ASR component 154.

Depending on system configuration, the user recognition feature extraction component 1035 may output multiple user recognition feature vectors, for example one such vector for each audio frame. Alternatively, the user recognition feature extraction component 1035 may continue to input the frequency domain framed audio data 1020 while the utterance is ongoing (e.g., before the endpoint of the speech is reached in the audio data 1011). While the frequency domain framed audio data 1020 is input, the user recognition feature extraction component 1035 may accumulate or otherwise combine the frequency domain framed audio data 1020 as it comes in. That is, for a certain frame's worth of frequency domain framed audio data 1020 that comes in, the user recognition feature extraction component 1035 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the user recognition feature extraction component 1035 may depend on what audio qualities are determined to be important for ultimate user recognition processing. Thus, the user recognition feature extraction component 1035 may be trained to isolate and process data that is most useful for user recognition processing. The output of the user recognition feature extraction component 1035 may thus include user recognition feature vector data 1040 that includes values for features useful for user recognition processing. The resulting user recognition feature vector data 1040 may be input to the user recognition engine 999.

The user recognition feature vector data 1040 may include multiple vectors each corresponding to different portions of a spoken user input. Alternatively, the user recognition feature vector data 1040 may be a single vector representing audio qualities of the spoken user input.

Figure 11:
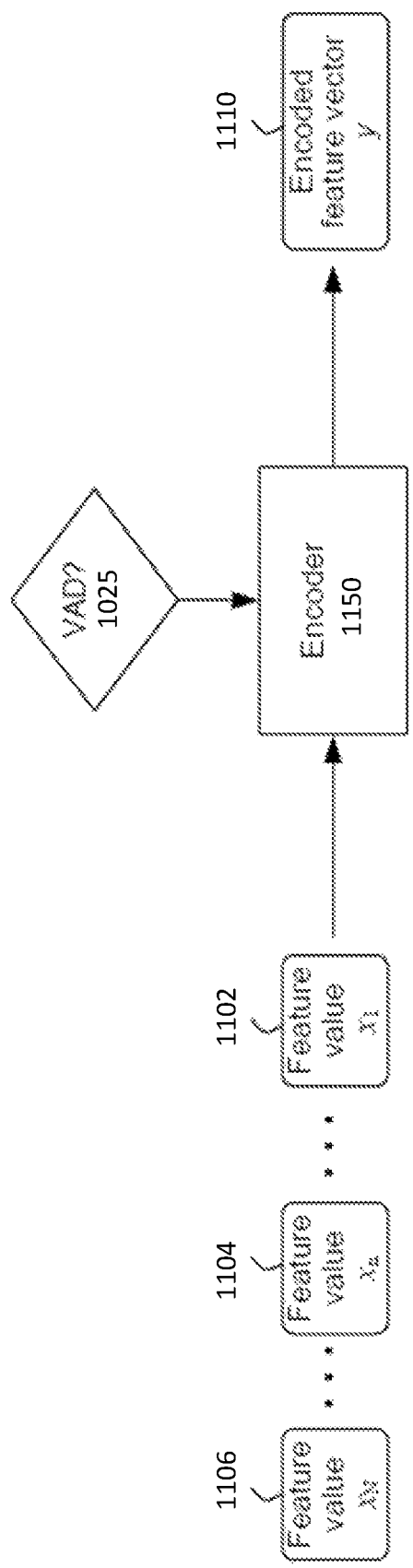
FIG. 11 is a diagram of a vector encoder according to embodiments of the present disclosure.

Referring to FIG. 11, the single vector may be created using an encoder 1150, which can create a fixed-size vector to represent certain characteristics of the audio data as described below. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on use of the encoded vector and other system configurations. As shown in FIG. 11, feature values 1102 through 1106 (which may include feature vectors of the audio data 1011, the frequency domain framed audio data 1020, or the like) may be input into an encoder 1150, which will output an encoded feature vector 1110 that represents the input feature values. Output of the VAD component 1025 may be an input into the encoder 1150 such that the encoder 1150 may only operate when feature values input therein correspond to speech. The individual feature values (e.g., 1102-1106) may correspond to specific audio frames. Regardless of how many feature values are input, any particular encoder 1150 will be configured to output vectors of the same size, thus ensuring a continuity of output encoded vector size from any particular encoder 1150 (though different encoders may output vectors of different fixed sizes) and enabling comparing different feature vectors y. The value y may be called an embedding of the sequence $x_1, \ldots x_N$. The length of x, and y are fixed and known a-priori, but the length of N of feature sequence $x_1, \ldots x_N$ is not necessarily known a-priori. The encoder 1150 may be implemented as a neural network (NN), recurrent neural network (RNN), GMM, or other model. One particular example is a long short-term memory (LSTM) RNN. There are a variety of ways for the encoder 1150 to consume data input therein, including but not limited to:

linear, one direction (forward or backward),
  bi-linear, essentially the concatenation of a forward and a backward embedding, or
  tree, based on parse-tree of the sequence.

In addition, an attention model can be used, which is another RNN or deep neural network (DNN) that learns to "attract" attention to certain parts of the input. The attention model can be used in combination with the above methods of consuming the input.

FIG. 11 illustrates operation of the encoder 1150. The input feature value sequence, starting with feature value $x_1$ 1102, continuing through feature value $x_n$ 1104, and concluding with feature value $x_N$ 1106 is input into the encoder 1150. The encoder 1150 may process the input feature values as noted above. The encoder 1150 outputs the encoded feature vector y 1110, which is a fixed length feature vector of length F. Thus, the user recognition feature extraction component 1035 may include an encoder 1150 that receives audio feature values for a particular spoken user input, and outputs a fixed length encoded feature vector y 1110, which may be the user recognition feature/vector data 1040. Thus, in certain system configurations, no matter how long the spoken user input is, or how many acoustic frames worth of feature values are input into the encoder 1150, the output feature vector 1110/1040 will be of the same length, thus allowing for more ease of performing user recognition processing by the user recognition engine 999. To allow for robust system operation, a final vector 1110/1040 may include many dimensions (e.g., several hundred), thus providing many datapoints for downstream consideration.

To determine the user recognition feature vector data 1040, the system(s) may (for example using the VAD component 1025) determine that voice activity is detected in input audio data. This may indicate the beginning of the spoken user input, thus resulting in the system(s) determining that the spoken user input starts at a first point in audio data. Audio processing (for example performed by the windowing component 1005, the FFT component 1015, the ASR feature extraction component 1045, the user recognition feature extraction component 1035, ASR processing, or the like) may continue on audio data starting at the first point and continuing until the VAD component 1025 determines that voice activity is no longer detected at a second point in audio data. Thus, the system(s) may determine that the spoken user input ends at the second point. Thus, the first point may be considered the beginpoint of the spoken user input and the second point may be considered the endpoint of the spoken user input. The VAD component 1025 may signal the user recognition feature extraction component 1035 when the beginpoint and/or endpoint is detected so that the user recognition feature extraction component 1035 may begin processing audio data starting at the beginpoint and ending at the endpoint. Further, audio frames during the spoken user input that do not include speech may be filtered out by the VAD component 1025 and thus not considered by the ASR feature extraction component 1045 and/or the user recognition feature extraction component 1035. The resulting accumulated/processed speech audio data (from beginpoint to endpoint) may then be represented in a single feature vector for the user recognition feature vector data 1040, which may then be used for user recognition processing.

Figure 12:
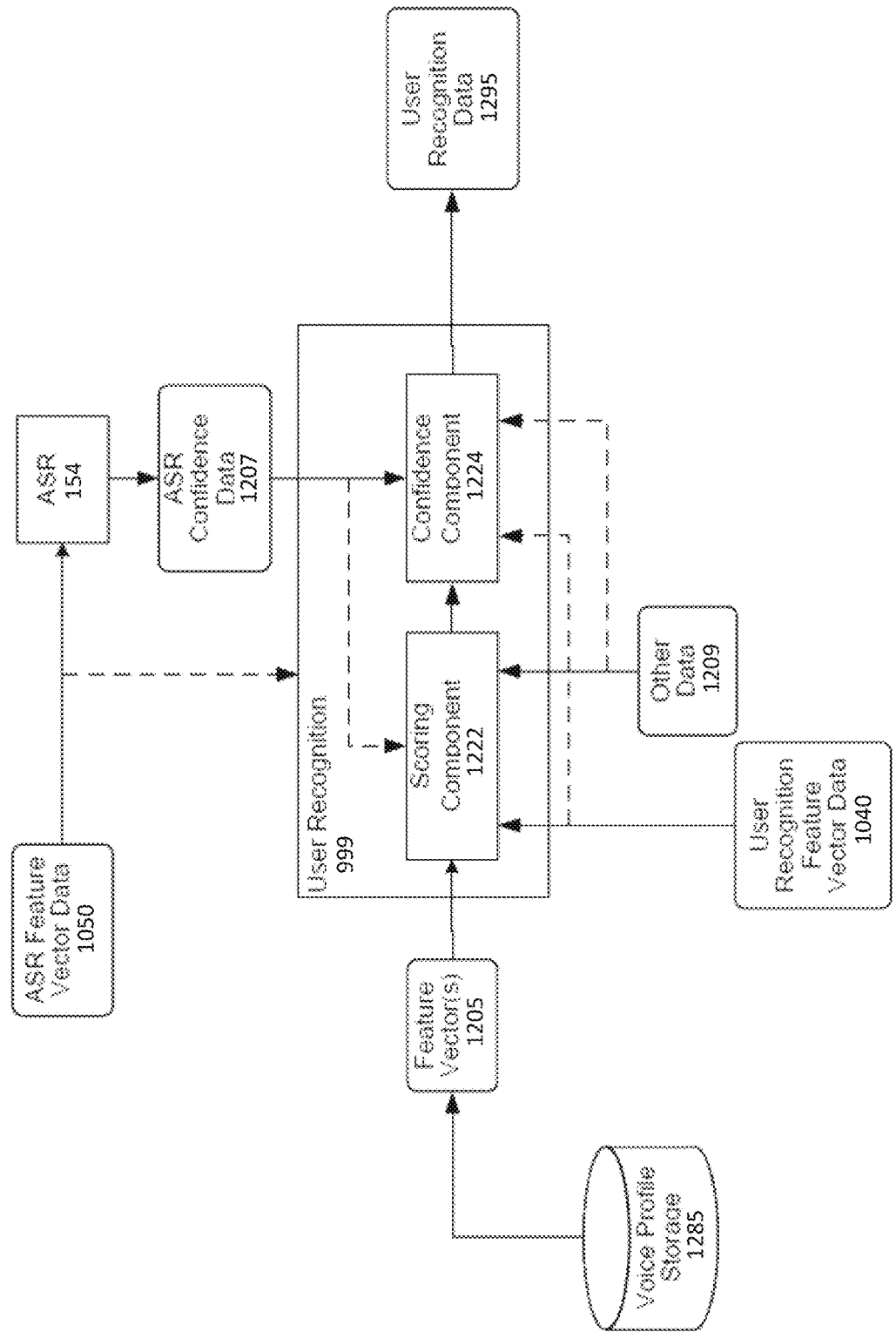
FIG. 12 is a system flow diagram illustrating user recognition according to embodiments of the present disclosure.

FIG. 12 illustrates user recognition processing as may be performed by a user recognition engine 999. The ASR component 154 performs ASR processing on the ASR feature vector data 1050 as described above. ASR confidence data 1207 may be passed to the user recognition engine 999.

The user recognition engine 999 performs user recognition using various data including the user recognition feature vector data 1040, feature vectors 1205 representing explicit and/or anonymous voice profiles, the ASR confidence data 1207, and other data 1209. The user recognition engine 999 may output the user recognition data 1295, which reflects a certain confidence that the user input was spoken by one or more particular users. The user recognition data 1295 may include one or more user identifiers (e.g., corresponding to one or more explicit voice profiles and/or one or more anonymous voice profiles). Each user identifier in the user recognition data 1295 may be associated with a respective confidence value, representing a likelihood that the user input corresponds to the user identifier. A confidence value may be a numeric or binned value.

The feature vector(s) 1205 input to the user recognition engine 999 may correspond to one or more anonymous voice profiles and/or one or more explicit voice profiles. The user recognition engine 999 may use the feature vector(s) 1205 to compare against the user recognition feature vector 1040, representing the present user input, to determine whether the user recognition feature vector 1040 corresponds to one or more of the feature vectors 905 of the anonymous and/or explicit voice profiles.

Each feature vector 1205 may be the same size as the user recognition feature vector 1040. For example, if the user recognition feature vector 1004 is of size F (for example encoded by the encoder 1150), a feature vector 1205 may also be of size F.

To perform user recognition, the user recognition engine 999 may determine the device 102 from which the audio data 1011 originated. For example, the audio data 1011 may be associated with metadata including a device identifier representing the device 102. Either the device 102 or the system(s) may generate the metadata. The system(s) may determine a group profile identifier associated with the device identifier, may determine user identifiers associated with the group profile identifier, and may include the group profile identifier and/or the user identifiers in the metadata. The system(s) may associate the metadata with the user recognition feature vector 1040 produced from the audio data 1011. The user recognition engine 999 may send a signal to the voice profile storage 1285, with the signal requesting only audio data and/or feature vectors 1205 (depending on whether audio data and/or corresponding feature vectors are stored) associated with the device identifier, the group profile identifier, and/or the user identifiers represented in the metadata. This limits the universe of possible feature vectors 1205 the user recognition engine 999 considers at runtime and thus decreases the amount of time to perform user recognition processing by decreasing the amount of feature vectors 1205 needed to be processed. Alternatively, the user recognition engine 999 may access all (or some other subset of) the audio data and/or feature vectors 1205 available to the user recognition engine 999. However, accessing all audio data and/or feature vectors 1205 will likely increase the amount of time needed to perform user recognition processing based on the magnitude of audio data and/or feature vectors 1205 to be processed.

If the user recognition engine 999 receives audio data from the voice profile storage 1285, the user recognition engine 999 may generate one or more feature vectors 1205 corresponding to the received audio data.

The user recognition engine 999 may attempt to identify the user that spoke the speech represented in the audio data 1011 by comparing the user recognition feature vector 1040 to the feature vector(s) 1205. The user recognition engine 999 may include a scoring component 1222 that determines respective scores indicating whether the user input (represented by the user recognition feature vector 1040) was spoken by one or more particular users (represented by the feature vector(s) 1205). The user recognition engine 999 may also include a confidence component 1224 that determines an overall accuracy of user recognition processing (such as those of the scoring component 1222) and/or an individual confidence value with respect to each user potentially identified by the scoring component 1222. The output from the scoring component 1222 may include a different confidence value for each received feature vector 1205. For example, the output may include a first confidence value for a first feature vector 1205*a* (representing a first anonymous or explicit voice profile), a second confidence value for a second feature vector 1205*b* (representing a second anonymous or explicit voice profile), etc. Although illustrated as two separate components, the scoring component 1222 and the confidence component 1224 may be combined into a single component or may be separated into more than two components.

The scoring component 1222 and the confidence component 1224 may implement one or more trained machine learning models (such neural networks, classifiers, etc.) as known in the art. For example, the scoring component 1222 may use probabilistic linear discriminant analysis (PLDA) techniques. PLDA scoring determines how likely it is that the user recognition feature vector 740 corresponds to a particular feature vector 1205. The PLDA scoring may generate a confidence value for each feature vector 1205 considered and may output a list of confidence values associated with respective user identifiers, anonymous voice profile identifiers, and/or explicit voice profile identifiers. The scoring component 1222 may also use other techniques, such as GMMs, generative Bayesian models, or the like, to determine confidence values.

The confidence component 1224 may input various data including information about the ASR confidence 1207, speech length (e.g., number of frames or other measured length of the user input), audio condition/quality data (such as signal-to-interference data or other metric data), fingerprint data, image data, or other factors to consider how confident the user recognition engine 999 is with regard to the confidence values linking users to the user input. The confidence component 1224 may also consider the confidence values and associated identifiers output by the scoring component 1222. For example, the confidence component 1224 may determine that a lower ASR confidence 1207, or poor audio quality, or other factors, may result in a lower confidence of the user recognition engine 999. Whereas a higher ASR confidence 1207, or better audio quality, or other factors, may result in a higher confidence of the user recognition engine 999. Precise determination of the confidence may depend on configuration and training of the confidence component 1224 and the model(s) implemented thereby. The confidence component 1224 may operate using a number of different machine learning models/techniques such as GMM, neural networks, etc. For example, the confidence component 1224 may be a classifier configured to map a score output by the scoring component 1222 to a confidence value.

The user recognition engine 999 may output user recognition data 1295 specific to a single user identifier, anonymous voice profile identifier, or explicit voice profile identifier (or one or more user identifiers, one or more anonymous voice profile identifiers, and/or one or more explicit voice profile identifiers in the form of an N-best list). For example, the user recognition engine 999 may output user recognition data 1295 with respect to each received feature vector 1205. The user recognition data 1295 may include numeric confidence values (e.g., 0.0-1.0, 0-1000, or whatever scale the system is configured to operate). Thus the user recognition data 1295 may output an N-best list of potential users with numeric confidence values (e.g., user identifier 123—0.2, anonymous voice profile identifier 234—0.8). Alternatively or in addition, the user recognition data 1295 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition engine 999 may output an N-best list of potential users with binned confidence value (e.g., user identifier 123—low, anonymous voice profile identifier 234—high). Combined binned and numeric confidence value outputs are also possible. Rather than a list of identifiers and their respective confidence values, the user recognition data 1295 may only include information related to the top scoring identifier as determined by the user recognition engine 999. The user recognition engine 999 may also output an overall confidence value that the individual confidence values are correct, where the overall confidence value indicates how confident the user recognition engine 999 is in the output results. The overall confidence value may be determined by the confidence component 1224.

The confidence component 1224 may determine differences between individual confidence values when determining the user recognition data 1295. For example, if a difference between a first confidence value and a second confidence value is large, and the first confidence value is above a threshold confidence value, then the user recognition engine 999 395 is able to recognize a first user (associated with the feature vector 1205 associated with the first confidence value) as the user that spoke the user input with a much higher confidence than if the difference between the confidence values were smaller.

The user recognition engine 999 may perform thresholding to avoid incorrect user recognition data 1295 being output. For example, the user recognition engine 999 may compare a confidence value output by the confidence component 1224 to a threshold confidence value. If the confidence value does not satisfy (e.g., does not meet or exceed) the threshold confidence value, the user recognition engine 999 may not output user recognition data 1295, or may only include in that data 1295 an indicator that a user speaking the user input could not be recognized. Further, the user recognition engine 999 may not output user recognition data 1295 until enough user recognition feature vector data 1240 is accumulated and processed to verify a user above a threshold confidence value. Thus the user recognition engine 999 may wait until a sufficient threshold quantity of audio data of the user input has been processed before outputting user recognition data 1295. The quantity of received audio data may also be considered by the confidence component 1224.

The user recognition engine 999 may be defaulted to output binned (e.g., low, medium, high) user recognition confidence values. However, such may be problematic in certain situations. For example, if the user recognition engine 999 computes a single binned confidence value for multiple feature vectors 1205, the system may not be able to effectively determine which user originated the user input. In this situation, the user recognition engine 999 may be configured to override its default setting and output numeric confidence values. This enables the system to determine a user, associated with the highest numeric confidence value, originated the user input.

The user recognition engine 999 may use other data 1209 to inform user recognition processing. A trained model(s) or other component of the user recognition engine 999 may be trained to take other data 1209 as an input feature when performing user recognition processing. Other data 1209 may include a variety of data types depending on system configuration and may be made available from other sensors, devices, or storage. The other data 1209 may include a time of day at which the audio data 1011 was generated by the device 102 or received from the device 102, a day of a week in which the audio data audio data 1011 was generated by the device 102 or received from the device 102, etc.

The other data 1209 may include image data or video data. For example, facial recognition may be performed on image data or video data received from the device 102 from which the audio data 1011 was received (or another device). Facial recognition may be performed by the user recognition engine 999, or another component of the system(s). The output of facial recognition processing may be used by the user recognition engine 999. That is, facial recognition output data may be used in conjunction with the comparison of the user recognition feature vector 1040 and one or more feature vectors 1205 to perform more accurate user recognition processing.

The other data 1209 may include location data of the device 102. The location data may be specific to a building within which the device 102 is located. For example, if the device 102 is located in user A's bedroom, such location may increase a user recognition confidence value associated with user A and/or decrease a user recognition confidence value associated with user B.

The other data 1209 may include data indicating a type of the device 102. Different types of devices may include, for example, a smart watch, a smart phone, a tablet computer, and a vehicle. The type of the device 102 may be indicated in a profile associated with the device 102. For example, if the device 102 from which the audio data 1011 was received is a smart watch or vehicle belonging to a user A, the fact that the device 102 belongs to user A may increase a user recognition confidence value associated with user A and/or decrease a user recognition confidence value associated with user B.

The other data 1209 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the audio data 1011 is generated by the vehicle. As such, if the vehicle is located at a coordinate corresponding to a work location/building of user A, such may increase a user recognition confidence value associated with user A and/or decrease user recognition confidence values of all other users indicated in a group profile associated with the vehicle. Global coordinates and associated locations (e.g., work, home, etc.) may be indicated in a profile associated with the device 102. The global coordinates and associated locations may also or alternatively be associated with one or more user profiles.

The other data 1209 may include data representing activity of a particular user that may be useful in performing user recognition processing. For example, if a user has recently entered a code to disable a home security alarm, and the audio data 1011 was received from a device 102 represented in a group profile associated with the home, signals from the home security alarm about the disabling user, time of disabling, etc. may be reflected in the other data 1209 and considered by the user recognition engine 999. If a mobile device (such as a smart phone, Tile, dongle, or other device) known to be associated with a particular user is detected proximate to (for example physically close to, connected to the same WiFi network as, or otherwise nearby) the device 102, this may be reflected in the other data 1209 and considered by the user recognition engine 999.

Depending on system configuration, the other data 1209 may be configured to be included in the user recognition feature vector data 1040 (for example using the encoder 1150) so that all the data relating to the user input to be processed by the scoring component 1222 may be included in a single feature vector. Alternatively, the other data 1209 may be reflected in one or more different data structures to be processed by the scoring component 1222.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The foregoing illustrates processes that may be performed at runtime to recognize a user that spoke a user input. As indicated previously, the system(s) may be configured to update voice profiles during offline operations. Such voice profile updating may use audio data representing previous spoken user inputs, which were not requested by the system(s).

FIG. 13 illustrates a conceptual diagram of example components utilized for presence-based account data association with devices. It should be understood that while the operations described with respect to FIG. 13 are described in a stepwise process from steps 1 to 13, the processes may be performed in a different order and/or in parallel and may include more or less than 13 steps.

At step 1, an indication of presence may be generated as described in. In examples, the indication may be based at least in part on receiving a signal from a secondary device as described herein. In other examples, a user may provide a user utterance to one or more of the primary devices 102 indicating an intent to associate the secondary user's account data with the primary devices 102. For example, the user may speak the phrase "connect me here." Microphones of the primary device 102 may capture this audio, generate corresponding audio data, and send the audio data to a remote system, and specifically to the speech-processing system 138. The remote system may determine that the user utterance includes the phrase "connect me here" or a similar phrase, and may utilize a account speechlet 1302 configured to handle performance of operations associated with such an utterance to initiate account data association.

For example, at step 2, the account speechlet 1302 may query the settings component 1304 to determine if the primary device 102 is associated with account data that indicates secondary account access has been enabled utilizing the primary device 102. In this example, the primary device user has provided consent to enable secondary account access and, at step 3, the account speechlet 1302 may query the user identifier component 1306 to determine a user identifier associated with the request to associate account data with the primary device 102. The user identifier component 1306 may provide an indication of whether secondary account access has been set up in association with the secondary user's account.

At step 4, the account speechlet 1302 may instruct the account component 1308 to generate a secondary account session. The account speechlet 1302 may then be utilized to cause the primary devices 102 to output audio representing a request for identifying information of a mobile device associated with the guest user. For example, the audio may include synthesized speech stating "what is your phone number?" The secondary user may provide another user utterance that includes the requested identifying information, such as the phone number associated with the mobile device of the guest user. The microphones may capture that audio, generate corresponding audio data, and send the audio data to the remote system. The account speechlet 1302 may receive data indicating the identifying information and may query the user identifier component 1306 for account data information associated with the guest user. The user identifier component 1306 may utilize the provided phone number to determine the mobile device identifier associated with the guest user and the guest user's account. The user identifier component 1306 may provide this information, which may include the guest user's identification, the host user's identification, and/or settings information, to the account speechlet 1302, which may cause the account component 1308 to initiate the guest session. In other examples, such as when an identifier of the primary device and/or primary account is a remembered location identifier as described herein, the system may determine to refrain from requesting user input, such as a mobile device telephone number or other identifier.

At step 5, the account component 1308 may query an audio cache 1310 for the audio data representing one or more of the user utterances provided by the guest user, such as the audio data representing the phone number requested in the operations above. At step 6, the ASR component 154 may perform an analysis of the audio data corresponding to the secondary user's voice to determine if a voice profile associated with the audio data corresponds to the reference voice profile of the secondary user that was generated as part of the secondary account setup process. The ASR component 154 may compare the characteristics of the audio data with the characteristics of the reference voice profile to determine whether the characteristics correspond to each other, such as to a threshold degree of confidence. In examples where the characteristics correspond, the ASR component 154 may return data to the account component 1308 indicating that voice authentication of the secondary user was successful and account data association may continue. It should be understood that while authentication of the secondary user as described above includes the use of voice recognition techniques, additional and/or different techniques may also be utilized, such as facial recognition techniques in instances where the primary device and/or another associated device includes a camera and the guest user has consented to the capture of images of the guest user for authentication purposes. Also, speaker identification may be utilized as described herein as a presence-based signal to determine when to associate a secondary account with a primary device, and/or when to utilize secondary account data to respond to a request received at a primary device.

The account component 1308 may update the session to indicate that voice authentication of the secondary user is successful and may, at step 7, utilize the workflow manager 1312 to set up a disconnection routine for the session. For example, the disconnection routine may include indicating options for when the secondary user's account data will be disassociated with the primary user's devices. These options may include, for example, when the remote system determines that a user utterance is received indicating an intent by the secondary user and/or the primary user to disassociate the secondary user's account data from the primary user's devices, when the remote system receives input data, such as via a voice interface device application 1318, from the mobile device of the secondary user and/or the primary user indicating a request to disassociate the account data, when another session is initiated using the primary devices, and/or after the expiration of a predefined amount of time, such as 24 hours for example.

At step 8, the account component 1308 may be utilized query a notification component 152 to generate one or more notifications for sending to the secondary user and/or the primary user. For example, the notification component 152, at step 9, may identify and/or generate a message and may send the message to the mobile device, such as by utilizing the phone number provided in the operations above. The message may include a deep link which may cause an alert to be displayed on a screen of the mobile device. The alert may be selectable to cause the voice interface device application 1318 to initiate and display the message. The message may include an indication that a session has been initiated and may request user input to further authenticate that the user desires to associate his or her account data with the primary user's devices. For example, at step 10, the user may provide touch input to a portion of the screen displaying a user interface that includes a selectable portion to confirm that the secondary user's account data should be associated with the primary user's devices. At step 11, data indicating this confirmation may be sent to the account component 1308, which may determine that two-factor authentication, such as voice authentication and confirmation from the voice interface device application, is successful. The account component 1308 may update the session to indicate that the two-factor authentication is successful. In other examples, an error may occur during the authentication process utilizing the voice interface device application. For example, the application may be utilized by more than one account holder and in some instances an account other than the one associated with the secondary user may be logged in to at the time that the request for verification is received. This may lead to a person identification mismatch, which may cause the application to render a user interface indicating the mismatch. The secondary user may utilize this information to sign out of the other account and sign in to the secondary user's account to provide the requested verification. In still other examples, no session may be found during this verification process. For example, when a request for verification is sent to the mobile device, the request may be associated with a predefined timeout limit for the verification to occur, such as 10 minutes. If the predefined timeout limit has expired, the session may expire, and the mobile device may render a user interface indicating that the session has expired.

The account component 1308 may then utilize the notification component 152 to send a notification one or more devices of the host user indicating that a secondary user's account data has been associated with the primary user's devices. This may allow the primary user to initiate a disassociation process if the primary user was not aware that a secondary user was connected to his or her devices. The notification component 152 may also be utilized to send a notification to the mobile device associated with the secondary user. The account component may also update timeout information for dissociation of the secondary user's account data from the voice interface device. At step 12, the account component 1308 may also publish a session event to the event bus 1314, which may be utilized to determine whether subsequent user utterances are associated with the secondary user or the primary user. At this point, the session may be active such that the secondary user's account data is associated with the primary user's devices. At step 13, the event bus 1314 may communicate with the domain speechlet 1316 to inform the domain speechlet 1316 that the session has started and domains and intents associated with subsequent user utterances may be associated with the guest user's account data.

FIG. 14 illustrates a conceptual diagram of example components utilized for determining when a user utterance should be associated with a secondary account or a primary account. It should be understood that while the operations described with respect to FIG. 14 are described in a stepwise process from steps 1 to 11, the processes may be performed in a different order and/or in parallel and may include more or less than 11 steps.

Once a secondary account is associated with primary devices as described with respect to FIG. 13, for example, users may provide user utterances to the primary devices and the system may be utilized to determine whether a given user utterance is from the second user or the primary user and perform operations based at least in part on that person identification. For example, one of the users may speak the phrase "play my playlist." Microphones of the primary device may capture that audio, generate corresponding audio data, and send the audio data to the system for processing. For example, an orchestrator of the system may receive data representing the request and may retrieve information about the context of the request. That information may be utilized, at step 1, to determine that a session is established for the primary device in question and that identification of the user is to be performed to determine a response to the request. The orchestrator may then, at step 2, query the speaker identification component 150 for person identifiers for the primary user, and at step 3 may query the speaker identification component 150 for device identifiers associated with the primary account.

At step 4, the account component 1308 may query the speaker identification component 150 for the person identifier associated with the secondary user. The voice profiles associated with the primary account and the voice profiles associated with the secondary account may be provided to the account component 1308. At this point, the orchestrator may have received the person identifiers for the primary user and the secondary user, and the orchestrator may build a speaker candidate set indicating the potential speakers of the user utterance.

The audio data representing the user utterance may be sent, at step 5, to the ASR component 154. At step 6, the speaker candidate set may then be sent from the account component 1308 to the ASR component 154. The ASR component 154 may utilize the voice profiles of the candidate speakers to determine which voice profile of the candidate speakers corresponds to characteristics of the user utterance. If the ASR component 154 returns a result that the secondary user is the most likely person to have provided the user utterance, then a context associated with the user utterance may be updated to indicate that the user utterance is from the secondary user. At step 7, this information may be sent to a datastore 1320 to be utilized by one or more components of the system. For example, a natural language understanding component (NLU) 156 may receive context data indicating that the speaker is the secondary user and/or that when an intent is determined by the NLU component 156, the intent may be associated with resources available to the secondary user's account. This data may also be sent to one or more skills associated with the secondary user's account. The skills may utilize this information to process requests from the NLU component 156 and return results. In examples, updating the context to indicate that the request is associated with the secondary user may be performed prior to and/or in parallel with the ASR component 154 determining whether the request is from the secondary user or the primary user. This may decrease latency in providing a response to the user. However, in these examples, where the ASR component determines that the request is from the primary user instead of the secondary user, the orchestrator may cause the context associated with the request to be updated to reflect that the speaker is the primary user.

Returning to the instances where the speaker is determined to be the secondary user, the NLU component 156 may determine an intent associated with the user utterance. Using the example above, for the user utterance of "play my playlist," the NLU component 156 may identify a "play music" intent and may identify the music to be played as "my playlist." The NLU component 156 may utilize the data indication that the secondary user provided the request to determine which music corresponds to the secondary user's playlist. For example, the secondary user's identification data may be utilized by an entity recognition component to determine which playlist associated with the secondary user is being requested for output on the voice interface device. The NLU component 156 may also utilize the secondary user's identification data to determine which services are available to the secondary user's account, such as which streaming music services are available to facilitate the request to play music. At step 8, the NLU component 156 may determine one or more speechlets 1316 to facilitate the request and may provide information associated with the request to the speechlets 1316 for processing. The speechlets 1316 may receive the information from the NLU component 156, may process the request, and may cause the voice interface device to perform one or more actions associated with the request, such as outputting content associated with "my playlist."

At step 9, the domain speechlet 1316 may publish, to the activity feed component 1324, activity data indicating operations taken in association with the account data utilizing the speechlet 1316. This information may be made available in an activity feed associated with the voice interface devices. At step 10, a privacy dashboard 1322 may be utilized to separate activity feed data associated with the secondary user's account data and activity feed data associated with the primary user's account data. At step 11, the privacy dashboard 1322 may query the datastore for information indicating which account was utilized in connection with a given operation by the speechlet 1316 to differentiate between actions associated with the secondary user profile and actions associated with the primary user profile.

FIG. 15 illustrates a sequence diagram 1500 of an example flow of interactions arranged in a time sequence for session utilization. It should be understood that while the sequence diagram 1500 is described in a stepwise manner, some or all of the operations described with respect to FIG. 15 may be performed in a different order and/or in parallel.

At block 1502, one of several potential users may provide a user utterance to a voice interface device where a guest session is active. For example, the user may speak the phrase "play my playlist." Microphones of the voice interface device may capture that audio, generate corresponding audio data, and send the audio data to a speech-processing system. For example, an orchestrator 1550 of the system may receive data representing the request as processed by a speech-processing component 138.

At block 1504, the orchestrator 1550 may call a speaker identification component 150 to retrieve information about the context of the request. That information may be utilized, at block 1508, to determine that a session is established for the voice interface device in question and that identification of the user is to be performed to determine a response to the request. The orchestrator 1550 may query, at block 1506, the speaker identification component 150 for person identifiers associated with the primary user. At block 1508, the orchestrator 1550 may query the account component 1308 for the session associated with a given device. The orchestrator 1550 may also query, at block 1510, the speaker identification component 150 for person identifiers for the secondary user. The orchestrator 1550 may also query the account component 1308 for an identifier of the session, and may utilize that identifier of the session to query the speaker identification component 150 for person identifiers of the secondary user. At this point, the orchestrator 1550 may have received the person identifiers for the primary user and the secondary user, and the orchestrator 1550, at block 1512, may build a speaker candidate set indicating the potential speakers of the user utterance.

At block 1514, the orchestrator 1550 may then connect to the ASR component 154 and initiate a request for speaker recognition, which may include providing the candidate set to the ASR component 154. The ASR component 154 may utilize the voice profiles of the candidate speakers to determine which voice profile of the candidate speakers corresponds to characteristics of the user utterance. If the ASR component 154 returns a result that the secondary user is the most likely person to have provided the user utterance, then at block 1516 the orchestrator 1550 may query the speaker identification component 150 for the speaker candidates.

At block 1518, the orchestrator 1550 may execute a context refresher flow with the domain context refresher 1552. At block 1520, the domain context refresher 1552 may utilize the identifier of the speaker to update a context associated with the user utterance, which may indicate that the user utterance is from the secondary user. This information may be sent to a datastore to be utilized by one or more components of the system. At block 1522, the orchestrator 1550 may execute an identification refresher flow with the identification context refresher 1554. At block 1524, the identification context refresher 1554 may utilize the identifier of the speaker to update an identifier of the user associated with the user utterance. This information may be sent to a datastore to be utilized by one or more components of the system.

In examples, updating the context to indicate that the request is associated with the secondary user may be performed prior to and/or in parallel with the ASR component 154 determining whether the request is from the secondary user or the primary user. This may decrease latency in providing a response to the user. At block 1526, for example, the ASR component 154 may return results of the voice recognition processes, indicating that the user utterance was determined to be from the secondary user or the primary user. If the user utterance is from the primary user, then at block 1528, the orchestrator 1550 may remove the secondary user candidates and related information from the datastore or otherwise not provide information or context associated with the secondary user to other components of the system. In examples where the ASR component 154 determines the user utterance is from the secondary user, then at block 1530 the orchestrator 1550 may send the guest user identification and the context to the NLU component 156, which may receive the context data indicating that the speaker is the guest user and/or that when an intent is determined by the NLU component 156, the intent may be associated with resources available to the secondary user's account.

At block 1532, the NLU component 156 may send the secondary user identifier and/or related information to a domain entity-recognition component 1555, to be utilized for entity recognition during speech processing. At block 1534, the orchestrator 1550 may invoke a remote application engine 1556, which may be utilized send information associated with the secondary user, the secondary user's account, and/or the specific request made during a session to other components of the system. At block 1536, the domain entity-recognition component 1555 may add the secondary user data to the entity-recognition logic to be utilized for speech processing. At block 1538, the intent associated with the user request may be executed, such as by the domain speechlet 1302.

Using the example above, for the user utterance of "play my playlist," the NLU component 156 may identify a "play music" intent and may identify the music to be played as "my playlist." The NLU component 156 and/or the domain entity-recognition component 1555 may utilize the data indicating that the secondary user provided the request to determine which music corresponds to the secondary user's playlist. For example, the secondary user's identification data may be utilized by the entity recognition component 1555 to determine which playlist associated with the secondary user is being requested for output on the voice interface device. The NLU component 156 may also utilize the secondary user's identification data to determine which services are available to the secondary user's account, such as which streaming music services are available to facilitate the request to play music. The NLU component 156 may determine one or more speechlets 1302 to facilitate the request and may provide information associated with the request to the speechlets 1302 for processing. The speechlets 1302 may receive the information from the NLU component 156, may process the request, and may cause the voice interface device to perform one or more actions associated with the request, such as outputting content associated with "my playlist."

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
receiving, from a voice interface device associated with first account data, first data indicating that the voice interface device has received a first signal from a first device associated with second account data;
determining an account-association session status associated with the second account data, the account-association session status indicating the second account data is currently associated with a lack of an account-association session;
in response to determining that the account-association session status indicates the lack of the account-association session, determining, from prior account-association sessions of the second account data, that the second account data has previously been associated with the voice interface device;
causing the account-association session status to indicate a temporary association of the second account data with the voice interface device, the causing based at least in part on:
the second account data having been previously associated with the voice interface device; and
the first data indicating the voice interface device is proximate to the first device;
enabling, based at least in part on the account-association session status indicating the temporary association of the second account data with the voice interface device, the second account data to utilize an application associated with the voice interface device for a time period associated with the account-association session status, the application configured to determine responses to voice commands received at the voice interface device;
receiving, from the voice interface device and while the second account data is associated with the voice interface device, first audio data representing user voice input;
determining, in response to the first audio data being received while the second account data is associated with the voice interface device and utilizing speaker identification processing, that the user voice input was spoken by a user associated with the second account data; and
in response to determining the user voice input was spoken by the user associated with the second account data, utilizing the application enabled for use by the second account data to respond to the user voice input.

2. The system of claim 1, the operations further comprising:
receiving second data indicating detection of a presence event associated with the voice interface device;
in response to the second data, determining that the account-association session status indicates the second account data is currently associated with a pending account-association session indicating that a response to a notification requesting confirmation of account association with the voice interface device is absent; and causing a period of time for which the notification is active to be extended in response to the second account data being currently associated with the pending session.

3. The system of claim 1, the operations further comprising:
determining that multiple voice interface devices received the first signal;
determining that at least one account identifier associated with the multiple voice interface devices differs from the first account data;
in response to determining that the at least one account identifier differs from the first account data, determining a number of account identifiers associated with the multiple voice interface devices that received the first signal at a signal strength level that satisfies a threshold signal strength level; and
in response to the number of the account identifiers associated with the multiple voice interface devices that received the first signal at the signal strength level being one, selecting the first account data.

4. The system of claim 1, the operations further comprising:
receiving second data indicating a change in device presence associated with the first account data;
in response to receiving the second data, determining that the account-association session status indicates the second account data is currently associated with the account-association session;
determining that the first signal has ceased being received at the voice interface device; and
causing, in response to the account-association session status indicating the account-association session and the first signal ceasing being received at the voice interface device, the second account data to be dissociated from the voice interface device.

5. A method, comprising:
receiving, from a first device associated with first account data, first data indicating a first presence event has occurred in proximity to the first device, the first presence event associated with at least one of a user associated with second account data or a second device associated with the second account data;
determining that a status associated with the second account data indicates a lack of an active session with the first device, the active session representing a time period during which the second account data is associated with the first device such that the second account data is authorized to be utilized to respond to voice input received at the first device;
determining, from prior account-association sessions of the second account data, that the second account data has previously been associated with the first device;
causing the status to indicate a temporary association of the second account data with the first device, the causing based at least in part on:
the second account data having been previously associated with the first device; and
the first data indicating the first device is proximate to the second device;
enabling, based at least in part on the status indicating the temporary association of the second account data with the first device, the second account data to utilize an application associated with the first device, the application configured to determine responses to commands received at the first device;
receiving, from the first device and while the second account data is associated with the first device, first audio data representing the voice input;
determining that the voice input is associated with the user; and
based at least in part on determining the voice input is associated with the user, utilizing the application enabled for use by the second account data to respond to the user voice input.

6. The method of claim 5, further comprising:
querying, based at least in part on the second account data being associated with the first device, the first device for second data associated with an environment of the first device; determining, based at least in part on the second data, that the user is in proximity to the first device;
determining, based at least in part on the second data, that a location of the user corresponds to a determined location where the voice input was received from; and
wherein determining that the voice input is associated with the user comprises determining that the voice input is associated with the user based at least in part on the location corresponding to the determined location.

7. The method of claim 5, further comprising:
determining that multiple devices, including the first device, received a signal from the second device;
determining that the first device received the signal at a signal strength level that satisfies a threshold signal strength level; and
based at least in part on the first device received the signal at the signal strength level, selecting the first device to associate with the second account data.

8. The method of claim 5, further comprising:
receiving second data indicating detection of a second presence event associated with the first device;
based at least in part on the second data, determining that the status indicates the second account data is currently associated with the active session;
determining that at least one of the user or the second device has ceased being detected at the first device; and
causing, based at least in part on the status indicating the active session and the at least one of the user or the second device ceasing being detected, the second account data to be dissociated from the first device.

9. The method of claim 5, further comprising:
receiving second data indicating detection of a second presence event associated with the first device;
based at least in part on the second data, determining that the status indicates the second account data is currently associated with a pending session indicating that a response to a notification requesting confirmation of account association with the first device is absent; and
causing a period of time for which the notification is active to be extended based at least in part on the second account data being currently associated with the pending session.

10. The method of claim 5, wherein the first data indicates a first signal strength at which a first signal is received at the first device, and the method further comprises:
determining that the first signal strength satisfies a threshold signal strength indicating the second device is within a first predetermined distance from the first device; and
sending second data representing a notification requesting confirmation of account association with the first device based at least in part on the first signal strength satisfying the threshold signal strength.

11. The method of claim 5, further comprising:
receiving second audio data at a third device;
determining that the third device is associated with the first account data;
determining that the second audio data was received while the second account data is associated with the first device; and
based at least in part on the second audio data being received while the second account data is associated with the first device, and the third device being associated with the first account data, utilizing the second account data instead of the first account data to respond to the second audio data.

12. The method of claim 5, further comprising:
storing, in a database, second data indicating the second account data is associated with the first device;
querying, based at least in part on receiving the first audio data, the database for the second data;
in response to receiving the second data from the database and utilizing speaker recognition techniques, determining a user profile associated with the audio data;
determining that the user profile is associated with the second account data; and
wherein determining the voice input is associated with the user comprises determining the voice input is associated with the user based at least in part on the user profile being associated with the second account data.

13. A system, comprising:
one or more processors; and
non-transitory computer-readable media storing computer-executable instructions that, when executed by the one or more processors, cause the one or more processors to perform operations comprising:
receiving, from a first device associated with first account data, first data indicating a first presence event has occurred in proximity to the first device, the first presence event associated with at least one of a user associated with second account data or a second device associated with the second account data;
determining that a status associated with the second account data indicates a lack of an active session with the first device, the active session representing a time period during which the second account data is associated with the first device such that the second account data is authorized to be utilized to respond to voice input received at the first device;
determining, from prior account-association sessions of the second account data, that the second account data has previously been associated with the first device;
causing the status to indicate a temporary association of the second account data with the first device, the causing based at least in part on:
the second account data having been previously associated with the first device; and
the first data indicating the first device is proximate to the second device;
enabling, based at least in part on the status indicating the temporary association of the second account data with the first device, the second account data to utilize an application associated with the first device, the application configured to determine responses to commands received at the first device;
receiving, from the first device and while the second account data is associated with the first device, first audio data representing the voice input;
determining that the voice input is associated with the user; and
based at least in part on determining the voice input is associated with the user, utilizing the application enabled for use by the second account data to respond to the user voice input.

14. The system of claim 13, the operations further comprising:
querying, based at least in part on the second account data being associated with the first device, the first device for second data associated with an environment of the first device;
determining, based at least in part on the second data, that the user is in proximity to the first device;
determining, based at least in part on the second data, that a location of the user corresponds to a determined location where the voice input was received from; and
wherein determining that the voice input is associated with the user comprises determining that the voice input is associated with the user based at least in part on the location corresponding to the determined location.

15. The system of claim 13, the operations further comprising:
determining that multiple devices, including the first device, received a signal from the second device;
determining that the first device received the signal at a signal strength level that satisfies a threshold signal strength level; and
based at least in part on the first device receiving the signal at the signal strength level, selecting the first device to associate with the second account data.

16. The system of claim 13, the operations further comprising:
receiving second data indicating detection of a second presence event associated with the first device;
based at least in part on the second data, determining that the status indicates the second account data is currently associated with the active session;
determining that at least one of the user or the second device has ceased being detected at the first device; and
causing, based at least in part on the status indicating the active session and the at least one of the user or the second device ceasing being detected, the second account data to be dissociated from the first device.

17. The system of claim 13, the operations further comprising:
receiving second data indicating detection of a second presence event associated with the first device;
based at least in part on the second data, determining that the status indicates the second account data is currently associated with a pending session indicating that a response to a notification requesting confirmation of account association with the first device is absent; and
causing a period of time for which the notification is active to be extended based at least in part on the second account data being currently associated with the pending session.

18. The system of claim 13, wherein the first data indicates a first signal strength at which a first signal is received at the first device, and the operations further comprise:
determining that the first signal strength satisfies a threshold signal strength indicating the second device is within a first predetermined distance from the first device; and sending second data representing a notification requesting confirmation of account association with the first device based at least in part on the first signal strength satisfying the threshold signal strength.

19. The system of claim 13, the operations further comprising:
- receiving second audio data at a third device;
- determining that the third device is associated with the first account data;
- determining that the second audio data was received while the second account data is associated with the first device; and
- based at least in part on the second audio data being received while the second account data is associated with the first device, and the third device being associated with the first account data, utilizing the second account data instead of the first account data to respond to the second audio data.

20. The system of claim 13, the operations further comprising:
- storing, in a database, second data indicating the second account data is associated with the first device;
- querying, based at least in part on receiving the first audio data, the database for the second data;
- in response to receiving the second data from the database and utilizing speaker recognition techniques, determining a user profile associated with the audio data;
- determining that the user profile is associated with the second account data; and
- wherein determining the voice input is associated with the user comprises determining the voice input is associated with the user based at least in part on the user profile being associated with the second account data.

* * * * *